United States Patent
Ahn et al.

(10) Patent No.: US 12,052,293 B2
(45) Date of Patent: Jul. 30, 2024

(54) IDENTITY-BASED APPLICATION OF DOMAIN FILTERING RULES USING DOMAIN NAME SYSTEM (DNS) PLATFORM

(71) Applicant: Centripetal Networks, LLC, Portsmouth, NH (US)

(72) Inventors: David K. Ahn, Winston-Salem, NC (US); Jess P. Parnell, Grayson, GA (US); Jared Holmberg, Dallas, TX (US); Travis Duane Camechis, Gloucester, VA (US); Pierre Mallett, III, Herndon, VA (US); John C. Fenton, Ashburn, VA (US); Daniel Rogers, Reston, VA (US)

(73) Assignee: Centripetal Networks, LLC, Portsmouth, NH (US)

( * ) Notice: Subject to any disclaimer, the term of this patent is extended or adjusted under 35 U.S.C. 154(b) by 0 days.

(21) Appl. No.: 18/372,952

(22) Filed: Sep. 26, 2023

(65) Prior Publication Data

US 2024/0106861 A1    Mar. 28, 2024

Related U.S. Application Data

(60) Provisional application No. 63/410,544, filed on Sep. 27, 2022, provisional application No. 63/469,158, filed on May 26, 2023.

(51) Int. Cl.
*H04L 29/06* (2006.01)
*H04L 9/40* (2022.01)

(52) U.S. Cl.
CPC .......... *H04L 63/20* (2013.01); *H04L 63/0236* (2013.01); *H04L 63/0435* (2013.01); *H04L 63/0823* (2013.01)

(58) Field of Classification Search
CPC . H04L 63/0823; H04L 63/0435; H04L 63/20; H04L 63/10; H04L 63/0236; H04L 63/166
(Continued)

(56) References Cited

U.S. PATENT DOCUMENTS

| | | | |
|---|---|---|---|
| 8,499,077 B2 * | 7/2013 | Niemela | H04L 63/105 709/225 |
| 9,369,437 B2 | 6/2016 | Holloway et al. | |

(Continued)

OTHER PUBLICATIONS

"The Hyper-Fast Database that Truly Scales" CrateDB, website: https://cratedb.com/, website visited Sep. 27, 2023, pp. 1-9.
(Continued)

*Primary Examiner* — Longbit Chai
(74) *Attorney, Agent, or Firm* — Banner & Witcoff, Ltd.

(57) ABSTRACT

Aspects of the disclosure relate to identity-based DNS-traffic routing and monitoring. A computing platform may establish, using an encrypted DNS process, a secure DNS session by executing an encrypted session handshake with a client device, which may include receiving a security certificate for the encrypted DNS process that identifies a user of the client device. The computing platform may receive an encrypted DNS query request comprising a request for an IP address for a specified domain name. The computing platform may determine, based on the security certificate, an identity of the user. The computing platform may determine, based on the identity of the user, a security policy indicating domain matching criteria and corresponding actions to take on matching domain names. The computing platform may determine a first action corresponding to the domain name, and may send, based on the first action, an encrypted DNS query response.

30 Claims, 21 Drawing Sheets

(58) Field of Classification Search
USPC .......................................................... 726/1
See application file for complete search history.

(56) References Cited

U.S. PATENT DOCUMENTS

| | | | |
|---|---|---|---|
| 10,623,425 B2 * | 4/2020 | Shitrit-Efergan | ... H04L 63/1425 |
| 11,146,961 B2 * | 10/2021 | Bok | .................... H04L 63/0823 |
| 2014/0283030 A1 | 9/2014 | Moore et al. | |
| 2015/0143504 A1 * | 5/2015 | Desai | ................. H04L 63/0245 |
| | | | 709/224 |
| 2015/0288721 A1 | 10/2015 | Lemon et al. | |
| 2016/0036857 A1 | 2/2016 | Foxhoven et al. | |
| 2017/0329850 A1 | 11/2017 | Statia et al. | |
| 2018/0302375 A1 | 10/2018 | Els | |
| 2019/0012456 A1 | 1/2019 | Moore et al. | |
| 2019/0028439 A1 | 1/2019 | Moore | |
| 2020/0351244 A1 | 11/2020 | Moore et al. | |

OTHER PUBLICATIONS

"Accelerate time to insight with Elasticsearch and AI" ElasticON AI, website: https://elastic.co, Sep. 27, 2023, pp. 1-10.
"Redis" Redis, website: https://redis.io, website visited Sep. 27, 2023, pp. 1-8.
"Pattern" CrateDB, website: https://cratedb.com/docs/crate/reference/en/4.8/general/ddl/analyzers.html#pattern, website visited Sep. 27, 2023, pp. 7-8.
"Match Types" CrateDB, website: https://cratedb.com/docs/crate/reference/en/4.8/general/dql/fulltext.html#match-types, website visited Sep. 27, 2023, pp. 6-8.
"Crate tokio_postgres" website: https://docs.rs/tokio-postgres/0.7.6/tokio_postgres/, website visited Sep. 27, 2023, pp. 1-8.
"Actix" website: https://actix.rs/, website visited Sep. 27, 2023, pp. 1-5.
"actix / examples" website: https://github.com/actix/examples/tree/master/databases/postgres, website visited Sep. 27, 2023, pp. 1-4.
"Crate JDBC" Maven Respository, website: https://mvnrepository.com/artifact/io.crate/crate-jdbc/2.6.0, website visited Sep. 27, 2023, pp. 1-6.
"Installation" CrateDB, website: https://cratedb.com/docs/jdbc/en/latest/getting-started.html, Sep. 27, 2023, pp. 1-4.
"Public Suffix" website: publicsuffix.org/list/public_suffix_list.dat, website visited Sep. 27, 2023, pp. 1-300.
"DNS Threat Protection & Content Filtering Powered by Machine Learning" website https://www.dnsfilter.com/, website visited Sep. 26, 2023, pp. 1-9.
"Modern cybersecurity, made easy" Cisco, website https://umbrella.cisco.com/, website visited Sep. 26, 2023, pp. 1-20.
"Cloud Delivered Enterprise Security by OpenDNS" Cisco, website: https://www.opendns.com/, website visited Sep. 26, 2023, pp. 1-13.
"A public and free DNS service for a better security and privacy" Quad9, website: https://www.quad9.net/, website visited Sep. 26, 2023, pp. 1-4.
"Cloudflare DNS, Authoritative and Secondary DNS" Cloudflare, website: https://www.cloudflare.com/application-services/products/dns/, website visited Sep. 26, 2023, pp. 1-11.
"Public DNS | Google for Developers" Google, website: https://developers.google.com/speed/public-dns, website visited Sep. 26, 2023, pp. 1-2.
"AdGuard—World's most advanced adblocker!" AdGuard, website: https://adguard.com/en/welcome.html, website visited Sep. 26, 2023, pp. 1-12.
"CleanBrowsing | DNS Filtering Platform" CleanBrowsing, website: https://cleanbrowsing.org/, website visited Sep. 26, 2023, pp. 1-9.
"Email Protection and DNS Filtering Solutions" TitanHQ, website: https://www.titanhq.com/, website visited Sep. 26, 2023, pp. 1-20.

"Response Policy Zone" Wikipedia, website: https://en.wikipedia.org/wiki/Response_policy_zone, website visited Sep. 26, 2023, pp. 1-4.
"Point DNS to Cisco Umbrealla" Cisco Umbrella, website: https://docs.umbrella.com/deployment-msp/v2.0/docs/point-your-dns-to-cisco, website visited Sep. 3, 2021, pp. 1-4.
"What is the Intelligent Proxy" Cisco Umbralla, website: https://docs.umbrella.com/deployment-msp/v2.0/docs/what-is-the-intelligent-proxy, website visited Sep. 3, 2021, pp. 1-3.
"Welcome to Cisco Umbrella for MSPs" Cisco Umbrella, website: https://docs.umbrella.com/deployment-msp/docs, website visited Sep. 26, 2023, pp. 1-2.
"Create and Apply Policies" Cisco Umbrella, website: https://docs.umbrella.com/deployment-msp/docs/customize-policies, website Sep. 26, 2023, pp. 1-23.
"User Guides" Cisco Umbrella, website: https://docs.umbrella.com/umbrella-guides/page/user-guides, website visited Sep. 26, 2023, pp. 1-2.
"Introduction" Cisco Umbrella, website: https://docs.umbrella.com/deployment-umbrella/docs/1-introduction-1, website visited Sep. 26, 2023, pp. 1-3.
"Identity Support for the Roaming Client" Cisco Umbrella, website: https://docs.umbrella.com/deployment-umbrella/docs/identity-support-for-the-roaming-client, website visited Sep. 26, 2023, pp. 1-11.
"Manage the Intelligent Proxy" Cisco Umbrella, website: https://docs.umbrella.com/deployment-umbrella/docs/manage-intelligent-proxy, website visited Sesptember 3, 2021, pp. 1-4.
Peter Wu, "DNS Encryption Explained" Cloudflare, website: https://blog.cloudflare.com/dns-encryption-explained/, Oct. 29, 2019, pp. 1-27.
"Extension Mechanisms for DNS" website: https://en.wikipedia.org/wiki/Extension_Mechanisms_for_DNS, website visited Sep. 26, 2023, pp. 1-3.
"DNS over TLS" website: https://en.wikipedia.org/wiki/DNS_over_TLS, website visited Sep. 26, 2023, pp. 1-5.
"Internal passthrough Network Load Balancer overview" Google, website: https://cloud.google.com/load-balancing/docs/internal, website visited Sep. 26, 2023, pp. 1-42.
"Target Groups for your Network Load Balancers" AWS, website: https://docs.aws.amazon.com/elasticloadbalancing/latest/network/load-balancer-target-groups.html#client-ip-preservation, website visited Sep. 26, 2023, pp. 1-19.
"Flexible Load Balancing" Oracle, website: https://www.oracle.com/cloud/networking/load-balancing/, website visited Sep. 26, 2023, pp. 1-7.
"Azure Load Balancer algorithm" Microsoft, website: https://docs.microsoft.com/en-us/azure/load-balancer/concepts, May 8, 2023, pp. 1-2.
"PowerDNS" website: https://dnsdist.org/advanced/passing-source-address.html#using-edns-client-subnet, website visited Sep. 26, 2023, pp. 1-5.
"Client Subnet in DNS Queries" Internet Engineering Task Force (IETF), website: https://datatracker.ietf.org/doc/html/rfc7871#page-4, May 2016, pp. 1-30.
"A command-line DNS client" website: GitHub—ogham/dog: A command-line DNS client., website visited Sep. 26, 2023, pp. 1-9.
"X-Proxied-For" website; Passing the source address to the backend—dnsdist documentation, website visited Sep. 26, 2023, p. 3.
"Proxy Protocol" website: Passing the source address to the backend—dnsdist documentation, website visited Sep. 26, 2023, pp. 3-4.
"Documentation" Velero, website: Velero Docs—Overview, website visited Sep. 27, 2023, pp. 1-2.
"Response Policy Zones (RPZ)—PowerDNS Recursor documentation" website: Response Policy Zones (RPZ)—PowerDNS Recursor documentation, website visited Sep. 27, 2023, pp. 1-14.
"Configuring RPZ" website: Response Policy Zones (RPZ)—PowerDNS Recursor documentation, website visited Sep. 27, 2023, pp. 3-4.
"RPZ Configuration Functions" website: Response Policy Zones (RPZ)—PowerDNS Recursor documentation, website visited Sep. 27, 2023, pp. 5-6.

(56) References Cited

OTHER PUBLICATIONS

"RPZ Settings" website: Response Policy Zones (RPZ)—PowerDNS Recursor documentation, website Sep. 27, 2023, pp. 6-9.
"Own your DNS" ioc2rpz community, website: https://ioc2rpz.net/, website visited Sep. 27, 2023, pp. 1-3.
"Intercepting queries with Lua—PowerDNS Recursor documentatin" website: https://docs.powerdns.com/recursor/lua-scripting/hooks.html, website visited Sep. 27, 2023, pp. 1-24.
"The DNSQuestion (dq) object" PowerDNS, website: https://dnsdist.org/reference/dq.html#DNSQuestion: addProxyProtocolValue, website visited Sep. 27, 2023, pp. 1-19.
"Dnsdist: add lua support for SetEDNSOptionAction" Github, website: https://github.com/PowerDNS/pdns/pull/10814, Sep. 27, 2023, pp. 1-3.
"Service" Kubernetes, website: https://kubernetes.io/docs/concepts/services-networking/service/#external-traffic-policy, website visited Sep. 27, 2023, pp. 1-14.
"The DNSQuestion (dq) object" website: https://doc.powerdns.com/recursor/lua-scripting/dq.html, website visited Sep. 27, 2023, pp. 1-14.
"Preresolve (dq)—bool" website: https://doc.powerdns.com/recursor/lua-scripting/hooks.html#preresolve, website visited Sep. 27, 2023, pp. 7-10.
"Postresolve" website: https://doc.powerdns.com/recursor/lua-scripting/hooks.html#/postresolve, website visited Sep. 27, 2023, p. 7.
"Introduction" Datatracker, website: https://datatracker.ietf.org/doc/html/rfc6891#page-4, website visited Sep. 27, 2023, p. 4.
"Routing Configuration for Traefik CRD" Traefik Labs, website: https://doc.traefik.io/traefik/routing/providers/kubernetes-crd/#kind-ingressrouteudp, website visited Sep. 27, 2023, pp. 1-199.
"ProxyProtocolValue" website: https://dnsdist.org/reference/dq.html#DNSQuestion:addProxyProtocolValue, website visited Sep. 27, 2023, p. 3.
"DNS Queries over HTTPS (DoH)" Internet Engineering Task Force (IETF), website: https://datatracker.ietf.org/doc/html/rfc8484, website visited Sep. 27, 2023, pp. 1-21.
"TuxIvader" Github, website: https://github.com/TuxInvader/nginx-dns, website visited Sep. 27, 2023, pp. 1-5.
"Google Cloud Pub/Sub Source Connector for Confluent Cloud" Confluent Developer, website: https://docs.confluent.io/cloud/current/connectors/cc-google-pubsub-source.html?ajs_aid=d6e98684-d997-4483-8af2-bc42537f5922&ajs_uid=29856, website visited Sep. 27, 2023, pp. 1-17.
"Class KafkaIO.Read" website: https://beam.apache.org/releases/javadoc/2.0.0/org/apache/beam/sdk/io/kafka/KafkaIO.Read.html, website visited Sep. 27, 2023, pp. 1-6.
"Cisco Umbrella" https://umbrella.cisco.com/info/package-comparison-and-consultation?utm_medium=search-paid&utm_source=google&utm_campaign=UMB_NA_EN_GS_Branded_Cisco&utm_content=SIG-FY24-Q1-Umbrella-Content-product-package-comparison-download&_bt=667552007511&_bk=cisco+umbrella&_bm=e&_bn=g&_bg=125108519035&gad=1&gclid=EAIaIQobChMI7LqL_Ly3ggMVq0tHAR1kfAHHEAAYASAAEgJj3vD_BwE, website visited Nov. 9, 2023, 4 pages.
"OpenDNS" Cisco, https://www.opendns.com/, website visited Nov. 9, 2023, 13 pages.
"CloudFlare DNS" https://www.cloudflare.com/application-services/products/dns/, website visited Nov. 9, 2023, 11 pages.
"NextDNS" https://nextdns.io/, website visited Nov. 9, 2023, 6 pages.
"Firefox" https://www.mozilla.org/en-us/firefox/new/, website visited Nov. 9, 2023, 15 pages.
"Microsoft Edge" https://www.microsoft.com/en-us/edge/?ep=124&form=MA13KU&es=27, website visited Nov. 9, 2023, 12 pages.
"WebTitan" https://trust.titanhq.com/acton/media/31047/webtitan-web-filter-up-21-01-2022-form?utm_campaign=THQ-ENG-Brand-GSN&acctid=THQ&utm_source=Adwords&utm_medium=PPC&keyword=webtitan&matchtype=b&campaignid=2020606931&adgroupid=142965066932&gclid=EAIaIQobChMIra6tgMK3ggMVi0pHAR1WjQXnEAAYASAAEgliTfD_BwE&network=g&device=c, website visited Nov. 9, 2023, 6 pages.
"Google Public DNS" https://developers.google.com/speed/public-dns, website Nov. 9, 2023, 2 pages.
"The Chromium Projects" https://www.chromium.org/chromium-projects/, website visited Nov. 9, 2023, 2 pages.
"Chrome" https://www.google.com/chrome/, website visited Nov. 9, 2023, 19 pages.
"Amazon Route 53" https://aws.amazon.com/route53/, website visited Nov. 9, 2023, 8 pages.
"SafeDNS" https://www.safedns.com/, website Nov. 9, 2023, 13 pages.
"CleanBrowsing" https://cleanbrowsing.org/, website visited Nov. 9, 2023, 9 pages.
"Infoblox" https://www.infoblox.com/, website visited Nov. 9, 2023, 6 pages.
"Neustar" https://www.home.neustar/, website visited Nov. 9, 2023, 2 pages.
Tanya Verma et al. "Improving DNS Privacy with Oblivious DoH in 1.1.1.1" The Cloudflare Blog, https://blog.cloudflare.com/oblivious-dns/, Dec. 8, 2020, 21 pages.
Glen Nakamoto et al., "Identity-Based Internet Protocol Network" Mitre, https://www.mitre.org/news-insights/publication/identity-based-internet-protocol-network, Apr. 1, 2012, 5 pages.
"Protective Domain Name System (DNS) Resolver Service" Cybersecurity & Infrastructure Security Agency, https://www.cisa.gov/sites/default/files/publications/FINAL-CSSO-Protective_DNS-Fact_Sheet.pdf, website visited Nov. 9, 2023, 2 pages.
"Selecting a Protective DNS Service" National Security Agency, website visited Nov. 9, 2023, 5 pages.
"Extend Enforcement" Cisco Umbrella, https://docs.umbrella.com/managed-services/docs/msc-extend-enforcement, website visited Nov. 10, 2023, 2 pages.
Jan. 26, 2024—(WO) Partial International Search Report and Written Opinion—App PCT/US2023/075096.
Mar. 18, 2024—(WO) Final International Search Report and Written Opinion—App PCT/US2023/075096.
Website visited Nov. 9, 2023, "DNSFilter" https://www.dnsfilter.com/?utm_medium=cpc&utm_source=google&utm_content=585712391410&utm_term=dnsfilter&utm_campaign=dnsf_google_search_text_prospecting_brand&hsa_acc=3040546900&hsa_cam=16465231342&hsa_grp=132767286134&hsa_ad=585712391410&hsa_src=g&hsa_tgt=kwd-339353629329&hsa_kw=dnsfilter&hsa_mt=e&hsa_net=adwords&hsa_ver=3&gad=1&gclid=EAIaIQobChMIwaSup763ggMVDEdHAR1UMQsaEAAYASAAEgJoNPD_BWE, 9 pages.
Website visited Nov. 9, 2023, "Perimeter 81" https://www.perimeter81.com/?accountid=2597329217&utm_source=google&utm_medium=cpc&utm_campaign=1066105359&utm_adgroup=51875672626&utm_target=kwd-415398361840&utm_matchtype=e&utm_network=g&utm_device=c&utm_creative=595132852028&utm_term=perimeter%2081&utm_adposition&utm_content&utm_placement&utm_campaigntype=performance&gclid=EAIaIQobChMIrNTnrM.

* cited by examiner

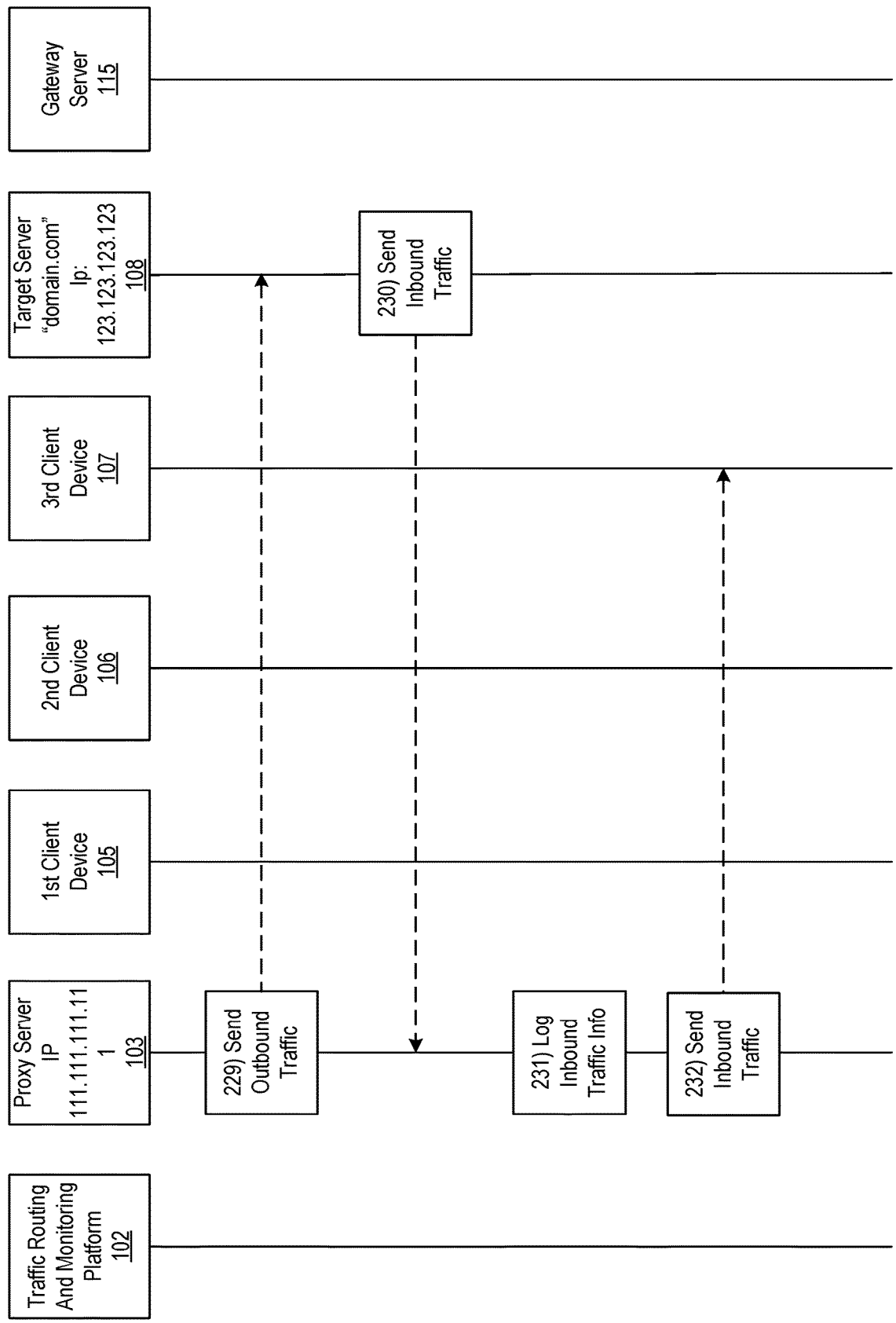

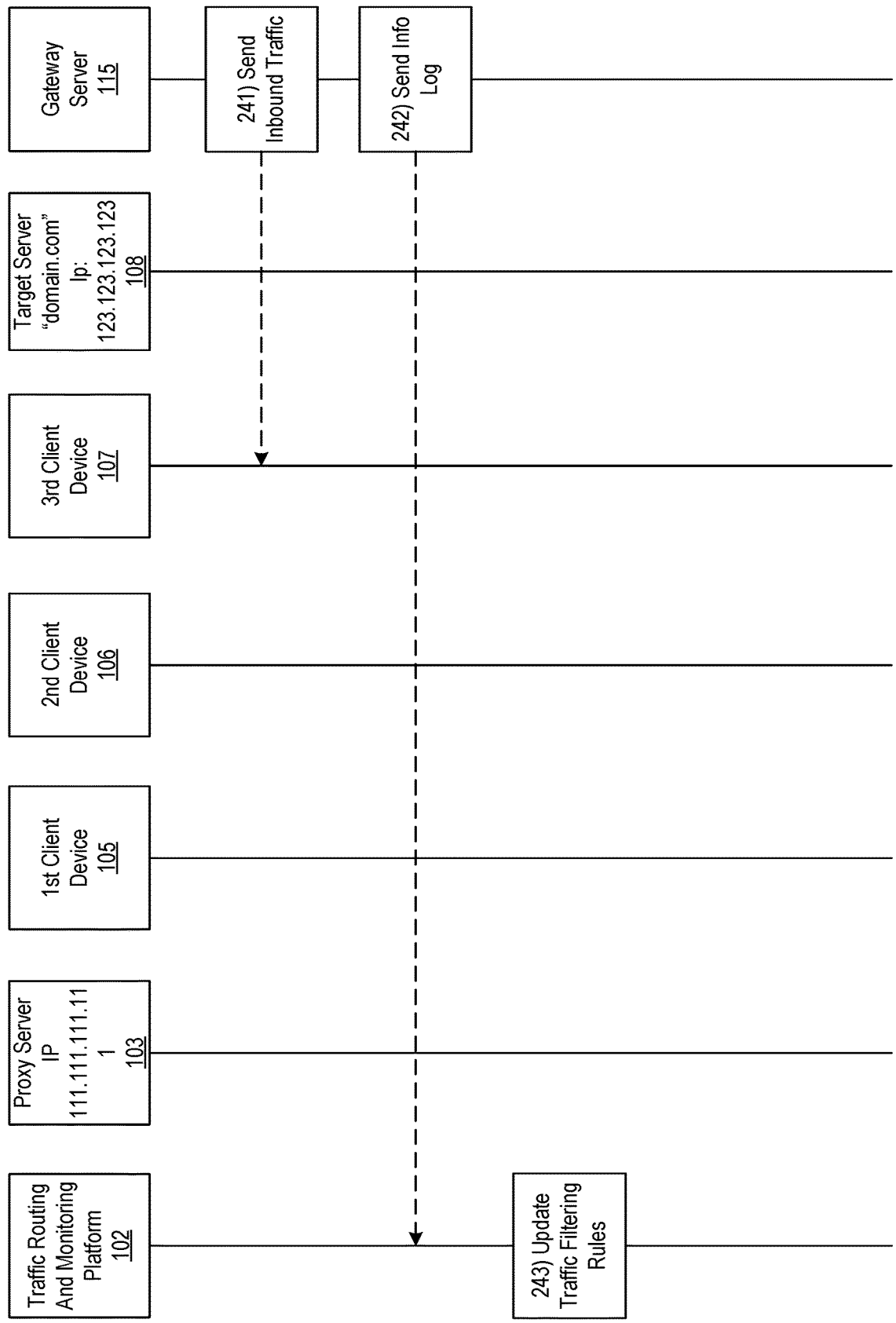

IDENTITY-BASED APPLICATION OF DOMAIN FILTERING RULES USING DOMAIN NAME SYSTEM (DNS) PLATFORM

CROSS REFERENCE TO RELATED APPLICATIONS

This application claims priority to U.S. Provisional Patent Application Ser. No. 63/469,158, filed May 26, 2023, and entitled "Identity-Based Application of Domain Filtering Rules Using Domain Name System (DNS) Platform" and U.S. Provisional Patent Application Ser. No. 63/410,544, filed Sep. 27, 2022, and entitled "Identity-Based Application of Domain Filtering Rules Using Domain Name System (DNS) Platform," both of which are incorporated by reference herein in their entirety.

BACKGROUND

Aspects of the disclosure relate to computing hardware and software, particularly distributed computing hardware and software configured for processing domain name system (DNS) queries. In some instances, DNS policies and/or other threat intelligence may be enforced on a protected network (e.g., an enterprise network), which may, e.g., be accessed from a particular location (e.g., an office for the enterprise). In some instances, however, individuals may access the enterprise network from a remote location, and such DNS policies might not be enforced. As remote access becomes increasingly prevalent, it may be important to improve the threat intelligence deployed at such remote devices.

In some instances, encrypted DNS (e.g., as standardized in RFC 7858 and RFC 8310) may be used to enhance communication security and user privacy in the transmission of DNS queries and responses. For example, communications may be secured using DNS over transport layer security (TLS). DNS over TLS may include embedding a DNS message into a secure TLS channel. For example, a client device and the DNS server may exchange TLS handshake messages to establish the secure TLS channel. In these instances, the client device may notify the DNS server of its TLS capabilities, and the DNS server may respond to confirm TLS parameters that may be used to secure the TLS channel. For example, the DNS server may send a certificate identifying the DNS server, and a message including a digital signature of the DNS server, which may be verified by the client device (e.g., by checking a trusted authority list, public key pinning, and/or other methods). Once this handshake is complete, the client device and DNS server may exchange encrypted messages (e.g., DNS query requests, DNS query replies, and/or other information). In these instances, a common DNS server may be shared between multiple client devices, and may apply generic or otherwise common DNS policies among these devices. As encrypted DNS is increasingly adopted, it may be important to improve or otherwise refine the application of DNS policies.

SUMMARY

Aspects of the disclosure provide effective, efficient, scalable, and convenient technical solutions that address and overcome the technical problems associated with traffic routing and monitoring. In accordance with one or more embodiments of the disclosure, an identity-based DNS routing platform configured to apply a security policy, specific to an identified user, to DNS queries, and comprising at least one processor, a communication interface, and memory storing computer-readable instructions may establish, using an encrypted DNS process, a secure DNS session, which may include executing an encrypted session handshake between the identity-based DNS routing platform and a client device, and where executing the encrypted session handshake may include receiving, from the client device, a security certificate for the encrypted DNS process that identifies a user of the client device. The computing platform may receive, while the secure DNS session is established and from the client device, an encrypted DNS query request comprising a request for an internet protocol (IP) address for a domain name, where the encrypted DNS query request specifies the domain name. The computing platform may determine, based on the security certificate, an identity of the user. The computing platform may determine, based on the identity of the user, the security policy specific to the user, where the security policy comprises one or more domain name filtering rules, and each domain name filtering rule comprises respective domain matching criteria and corresponding actions to take on matching domain names. The computing platform may determine, using the one or more domain name filtering rules and based on the domain name in the encrypted DNS query request, a first action corresponding to the domain name in response to the encrypted DNS query request. The computing platform may determine, based on the first action corresponding to the domain name, an encrypted DNS query response, where determining the encrypted DNS query response may further include executing the request for the IP address for the domain name upstream to identify the IP address for the domain name. The computing platform may send, to the client device, the encrypted DNS query response.

In one or more instances, the security policy is user specific based on an organization associated with the user of the client device, and the encrypted DNS query request may be received from the client device while the client device is sending the encrypted DNS query request from outside of a protected network of the organization. In one or more instances, the corresponding actions to take on the matching domain names may indicate, for a respective domain name of the matching domain names, whether traffic should be blocked, allowed, or logged.

In one or more instances, determining the first action corresponding to the domain name may include determining that the domain name matches a first domain name rule that indicates traffic to matching domains should be blocked. In one or more instances, the encrypted DNS query response may be an IP address of a block notification page.

In one or more instances, the encrypted DNS query response may be a notification that the requested IP address is blocked. In one or more instances, determining the first action corresponding to the domain name may include determining that the domain name matches a first domain name rule that indicates traffic to matching domains should be allowed.

In one or more instances, the encrypted DNS query response may be an IP address of a server associated with the domain name in the encrypted DNS query request. In one or more instances, determining the first action corresponding to the domain name may include determining that the domain name matches a first domain name rule that indicates traffic to matching domains should be logged by a proxy server.

In one or more instances, the encrypted DNS query response may be an IP address of the proxy server. In one or more instances, the encrypted DNS query response may be configured to cause outgoing traffic to and incoming traffic from the IP address of a server associated with the domain name of the encrypted DNS query request to be conducted via the proxy server.

In one or more instances, the proxy server may: 1) receive, from the client device, outgoing network traffic, where the outgoing network traffic: a) indicates a proxy IP address of the proxy server as a destination IP address, and b) includes data directed to a server associated with the domain name; 2) receive, from the server associated with the domain name, inbound network traffic comprising a response to the outgoing network traffic; 3) log, based on the domain matching criteria for the domain name and the corresponding actions to be performed for the domain name, network traffic comprising one or more of: the outgoing network traffic and the inbound network traffic; and 4) send, to the client device, the inbound network traffic.

In one or more instances, the proxy server may: 1) prompt the client device to provide the security certificate; 2) determines, based on the security certificate, one or more network policies, where the one or more network policies indicate: a) traffic associated with a potential security threat for which traffic should be logged, and b) metadata to be collected for the traffic associated with the potential security threat; 3) collect the metadata for the traffic associated with the potential security threat; and 4) send, to the identity-based DNS routing platform, the metadata.

In one or more instances, a network interface of the client device is preconfigured to direct DNS requests to an IP address of the identity-based DNS routing platform, and the security certificate may be installed at the client device prior to receipt of the encrypted DNS query request. In one or more instances, the client device may be preconfigured based on installation of an enterprise security profile on the client device, and the installation of the enterprise security profile on the client device may cause the client device to direct the DNS requests to the IP address of the identity-based DNS routing platform. In one or more instances, determining the security policy for the user may include determining that one of: a user-specific policy, an organization-level policy, or a default policy is to be applied for the user. In one or more instances, the one or more domain name filtering rules may include a whitelist, a blacklist, and a watchlist, and where each of the matching domain names are included on one of the whitelist, the blacklist, or the watchlist.

In one or more instances, determining the first action to be performed for the domain name may include identifying whether the domain name is listed on the whitelist, the blacklist, or the watchlist, where: 1) the first action is to block traffic to an IP address of the domain name when the domain name is listed on the blacklist; 2) the first action is to log traffic to the IP address of the domain name when the domain name is listed on the watchlist; and 3) the first action is to allow traffic to access the IP address of the domain name when the domain name is listed on the whitelist. In one or more instances, the encrypted session handshake may be a transport layer security (TLS) handshake.

In one or more examples, determining the identity of the user may further include determining, based on at least a first identity and a second identity, the identity of the user. In one or more examples, the first identity and the second identity may be embedded in the encrypted DNS query request at the client device.

In one or more instances, the first encrypted DNS query request may be routed to the identity-based DNS routing platform from the client device along a DNS path, which may be a path of the first encrypted DNS query request as it recurses through different DNS servers to formulate a response back to the client device. In one or more instances, the first identity may be embedded in the encrypted DNS query request at the client device, and the second identity may be embedded in the encrypted DNS query request at an intermediary server along the DNS path. In one or more instances, the first identity may correspond to first domain name filtering rules and the second identity may correspond to second domain name filtering rules, where determining the security policy may include deconflicting the first domain name filtering rules and the second domain name filtering rules.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2K depict an illustrative event sequence for improved traffic routing and monitoring in accordance with one or more example embodiments;

DETAILED DESCRIPTION

Figure 1A:
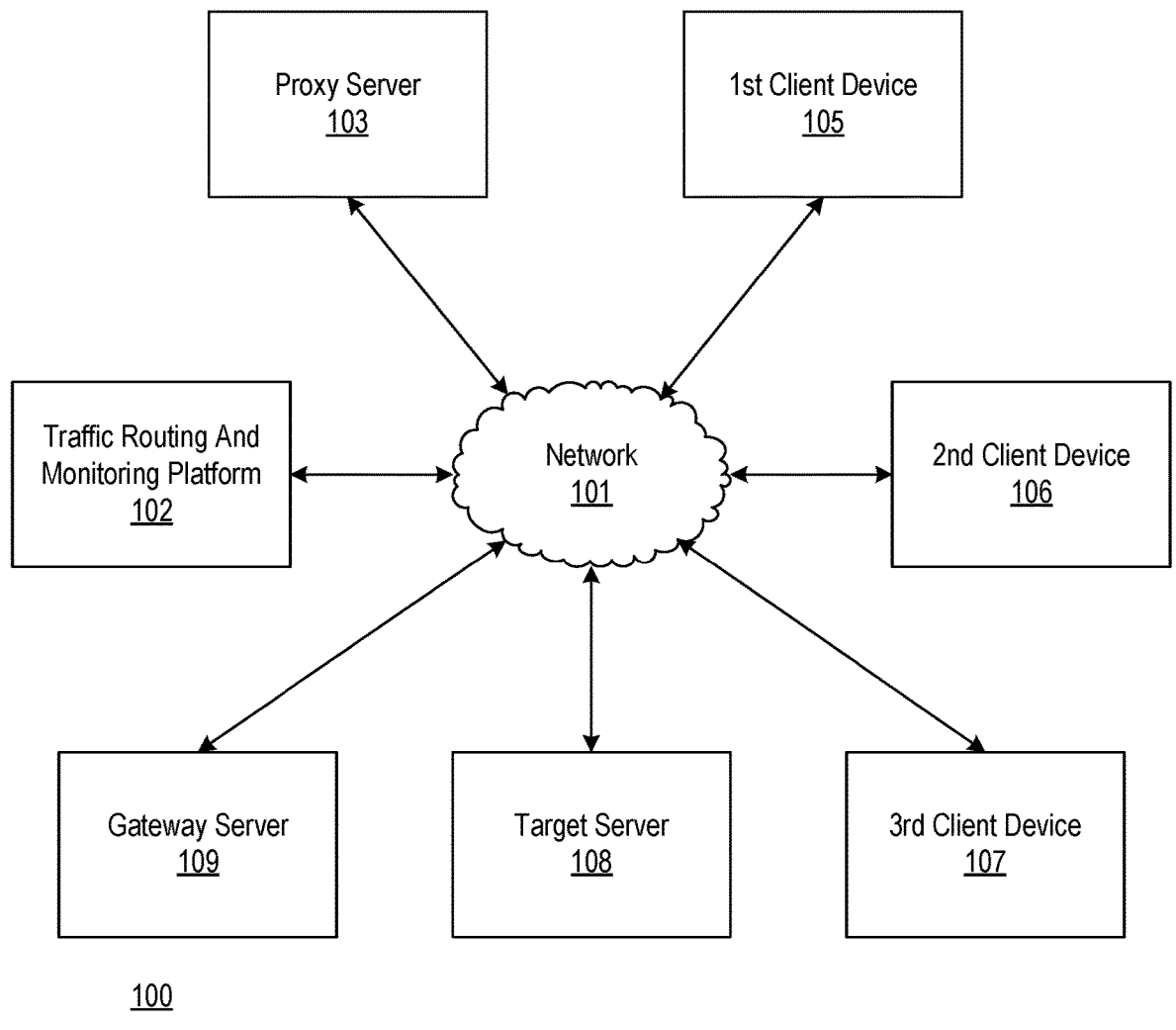
FIGS. 1A-1C depict an illustrative computing environment configured to provide improved traffic routing and monitoring in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to identity-based traffic routing and monitoring. For example, an individual may be working from home, or otherwise remotely from a physical location of an enterprise of which they may be an employee. In these instances, the individual might not be locally accessing the enterprise network, and may instead be operating on a home or other remote network. For example, the individual may be working remotely, and using a virtual provide network (VPN), which may tunnel traffic through one or more corporate security devices. Several illustrative examples are highlighted below. In a first example, an employee may be working from home, and connecting to the corporate network via their home router. In a second example, an employee may be working from home and connecting to the corporate network via a mobile/cellular network. In a third example, an employee may be working from an employer premises, but may be connected to the corporate network via public Wi-Fi or a mobile/cellular network. In a fourth example, an employee may be working from a location other than the employer premises (e.g., a coffee shop, or other location) and may be connecting to the corporate network via public/commercial wifi or a mobile/cellular network. In a fifth example, an employee may be working from the employer premises and may be connected directly via Wi-Fi or a wired connection to the private corporate network. In a sixth example, an employee may be connected to the Internet in one of the situations described in examples one through four, and may use a VPN to connect to the corporate network so that traffic (including DNS requests) may be partially or fully routed through the corporate network gateway. In a seventh example, an employee may be connected to the Internet as described in one of the situations described in examples one through four, but might not be connected to the corporate VPN. In an eighth example, an employee may be connected using multiple devices (e.g., phone, laptop computer, desktop computer, and/or other devices) from the same location, but one or more of the devices may be connected to the corporate network through different methods described in examples one through five. In a ninth example, an employee may be connected from a single device that supports multiple virtual devices such as virtual machines (VMs), and/or profiles (such as personal profiles, work profiles, and/or other profiles), such that one VM or profile may be connected in a different way that another virtual machine or profile (e.g., such as a work profile connected to the corporate VPN and a personal profile connected directly to the Internet without the VPN).

As described further in greater detail with regard to the illustrative event sequence below, in any or all of these instances, all traffic from the individual's device may be routed through a corporate network gateway, which may be configured as a packet filtering device. For example, the gateway may have packet filtering rules and/or other network rules tailored to the enterprise, which may be applied to the traffic.

In some instances, however, the individual may perform multiple work related tasks and functions using one or more computing devices (e.g., mobile devices, or the like), virtual devices, profiles, applications (e.g., browsers, or the like), and/or systems/applications, which may not be connected to the enterprise network at all times when work related tasks are being performed. Therefore, traffic from the mobile device might not travel through the existing enterprise security apparatuses, including a packet filtering device. Accordingly, in these instances, the packet filtering and/or other network rules might not be applied to traffic from the mobile device, potentially exposing that device and enterprise to malicious attacks vectored through internet traffic. Similarly, because deploying packet filtering functionality is a process that requires hardware performance beyond that available in typical mobile devices, and because packet filtering rules may be routinely and/or otherwise dynamically updated, simply deploying the packet filtering functionality to a mobile device for local operation may be ineffective.

Accordingly, described herein is a solution to this technical problem. The user may be directed to an identity-based DNS routing platform, which may identify the user, and apply routing rules, specific to the user, to traffic to and from the user's mobile device. For example, client devices may establish a secured DNS channel with the identity-based DNS routing platform, over which encrypted DNS query requests and responses may be sent. In some instances, in establishing the secured DNS channel, the client devices may provide the identity-based DNS routing platform with an encrypted DNS certificate, which may be customized on a granular (or other individual) basis to identify the originating devices or users within the protected enterprise environment, and which the identity-based DNS routing platform may use to identify the respective users. Once an identity is determined, the identity-based DNS routing platform may identify routing rules specific to that user (which may, e.g., be defined by the enterprise or otherwise), and provide an encrypted DNS query response based on the routing rules, which may, e.g., indicate a requested IP address, indicate that the requested IP address is blocked, indicate a proxy IP address (e.g., for a proxy server that may monitor traffic between the client device and the target server), and/or other information.

Further described herein is the use of unencrypted DNS query requests to embed identity information (e.g., in contrast to the encrypted DNS methods described above). In some instances, the identity information might not be encrypted within the unencrypted DNS query. For example, the identity information may be embedded in the unencrypted DNS query requests using cleartext. In some instances, the identity information itself may be encrypted within the unencrypted DNS query.

In some instances, multiple identities may be embedded into DNS query requests. For example, multiple systems may add, replace, remove, and/or otherwise modify identities along a path of the DNS query request. In some instances, these multiple identities may be included in a daisy chain for the DNS query request. In some instances, each identity may have a corresponding policy, and thus the attachment of multiple different identities may result in one or more policies that conflict with each other. In these instances, the policies may be reconciled and/or otherwise deconflicted to produce an overall policy for application.

In some instances, various servers (e.g., authoritative servers, or the like) along a DNS path may be analyzed based on a threat context, and the DNS path may be modified accordingly. Similarly, the initial routing of subsequent DNS query requests may be controlled accordingly (which may, in some instances, be for a predetermined period of time, or indefinitely).

In some instances, DNS responses may be modified to enable the routing of traffic through a proxy or gateway for further monitoring/logging. Additionally or alternatively, the DNS responses may be modified to include a local rule to be implemented (e.g., enable blocking, allowing, monitoring/logging, and/or other actions on the client side). In some instances, the DNS responses may be modified to include a shortened time to live (TTL) for a given domain (e.g., because the domain is on a watchlist, little or no cyber threat intelligence is known for the domain, or the like), which may, e.g., cause the domain to be evicted out of a cache in a shortened period of time.

By operating in this way, the DNS infrastructure may be leveraged to perform actions and/or implement a solution for which it was not originally intended. For example, the DNS infrastructure may fundamentally relate to and/or otherwise be used to implement distributed access authoritative record delegation. Furthermore, authoritative servers may be configured such that owners of given domains may control what information is present for such domains. The DNS infrastructure was not, however, originally designed to cause information of a bad domain to be evicted out of a cache within a shortened period of time (e.g., five seconds, or the like), as is described herein. Similarly, the DNS infrastructure was not designed to implement the delivery of intelligence directives, as is described further herein. Both of these functions, among others described herein, may result in improved threat detection and prevention. Accordingly, the systems and methods described herein may leverage the DNS infrastructure to perform actions for which it was not originally intended, thus offering a technical advantage and solution. These and other features are described in further detail below.

FIGS. 1A-IC depict an illustrative computing environment that provides improved traffic routing and monitoring in accordance with one or more example embodiments. Referring to FIG. 1A, computing environment 100 may include one or more computer systems. For example, computing environment 100 may include traffic routing and monitoring platform 102, proxy server 103, first client device 105, second client device 106, third client device 107, target server 108, and gateway server 115.

As described further below, traffic routing and monitoring platform 102 may be a computer system that includes one or more computing devices (e.g., servers, server blades, or the like) and/or other computer components (e.g., processors, memories, communication interfaces) that may be used for traffic routing, traffic monitoring, DNS response, and/or other functions as described further below. In these instances, the traffic routing and monitoring platform 102 may be configured to identify a user based on a security certificate, and apply personalized rules to traffic received from that user (which may, e.g., include allowing, blocking, and/or monitoring the traffic). For example, the traffic routing and monitoring platform may be configured for identity-based DNS routing.

In some instances, traffic routing and monitoring platform 102 may be a DNS server, and may be configured to provide DNS responses to DNS queries. For example, the traffic routing and monitoring platform 102 may be configured to provide an IP address (e.g., an IP address for the target server 108) corresponding to a provided domain name (e.g., a domain name corresponding to the target server 108). In some instances, a separate DNS server, different than the traffic routing and monitoring platform 102 may be used to process the DNS queries.

Proxy server 103 may be and/or otherwise include one or more computing devices (e.g., servers, server blades, and/or other devices) and/or other computer components (e.g., processors, memories, communication interfaces) that may function as an intermediate between client devices (e.g., first client device 105, second client device 106, third client device 107, and/or other client devices) and the target server 108. For example, proxy server 103 may be configured to receive traffic, directed to the target server 108, and to log both outbound and inbound traffic to the target server 108 accordingly. The proxy server 103 may further be configured to share these traffic logs with the traffic routing and monitoring platform 102.

First client device 105 may be and/or otherwise include one or more devices such as a laptop computer, desktop computer, mobile device, tablet, smartphone, and/or other personal computing device. For example, the first client device 105 may be a computing device configured to provide encrypted DNS query requests (e.g., to the traffic routing and monitoring platform 102), and receive encrypted DNS query responses accordingly. Furthermore, the first client device 105 may be configured to access IP addresses, once received as an encrypted DNS query response. In some instances, the first client device 105 may be configured to establish a secure session with the traffic routing and monitoring platform 102 (e.g., during which the DNS queries may be sent). In these instances, the first client device 105 may provide a security certificate, which may be validated and used to establish the secure session. In some instances, the first client device 105 may be configured to generate or otherwise receive the security certificate, which may, in some instances, identify a user of the first client device 105 (e.g., a first user). In some instances, first client device 105 may be configured to display one or more graphical user interfaces (e.g., requested data interfaces, blocked traffic interfaces, and/or other interfaces).

Second client device 106 may be and/or otherwise include one or more devices such as a laptop computer, desktop computer, mobile device, tablet, smartphone, and/or other personal computing device. For example, the second client device 106 may be a computing device configured to provide encrypted DNS query requests (e.g., to the traffic routing and monitoring platform 102), and receive encrypted DNS query responses accordingly. Furthermore, the second client device 106 may be configured to access IP addresses, once received as an encrypted DNS query response. In some instances, the second client device 106 may be configured to establish a secure session with the traffic routing and monitoring platform 102 (e.g., during which the DNS queries may be sent). In these instances, the second client device 106 may provide a security certificate, which may be validated and used to establish the secure session. In some instances, the second client device 106 may be configured to generate or otherwise receive the security certificate, which may, in some instances, identify a user of the second client device 106 (e.g., a second user, different than the first user). In some instances, second client device 106 may be configured to display one or more graphical user interfaces (e.g., requested data interfaces, blocked traffic interfaces, and/or other interfaces).

Third client device 107 may be and/or otherwise include one or more devices such as a laptop computer, desktop computer, mobile device, tablet, smartphone, and/or other personal computing device. For example, the third client device 107 may be a computing device configured to provide encrypted DNS query requests (e.g., to the traffic routing and monitoring platform 102), and receive encrypted DNS query responses accordingly. Furthermore, the third client device 107 may be configured to access IP addresses, once received as an encrypted DNS query response. In some instances, the third client device 107 may be configured to establish a secure session with the traffic routing and monitoring platform 102 (e.g., during which the DNS queries may be sent). In these instances, the third client device 107 may provide a security certificate, which may be validated and/or used to establish the secure session. In some instances, the third client device 107 may be configured to generate or otherwise receive the security certificate, which may, in some instances, identify a user of the third client device 107 (e.g., a third user, different than the first or second user). In some instances, third client device 107 may be configured to display one or more graphical user interfaces (e.g., requested data interfaces, blocked traffic interfaces, and/or other interfaces).

Target server 108 may be and/or otherwise include one or more computing devices (e.g., servers, server blades, and/or other devices) and/or other computer components (e.g., processors, memories, communication interfaces) that may be configured to provide data responsive to client requests.

In some instances, the target server 108 may be configured to communicate with client devices (e.g., first client device 105, second client device 106, third client device 107, and/or other client devices) directly, or may communicate via the proxy server 103. In some instances, the target server 108 be correspond to a particular domain name (e.g., "domain-.com") and have a corresponding IP address (e.g., 123.123.123.123).

Gateway server 115 may be and/or otherwise include one or more computing devices (e.g., servers, server blades, and/or other devices) and/or other computer components (e.g., processors, memories, communication interfaces) that may function as an intermediate between client devices (e.g., first client device 105, second client device 106, third client device 107, and/or other client devices) and the target server 108. For example, gateway server 115 may be configured to receive traffic, directed to the target server 108, and to log both outbound and inbound traffic to the target server 108 accordingly. The gateway server 115 may further be configured to share these traffic logs with the traffic routing and monitoring platform 102.

Computing environment 100 also may include one or more networks, which may interconnect traffic routing and monitoring platform 102, proxy server 103, first client device 105, second client device 106, third client device 107, target server 108, gateway server 115. For example, computing environment 100 may include a network 101 (which may interconnect, e.g., traffic routing and monitoring platform 102, proxy server 103, first client device 105, second client device 106, third client device 107, target server 108, and/or gateway server 115).

In one or more arrangements, traffic routing and monitoring platform 102, proxy server 103, first client device 105, second client device 106, third client device 107, target server 108, and/or gateway server 115 may be any type of computing device capable of sending and/or receiving requests and processing the requests accordingly. For example, traffic routing and monitoring platform 102, proxy server 103, first client device 105, second client device 106, third client device 107, target server 108, gateway server 115, and/or the other systems included in computing environment 100 may, in some instances, be and/or include server computers, desktop computers, laptop computers, tablet computers, smart phones, and/or other devices that may include one or more processors, memories, communication interfaces, storage devices, and/or other components. As noted above, and as illustrated in greater detail below, any and/or all of traffic routing and monitoring platform 102, proxy server 103, first client device 105, second client device 106, third client device 107, target server 108, and/or gateway server 115 may, in some instances, be special-purpose computing devices configured to perform specific functions.

Figure 1B:
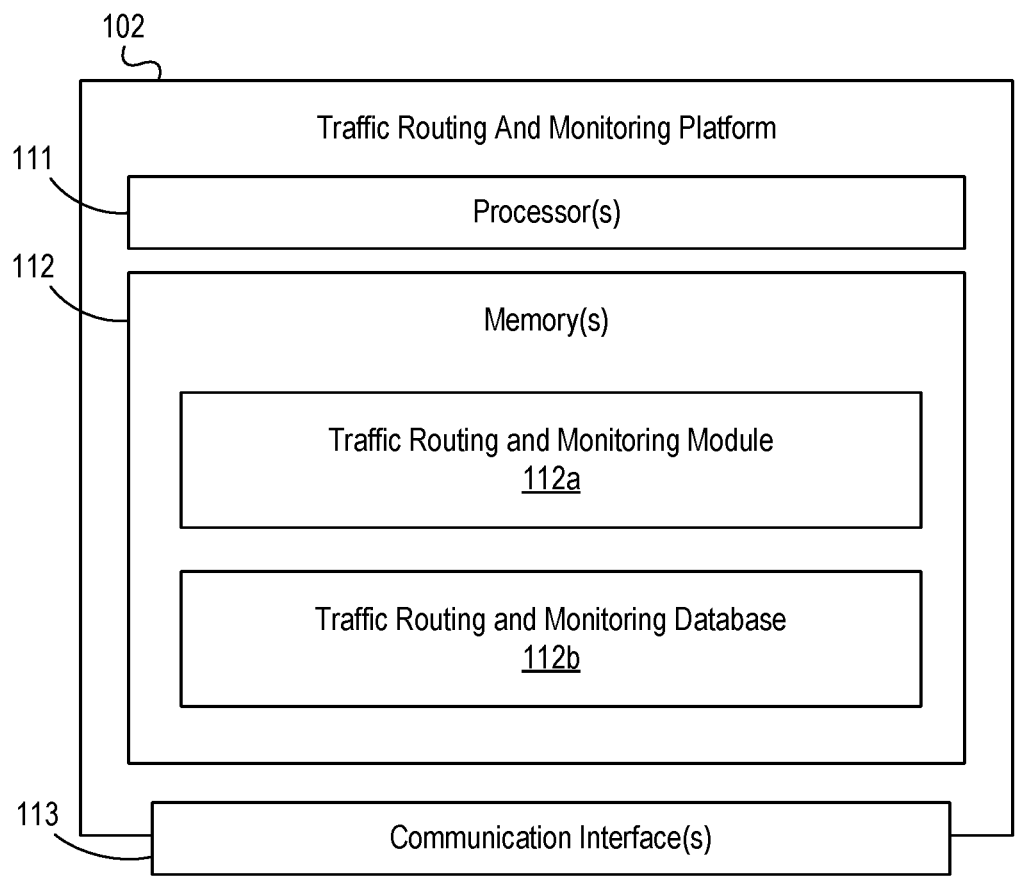

Referring to FIG. 1B, traffic routing and monitoring platform 102 may include one or more processors 111, memory 112, and communication interface 113. A data bus may interconnect processor 111, memory 112, and communication interface 113. Communication interface 113 may be a network interface configured to support communication between traffic routing and monitoring platform 102 and one or more networks (e.g., network 101, or the like). Memory 112 may include one or more program modules having instructions that when executed by processor 111 cause traffic routing and monitoring platform 102 to perform one or more functions described herein and/or one or more databases that may store and/or otherwise maintain information that may be used by such program modules and/or processor 111. In some instances, the one or more program modules and/or databases may be stored by and/or maintained in different memory units of traffic routing and monitoring platform 102 and/or by different computing devices that may form and/or otherwise make up traffic routing and monitoring platform 102. For example, memory 112 may have, host, store, and/or include traffic routing and monitoring module 112a and/or traffic routing and monitoring database 112b.

Traffic routing and monitoring module 112a may have instructions that direct and/or cause traffic routing and monitoring platform 102 to generate apply user specific rules/policies to DNS queries and/or other traffic based on user identity, and may, in some instances, do so by identifying users based on a security certificate. Traffic routing and monitoring database 112b may store correlations between user identities, corresponding traffic routing/monitoring rules, and/or actions corresponding to the traffic routing monitoring rules, which may, e.g., be used by the traffic routing and monitoring module 112a and/or the traffic routing and monitoring platform 102 to execute advanced techniques for traffic routing and monitoring, as discussed in greater detail below.

Figure 1C:
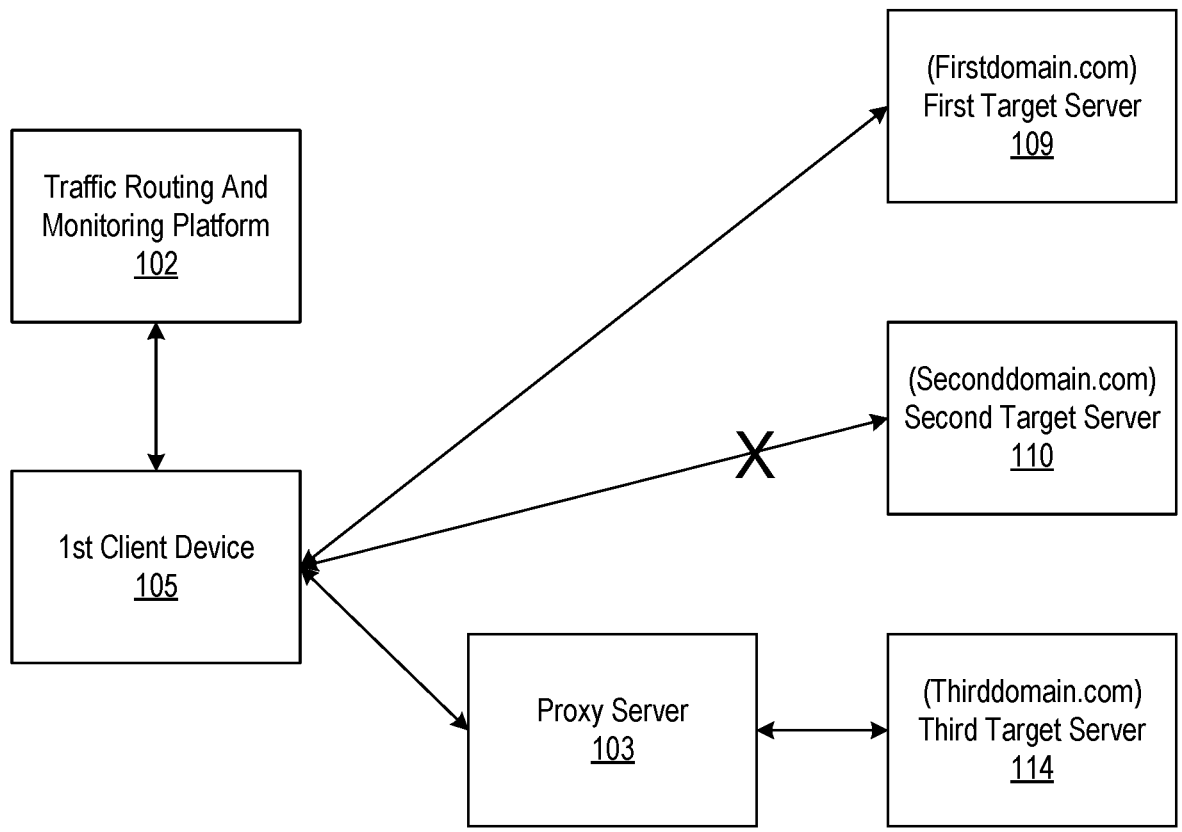

Referring to FIG. 1C, in addition or as an alternative to the configuration illustrated in FIG. 1A, a configuration as depicted in FIG. 1C may be implemented. For example, in addition or as an alternative to having multiple client devices requesting access to a common target server/domain (e.g., target server 108) as illustrated in FIG. 1A, a single client device (e.g., client device 105 may attempt to access multiple target servers/domains (e.g., target servers 109-111, which may correspond to a first, second, and third domain respectively). For example, first, second, and third target servers 109, 110, and 114 may be similar to target server 108, as described above, but may correspond to different domains. In these instances, the first client device 105 may communicate with the traffic routing and monitoring platform 102 (e.g., via an encrypted DNS session), which may identify domain name filtering rules, specific to the user of the first client device 105, for each of the first, second, and third domains.

For example, in response to an encrypted DNS query request from the first client device 105 requesting access to the first target server 109, the traffic routing and monitoring platform 102 may identify, using the domain name filtering rules, that traffic between the first client device 105 and the first target server 109 should be allowed, and may allow access accordingly (e.g., by providing an encrypted DNS query response that includes an IP address for the first target server 109). In these instances, the first client device 105 may access the first target server 109 using the IP address accordingly. This may be similar to the actions performed at steps 202-210, as described further below.

Additionally or alternatively, in response to an encrypted DNS query request from the first client device 105 requesting access to the second target server 110, the traffic routing and monitoring platform 102 may identify, using the domain name filtering rules, that traffic between the first client device 105 and the second target server 110 should be blocked, and may block access accordingly (e.g., by sending an encrypted DNS query response indicating that the second target server 110 is not accessible rather than an IP address for the second target server). In these instances, the first client device 105 might not be able to access the second target server 110. This may be similar to the actions performed at steps 211-218, as described further below.

Additionally or alternatively, in response to an encrypted DNS query request from the first client device 105 requesting access to the third target server 114, the traffic routing and monitoring platform 102 may identify, using the domain name filtering rules, that traffic between the first client device 105 and the third target server 114 should be logged, and may log traffic accordingly (e.g., by sending an encrypted DNS query response, including an IP address for the proxy server 103, which may, in some instances, be appended or otherwise attached to the IP address for the third target server 114). In these instances, traffic between the first client device 105 and the third target server 114 may be transmitted through the proxy server 103, which may monitor and log the traffic accordingly. This may be similar to the actions performed at steps 219-234, as described further below.

Figure 2A:
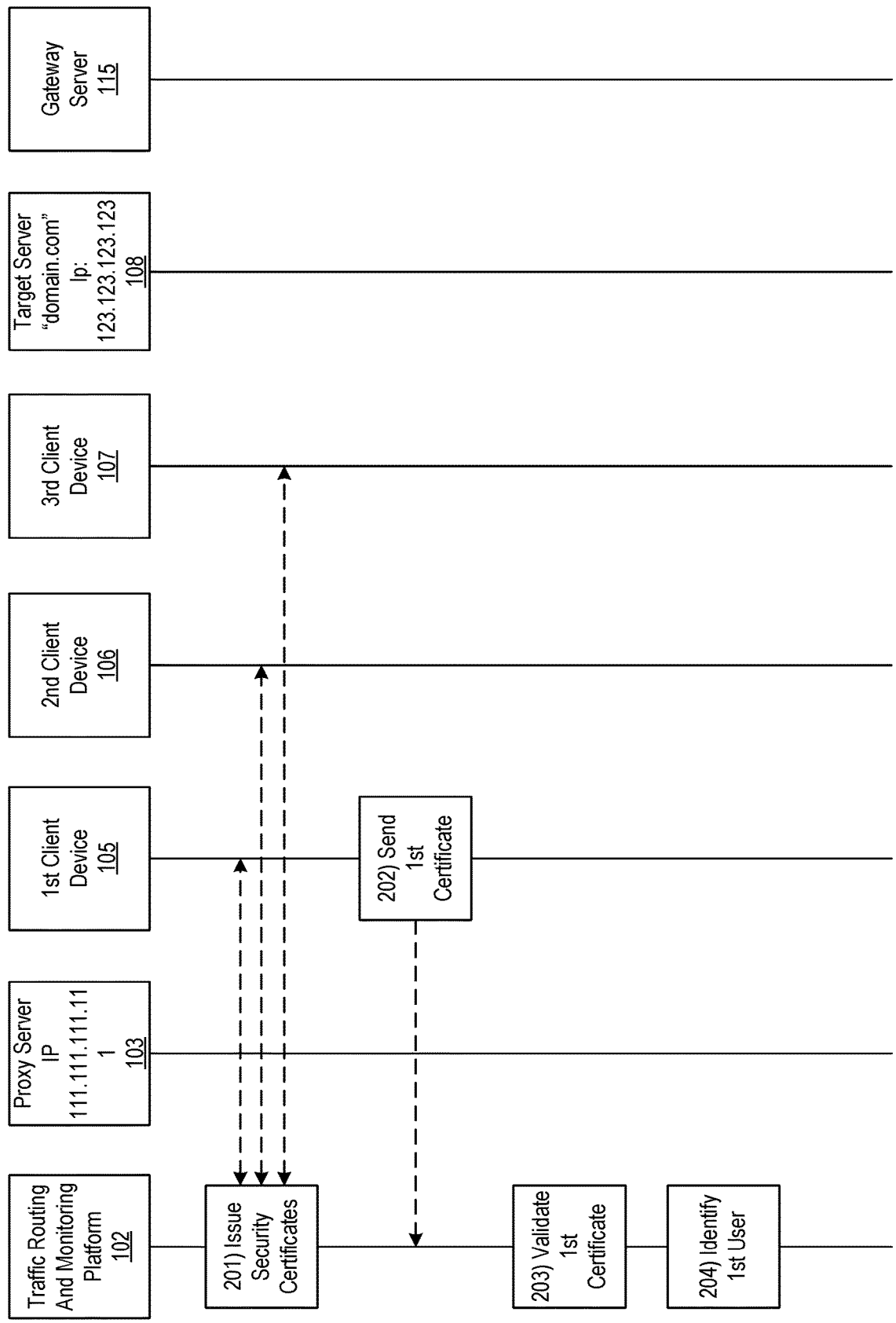

FIGS. 2A-2I depict an illustrative event sequence for traffic routing and monitoring in accordance with one or more example embodiments. Referring to FIG. 2A, at step 201, the traffic routing and monitoring platform 102 may issue security certificates to the first client device 105, the second client device 106, the third client device 107, and/or other client devices (e.g., a first security certificate, second security certificate, and/or third security certificate respectively). Additionally or alternatively, the client devices (e.g., first client device 105, second client device 106, and/or third client device 107) may create the security certificates themselves and/or via interaction with another computing device. In some instances, these security certificates may include an identity, a network, an organization, a geographic location, and/or other information of a user of the corresponding client devices. For example, the security certificates may be customized on a granular (or individual) basis to identify the client devices. In some instances, the security certificates may be used to establish a secured DNS channel between the client devices and the traffic routing and monitoring platform 102. For example, domain name system security extensions (DNSSEC) may use security certificates to sign DNS data such that it may be tamper proof. Similarly, the security certificates may be used to establish an encrypted TLS or similar encrypted tunnel through which DNS communications may be made between the client devices and the traffic routing and monitoring platform 102.

In some instances, the traffic routing and monitoring platform 102 may issue the security certificates at the encryption protocol level, such as the TLS or the "S" portion of DNS-over-HTTPS (hypertext transfer protocol secure). In these instances, user/device identity certificates may be issued that are natively supported by TLS authentication. In some instances, DNS-over-HTTPS certificates might not suggest the use of such certificates to determine a client identity, but rather only to authorize a secure communication tunnel. Accordingly, in these instances certificates might not be deployed on a per-user/device basis. In contrast, the certificates as described herein may be deployed on a per-user/device basis to facilitate use in client identification. For example, it may be important to be able to differentiate between the user and a device, as the same user may be connecting from multiple devices (including virtual devices, profiles, applications, and/or other devices), and different DNS filtering policies may need to be applied depending on the device. Additionally, some devices may be more trusted than others, such as a corporate issued laptop, which may be more trusted than a user's personal phone. Furthermore, in some instances, a device may be used by multiple users. Accordingly, a certificate may be used to specifically identify the user (e.g., such as a user identity certificate), or a device (device identity certificate), or both the user and device (e.g., a certificate issued to the user on a specific device).

In some instances, in addition or as an alternative to issuing a certificate, the traffic routing and monitoring platform 102 may issue one or more user identifiers, which may be embedded into uniform resource locators (URLs). For example, the traffic routing and monitoring platform 102 may use DNS over HTTPS (DoH) to associate the identifier with a query. In some instances, these user identifiers may be specific to a combination of attributes corresponding to a user (e.g., user, profile, application operating system, device type, network type, IP address, geographic context, or the like). In doing so, multiple different identities may be assigned to a single user, which may be used to trigger different policies for a single user. For example, a single user may have two separate identifiers—one for each of two browsers used, and different policies may be applied during the use of each browser.

At step 202, once the first security certificate has been issued to the first client device 105, the first client device 105 may send the first security certificate and a request to establish a secure session to the traffic routing and monitoring platform 102. For example, the first client device 105 may send the first security certificate and the request to establish the secure session using a wired or wireless connection with the traffic routing and monitoring platform 102.

At step 203, the traffic routing and monitoring platform 102 may validate the first security certificate, sent at step 202. In instances where the traffic routing and monitoring platform 102 validates the first security certificate, the traffic routing and monitoring platform 102 may establish a secure session with the first client device 105 (and may then proceed to step 204). Otherwise, if the traffic routing and monitoring platform 102 is unable to validate the first security certificate, the traffic routing and monitoring platform 102 might not proceed to step 204, and may instead wait until a security certificate is received and validated from the first client device 105.

In some instances, in validating the first security certificate and establishing the secure session, the traffic routing and monitoring platform 102 may conduct an encrypted session handshake (e.g., such as a transport layer security (TLS), or other handshake) with the first client device 105. In these instances, the traffic routing and monitoring platform 102 and the first client device 105 may initiate an encrypted DNS process (which may include validation of the first security certificate in compliance with RFC 7858 and/or RFC 8310), during which encrypted DNS query requests and encrypted DNS query responses may be exchanged between the traffic routing and monitoring platform 102 and the first client device 105. For example, the first client device 105 may notify the traffic routing and monitoring platform 102 of its TLS capabilities (which may, e.g., be included in the first security certificate), and the traffic routing and monitoring platform 102 may respond to confirm TLS parameters that may be used to secure the TLS channel. For example, the traffic routing and monitoring platform 102 may send a certificate identifying the traffic routing and monitoring platform 102, and a message including a digital signature of the traffic routing and monitoring platform 102, which may be verified by the first client device 105 (e.g., by checking a trusted authority list, public key pinning, and/or other methods). Once this encrypted session handshake is complete, the traffic routing and monitoring platform 102 may exchange encrypted messages (e.g., DNS query requests, DNS query replies, and/or other information).

At step 204, the traffic routing and monitoring platform 102 may identify a user of the first client device 105. For example, based on the first security certificate, the traffic routing and monitoring platform 102 may identify the first user. For example, authentication may be supported using mutual X509 certificate authentication. In these instances, DNS over TLS may be used to utilize encryption of traffic on user datagram protocol (UDP) instead of the HTTP protocol. By managing the public/private key infrastructure, the first user's identity may be securely determined during an exchange process between the first client device 105 and the traffic routing and monitoring platform 102.

For example, the traffic routing and monitoring platform 102 may identify the first user using mutual X509 certificate authentication using a DNS over TLS (e.g., encryption over UDP) protocol. In these instances, the enterprise environment may have an internal/local resolver (e.g., DNS with AD). The first user may be provided with instructions for the local/internal resolver to resolve to the traffic routing and monitoring platform 102. In these instances, DNS over TLS may be used where a higher level of security is desired. The user may be provided with the client certificate, along with instructions for the local resolver to resolve to the traffic routing and monitoring platform 102 using DNS over TLS. In these instances, instructions may be provided to block outbound standard DNS and DNS over HTTPS. Once received, the traffic routing and monitoring platform 102 may identify the first user based on the client certificate. Such mutual authentication may offer technical advantages over other methods, such as increased security.

Although identification of the first user is described at step 204 (e.g., prior to sending of a first identity embedded DNS query request), it may, in some instances, be performed based on information received in the first identity embedded DNS query request as described further below at step 205. Accordingly, identification of the first user may occur before or after receipt of the first identity embedded DNS query request without departing from the scope of the disclosure.

Figure 2B:
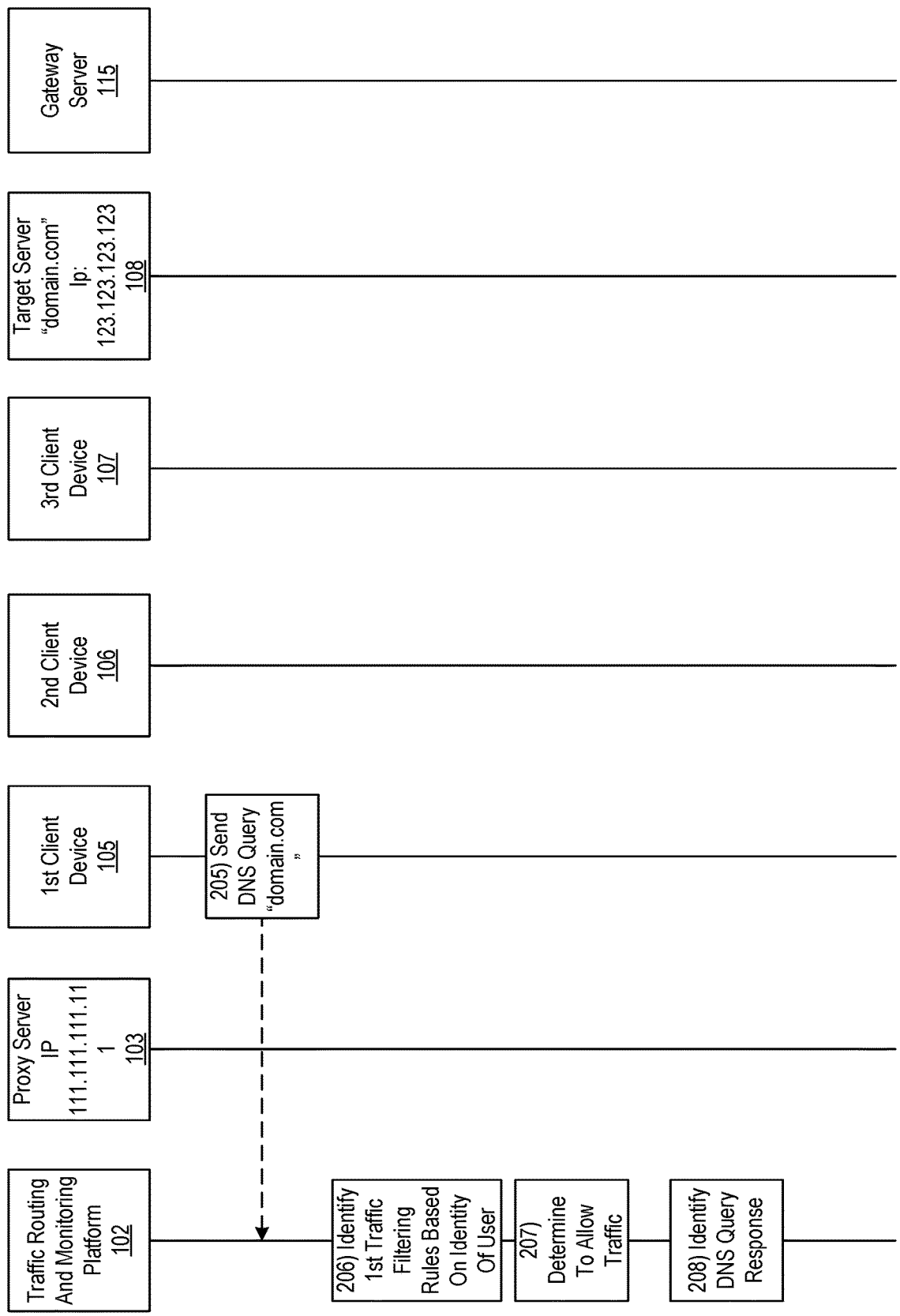

Referring to FIG. 2B, at step 205, once the secure session has been established between the first client device 105 and the traffic routing and monitoring platform 102, the first client device 105 may send a first embedded DNS request (e.g., a fully encrypted DNS request, partially encrypted DNS request, non-encrypted DNS request, or the like where a user identity is present in a certificate, embedded into a DNS protocol itself, and/or otherwise embedded) to the traffic routing and monitoring platform 102. For example, the first client device 105 may send a domain name for the target server 108 (e.g., domain.com), and may request the IP address for the target server 108. For example, the first client device 105 may establish a TLS session over which the first identity embedded DNS query request made be made securely. For example, the TLS session may be over transmission control protocol (TCP), user datagram protocol (UDP), and/or otherwise. Additionally or alternatively, the first client device 105 may establish an hypertext transfer protocol (HTTP) session over which DNS query requests may be made. For example, the HTTP session may be unencrypted over TCP, UDP, or the like, or encrypted by a TLS session. In some instances, the first client device 105 (e.g., a network interface of the first client device 105) may be preconfigured to direct DNS queries to the traffic routing and monitoring platform 102. For example, the first security certificate may be installed at the first client device 105 prior to sending of the first identity embedded DNS query request. In some instances, when sending the first identity embedded DNS query request, the first client device 105 may be accessing the internet from outside of a protected network corresponding to the traffic routing and monitoring platform 102, and/or proxy server 103.

In some instances, where the first identity embedded DNS query request is encrypted, the traffic routing and monitoring platform 102 may use the first security certificate to decrypt the first identity embedded DNS query request. In these instances, if the first security certificate has not yet been received by the traffic routing and monitoring platform 102, the traffic routing and monitoring platform 102 may prompt the first client device 105 to provide the first security certificate.

In some instances, in addition or as an alternative to identifying the first user based on the certificate as described above at step 205, the traffic routing and monitoring platform 102 may identify and/or further confirm an identity of the first user based on information embedded into the first identity embedded DNS query request itself, such as an IP of the first user (e.g., using DNS over HTTPS). In these instances, the first user may configure the first client device 105 to communicate with the traffic routing and monitoring platform 102. For example, the first user may configure DNS settings within dynamic host configuration protocol (DHCP) router settings by manually setting the traffic routing and monitoring platform 102 as the DNS (e.g., DNS over UDP). In these instances, when the first identity embedded DNS query request is sent, the traffic routing and monitoring platform 102 may identify the first user based on an IP for the first user, as embedded in the first identity embedded DNS query request.

Such a method may have various technical advantages. For example, it may be the most simple form of authentication, as the traffic routing and monitoring platform 102 might need to only identify a source IP of the first identity embedded DNS query request. Additionally, a number of different load balancers all support transparent pass through of UDP packets so that the client IP may be preserved for a DNS load balancer service. For example, a DNS request (such as the first identity embedded DNS query request) may be received at a single DNS load balancer IP address, and the DNS load balancer may extract the user identity, device identity, location information, and/or other information. In these instances, the DNS load balancer may further pass this information on to DNS servers on the back end (e.g., either generally or to specific servers, such as the traffic routing and monitoring platform 102, based on the information), which may be configured to handle a specific customer, client, or the like. In doing so, address privacy and regulatory concerns (general data protection regulation concerns, or other concerns where the service and/or data associated with that service should always be directed to, processed by, and/or stored on certain DNS server infrastructure) may be addressed.

In some instances, the DNS load balancer service may have been modified to scrape IP addresses from the UDP packets, and in doing so may configure the traffic routing and monitoring platform 102 to provide a technical improvement over traditional DNS systems. More specifically, because many users may map to, for example, a single enterprise network IP address and/or because IP addresses may change rapidly (e.g., due to mobile devices transitioning between cell towers, or the like), the client's connecting source IP address might not be an ideal method for user identification. Accordingly, the methods described herein may identify the user, the device, the location, and/or other information and pass this from the client device (e.g., first client device 105) to the traffic routing and monitoring platform 102 as part of a DNS request (e.g., the first identity embedded DNS query request) and/or the tunnel through which the DNS request was made. This DNS load balancer service may support forwarding of a client IP through several different methods, such as proxy protocol, which may preserve the original UDP message headers and might not affect caching on the DNS load balancer service (e.g., as described in the DoH RFC 8484 and RFC 6570 standards with regard to uniform resource locator (URI) templates).

Additionally or alternatively, the traffic routing and monitoring platform 102 may identify the first user using URI templates. For example, authentication on DNS-over-HTTPS may be supported using URI templates. Each client may be given a unique URI template that may contain an access key. In some instances, the access key may be encrypted, not encrypted, or partially encrypted. The encrypted access key may contain enough information to identify the user to the traffic routing and monitoring platform 102 so that routing to the proper name server(s) occurs and the appropriate cyber threat intelligence (CTI) is applied based on the first client's needs. In these instances, the traffic routing and monitoring platform 102 may pass the access key (or subsets of the access key) along to the corresponding name server(s) so that the name server(s) may apply the appropriate CTI for that user. In addition or as an alternative to identifying the first user using a unique URI template that contains at least an access key associated with the first user, the traffic routing and monitoring platform 102 may identify the first user using one or more of: an access key embedded into a standard DNS request (e.g., in the EDNS field, or otherwise embedded), a certificate assigned to a device of the first client and/or other users, an IP address that is potentially (though not necessarily) uniquely associated with the first user and/or other users, and/or an access key embedded into a wrapper protocol that transports the first identity embedded DNS query request.

In some instances, the first user may have manually configured the first client device 105 to point to the traffic routing and monitoring platform 102. To do so, the first user may modify their browser settings using a DNS-over-HTTPS (DoH) URI template that includes a user specific access key embedded in the path. In these instances, the first user may perform initial authentication to obtain the above described access key. When the access key is provided to the traffic routing and monitoring platform 102, the traffic routing and monitoring platform 102 may identify the first user based on the access key.

In instances where the first user is an enterprise user, the enterprise environment may have an internal/local resolver (e.g., a DNS with directory services (e.g., such as Microsoft active directory)). In these instances, the first user may be provided with instructions for the local resolver to point to the traffic routing and monitoring platform 102. In some instances, these instructions may be manually downloaded by the first user, assigned to the first user (and/or a corresponding user device or application) via a certificate, automatically deployed at the operating system level, preconfigured on the first client device 105 (e.g., based on installation of an enterprise security profile on the first client device 105), and/or otherwise, and may, e.g., cause the first client device 105 to direct DNS requests to an IP address of the traffic routing and monitoring platform 102. For example, the first user may be provided with configuration data or an application that may provide functionality for authenticating the first user to the traffic routing and monitoring platform 102, so as to enabling downloading of a certificate including the instructions from the traffic routing and monitoring platform 102. Once downloaded, the first client device 105 may then use a browser and/or other application to automatically present the certificate when prompted to do so. In some instances, different certificates may be provided for use with different browsers. For example, different policies may be applied to the same user (e.g., work and personal profiles, or the like) and/or different user (e.g., parents vs. kids, or the like) on the same device. In some instances, the certificates may similarly include password protection, prompting the first user to provide a corresponding password and/or other access key along with presentation of the certificate.

Similar to the home/individual use case described above, a DoH URI template may be provided to the traffic routing and monitoring platform 102 through this configuration, and the traffic routing and monitoring platform 102 may identify the first user based on an embedded access key. In some instances, where DoH is implemented, the traffic routing and monitoring platform 102 may be instructed to block outbound standard DNS and/or DoT queries.

In the cases of user identification based on information in the first identity embedded DNS query request, user and/or device identity information may be embedded in the first identity embedded DNS query request at the DNS query level (including the DNS protocol and DNS-over-HTTP, before encryption into DNS-over-HTTPS) and/or the encryption protocol level (where the DNS protocol or DNS-over HTTP is encapsulated before it gets encrypted into DNS-over-HTTPS). At the DNS protocol level, the RFC 6891 Extension Mechanism for DNS (EDNS(0)) may be used to attach a custom payload (i.e., the user/device identity info) to the DNS query itself, which may allow transparent leverage, up/down the OSI layer from lower to higher protocol levels, up/down the DNS server hierarchy, up/down the hierarchy for the traffic routing and monitoring platform 102, and/or otherwise), and/or otherwise. For example, a vanilla/unconfigured client may query a local resolver over the unencrypted DNS protocol, and the local resolver could embed the identity of the client into EDNS of its query, wrap it in TLS, and forward that identity information as part of the DNS query over DoT. For example, a client certificate may be issued to a device (e.g., first client device 105) where that certificate persists on the device regardless of the user who is using/authenticated on that device. The user identity may be embedded in an access key incorporated into a URL template, which may be identical across multiple devices that the user is using. Then the combination of user identity from the URL template and device identity from the certificate may enable unique identification that the user is on a particular device, which may, in turn, enable the enforcement of a first policy on a first device (e.g., a mobile-oriented CTI policy on a phone), a second policy on a second device (e.g., an operating system specific CTI policy for a computing device), and so on. In these instances, a remote resolver (e.g., the traffic routing and monitoring platform 102) may extract the identity information from EDNS, and apply an appropriate filtering policy (as described further below). Additionally or alternatively, a configured DNS-over-HTTPS client (e.g., the first client device 105) may use a client certificate to convey its device identity to the traffic routing and monitoring platform 102 and simultaneously use a URL template with embedded user identity information to convey its identity to the traffic routing and monitoring platform 102. This may allow the traffic routing and monitoring platform 102 to apply different policies to the same user logging in from different devices (e.g., mobile device, desktop device, multiple users on a shared workstation, or the like), and/or may apply a different policy for an authenticated device with no authenticated user (e.g., not logged in) versus authenticated devices with an authenticated user versus an unauthenticated device with an authenticated user. This flexibility may allow support of different client capabilities, such as older clients that may support only native DNS protocols and new clients that support, for example, DoT but not DoH. In doing so, such clients may translocate identity information into queries that traverse the Internet to the traffic routing and monitoring platform 102 in the most secure and private manner possible.

In some instances, the first client device 105 may use DoH to send, along with the first identity embedded DNS query request, the user identifier, described above at step 201, which may, in some instances, indicate multiple attributes of a user identity (e.g., a profile, application, operating system, device, network, cluster, wide area network (WAN) IP and/or other identifier). In some instances, these attributes of the user identity sent from the first client device 105 may correspond to a profile (e.g., a first identity). For example, the user identifier may be included in a URL (e.g., an HTTP header, or the like) corresponding to the first identity embedded DNS query request. For example, the user identifier may be a URL prefix that may be assigned to the user upon enrollment of the user with the traffic routing and monitoring platform 102. In some instances, this user identifier may be a fixed value, which may, e.g., be assigned to the user and stored. In some instances, the user identifier may be dynamically adjusted using, for example, an application stored at the first client device 105 (e.g., an application to which the user previously authenticated). In some instances, the user identifier may be generated/assigned at the same time as the first security certificate, or at a later time. In some instances, this user identifier may be sent along with the first security certificate described above at steps 201-203 (which may, e.g., enable additional identity information to be sent when compared to transmission of the first security certificate in itself). In some instances, the user identifier(s) may be sent in addition or alternative to the first security certificate.

In some instances, the first identity embedded DNS query request may be routed to the traffic routing and monitoring platform 102 via one or more other devices (such as a local DNS resolver, or the like). In these instances, a second identity (e.g., an identity corresponding to the intermediary device) may be attached to the first identity embedded DNS query request. For example, the intermediary device may be associated with an enterprise, and thus an identity of the enterprise may be attached to the first identity embedded DNS query request. Accordingly, one or more identities may be attached to the first identity embedded DNS query request along its path between the first client device 105 and the traffic routing and monitoring platform 102.

As a particular example, the first identity may indicate a particular user identity and a browser on which the user is operating, and the second identity may identity a corporate entity. Although first and second identities are described, in some instances, a single identity, or any other number of identities, may be included in the first identity embedded DNS query request without departing from the disclosure. Additional examples of these user identities are described below with regard to FIG. 4.

In some instances, if the first client device 105 is not configured for DoT or DoH communication, the first client device 105 may embed these identities into the first identity embedded DNS query request using cleartext. For example, the first client device 105 may be customized and/or otherwise configured to perform such embedding. In some instances, cleartext identity information may be embedded in a non-encrypted DNS request (e.g., in a field of the DNS request protocol, or the like). Alternatively, identity information may be encrypted (in full or in part), and then embedded into an non-encrypted DNS request. For example, the identity information may be run through an encryption protocol prior to being embedded within the DNS request. In some instances, the first client device 105 may communicate with a local resolver (which may, e.g., be similar to the traffic routing and monitoring platform 102), and may convey unencrypted (in full or in part) identity information as part of the communication. The local resolver may then take the received unencrypted identity information, in some instances, add additional identity information (e.g., about the first client device 105, the local resolver, and/or otherwise), and encrypt all of the identity information. Then any requests from the local resolvers to other resolvers (which may, e.g., be configured similar to the traffic routing and monitoring platform 102) may be sent using cleartext with encrypted identities.

In these instances, if the DNS requests are captured, the identity information may remain protected (e.g., against modification of the identity information, user identification based on the identity information, or the like) due to the encryption. Furthermore, because the paths of DNS requests might not be controlled as they travel upstream, outside of an enterprise infrastructure, or the like, there may be scenarios in which certain protocols (e.g., DoT communication, DoH communication, or the like) might not be supported or otherwise permitted. For example, security upgrading or downgrading may occur within an enterprise. For example, the enterprise may use encrypted DNS internally, but the same protocols (e.g., encryption, or the like) might not be supported upstream once DNS requests pass through the internal resolver. Thus, the method for conveying the identity information may change through the path of the DNS request (e.g., changing encryption levels associated with domains of the DNS request, or the like). Additionally or alternatively, the protocol itself may be changed (e.g., from DNS over UDP to DoT, to DoH, and back to UDP, or the like). Nevertheless, by including the identity information in a field of the DNS request, such information may be conveyed regardless of upgrading/downgrading of protocols along the path of the DNS request.

Furthermore, it may be advantageous to utilize standard fields of the DNS request protocol to convey identity information in an encrypted manner. This may further permit the embedding of identity information at the client side (e.g., by the first client device 105) for communication to the server side (e.g., to the traffic routing and monitoring platform 102), thus allowing identity to be embedded and transmitting from an originator of a DNS request.

Additionally or alternatively, the local resolver may be configured to strip or otherwise remove any identity information, received in the DNS request, prior to forwarding the DNS request (e.g., in instances where the DNS request is going out to the public, or the like), to protect the identity information and/or other privacy information from being leaked. This may be especially advantageous in instances where a client (e.g., first client device 105) fails to encrypt the identity information.

In some instances, the traffic routing and monitoring platform 102 may modify the first identity embedded DNS query request as it is received. For example, in some instances, a malicious user may submit a non-compliant DNS query request (e.g., using non-compliant or otherwise non-permissible characters). In these instances, however such non-compliant DNS query requests might not ordinarily be filtered out. Accordingly, it may be advantageous to transform or otherwise modify such DNS query requests upon receipt. For example, the traffic routing and monitoring platform 102 may extract a domain name and re-encode the domain name into a subsequent DNS query request. This process may enable a payload transformation, which may, e.g., be exploited by the malicious actor to subvert filtering by the traffic routing and monitoring platform 102.

To avoid such exploitation, the traffic routing and monitoring platform 102 may modify the DNS query request to normalize (e.g., to Punycode, or the like), standardize, and/or otherwise transform the DNS query request to facilitate CTI matches so as to enforce intelligence (e.g., before routing the DNS query requests upstream, or the like) that otherwise may be circumvented without such transformation. Further, such techniques may enable the conversion of non-compliant DNS query requests into compliant DNS query requests to apply intelligence accordingly. Based on such intelligence, the traffic routing and monitoring platform 102 may identify further actions to take with regard to the DNS query request such as redirect the request, allow the request to proceed, or the like.

At step 206, the traffic routing and monitoring platform 102 may identify first traffic routing rules, based on the identity of the first user. For example, the traffic routing and monitoring platform 102 may maintain a database of traffic routing rules corresponding to each of a plurality of users, and may identify (e.g., by indexing the database) first traffic routing rules corresponding to the first user. In some instances, in identifying the first traffic routing rules, the traffic routing and monitoring platform 102 may identify domain matching criteria and corresponding actions to be performed for each of a plurality of domain names (including domain name sent in the first identity embedded DNS query request), both of which may be specific to the first user. For example, the first traffic routing rules may be specific to an organization of the first user, a subscription level of the first user (which may, e.g., provide a unique level of security and/or be selected or otherwise enrolled in by the first user), a geographic location, and/or other user characteristics. In other instances, the first traffic routing rules may be common between all network users (including the first user). In some instances, the subscription level of the first user may indicate whether a unique policy, specific to the first user, should be applied, or rather whether a generic policy should be applied. In some instances, in identifying the domain matching criteria of the first traffic routing rules, the traffic routing and monitoring platform 102 may identify a whitelist, blacklist, and/or watchlist specific to the first user. In these instances, each of the plurality of domain names may be included on one of the whitelist, blacklist, and watchlist. In some instances, the first traffic routing rules may be associated with a protected network (e.g., an enterprise or other secure network).

In some instances, multiple sets of traffic filtering rules may apply to the first user. For example, in instances where a user identifier (such as a URL prefix) is embedded in the first identity embedded DNS query request to indicate additional attributes of the first user, different sets of traffic filtering rules may be applied based on the user identifier. For example, different traffic filtering rules may apply to the first user when they use a first browser than when the first user uses a second browser. Accordingly, in identifying the first traffic filtering rules, the traffic routing and monitoring platform 102 may identify not only a set of rules corresponding to the first user, but may identify a set of rules corresponding to a particular identity of the first user conveyed by the identifier in the first identity embedded DNS query request (e.g., via DoH).

In these instances, the traffic routing and monitoring platform 102 may identify one or more policies based on the one or more identities conveyed in the first identity embedded DNS query request. For example, as mentioned above, in some instances, multiple identities (e.g., a user identity, device identity, browser identity, application identity, operating system identity, identity of other software supporting DNS requests, a corporate identity, or the like) may be applied to the first identity embedded DNS query request along its path between the first client device 105 and the traffic routing and monitoring platform 102 (and/or included within the first certificate). In some instances, the traffic routing and monitoring platform 102 may maintain a stored table (or other correlation) of identity/policy pairs (which may, in some instances, be key/value pairs, a database, and/or other relationships reflecting the correlation between identities and the corresponding policies), where identities are represented as keys and corresponding policies are represented as values. Accordingly, the traffic routing and monitoring platform 102 may execute a lookup of the one or more received identities to identify one or more corresponding policies (e.g., a first policy for the first identity and a second policy for the second identity, or the like).

In some instances, this stored table may be maintained and/or otherwise managed by an intelligence policy manager system, which may dynamically distribute the identity/policy pairs for caching by various traffic routing and monitoring platforms. For example, when the first identity embedded DNS query request is received by the traffic routing and monitoring platform 102, if the DNS request includes an identity and/or certificate for which there is no stored policy in the table/index (e.g., based on key/value pairs, and/or other identity/policy pairs defining correspondence between identities and the corresponding policies), the traffic routing and monitoring platform 102 may query the intelligence policy manager system to obtain this information. For example, this table/index may be stored and/or otherwise maintained at a local traffic routing and monitoring platform (e.g., first traffic routing and monitoring platform 503, second traffic routing and monitoring platform 505, or the like), and may petition an intelligence policy manager system (e.g., intelligence policy manager system 504) to obtain identity information and the corresponding policies for storage (e.g., as is described further below with regard to FIG. 5). For example, the intelligence policy manager system 504 may distribute the corresponding policy information to one or more traffic routing and monitoring platforms, which may cache the policy information in the corresponding identity/policy pair tables.

Figure 5:
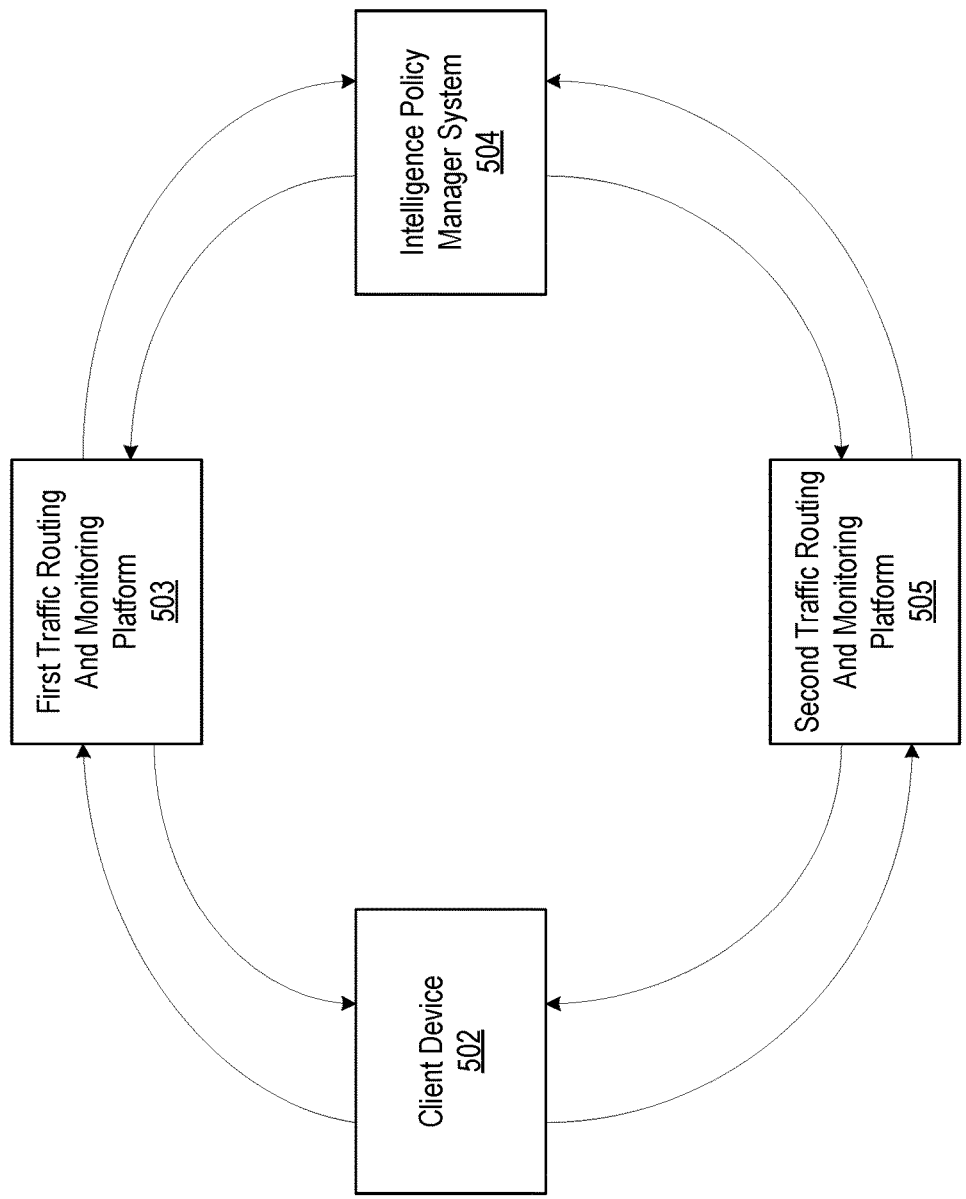

This is illustrated, for example, in FIG. 5. For example, a client device 502 (which may, e.g., be similar to first client device 105, second client device 106, and/or third client device 107) may send a DNS request to the first traffic routing and monitoring platform 503 (which may, e.g., be similar to the traffic routing and monitoring platform 102). The first traffic routing and monitoring platform 503 may identify (e.g., via local searching) whether an identity included in the DNS request is represented in the identity/policy pairs in the policy index (which may, e.g., be maintained and/or otherwise stored at the first traffic routing and monitoring platform 503). If all identities are included in the policy index, the event sequence may proceed as is described below with regard to FIG. 2B. If any identities are not included in the policy index, the first traffic routing and monitoring platform 503 may query the intelligence policy manager system 504 to obtain the corresponding identity/policy pair (e.g., the policy for the corresponding identity). Once received, the first traffic routing and monitoring platform 503 may cache this information in the policy index for future use, and apply the policy (or, in some instances, perform policy reconciliation as is described further below). Based on the policy, the first traffic routing and monitoring platform 503 may return a DNS response to the client device 502, as is described further below with regard to the illustrative event sequence.

In the meantime, the intelligence policy manager system 504 may identify other traffic routing and monitoring platforms (e.g., second traffic routing and monitoring platform 505) to which the policy information should be pre-emptively sent. For example, based on an IP address of the client device 502, which may, e.g., have been sent to the intelligence policy manager system 504 along with the query from the first traffic routing and monitoring platform 503, the intelligence policy manager system 504 may identify other traffic routing and monitoring platforms (e.g., second traffic routing and monitoring platform 505) within a geographic boundary corresponding to a location of the client device 502.

For example, query responses may be routed through servers based on an identified location. As a particular example, if a query request is received via a server in a first geographic location (e.g., a US based server), but the location of the client device 502 indicates that they are in a second geographic location (e.g., a different country, or the like), the server (e.g., a traffic routing and monitoring platform) may be configured to route a response for this query request or redirect the query request itself (including future queries) through one or more servers based on the identified location of the client device 502 (e.g., the second geographic location) so as to provide a response that is most appropriate for the user's location or that is required by the policy. For example, a general data protection regulation (GDPR) compliant user may have all queries and responses routed through servers based within a geographic boundary (e.g., country, continent, or the like), regardless of the user's current location, which may, e.g., be outside of the geographic boundary (e.g., a different country, continent, or the like). In some instances, the rerouting and/or redirection of queries and responses may be based on latency and/or other performance metrics of available servers.

Once the appropriate servers (e.g., traffic routing and monitoring platforms) are identified, the intelligence policy manager system 504 may pre-emptively push the policy information to the second traffic routing and monitoring platform 505, which may cache the policy information in a corresponding policy index (e.g., at the second traffic routing and monitoring platform 505). As a result, when the client device 502 sends a DNS request to the second traffic routing and monitoring platform 505, the second traffic routing and monitoring platform 505 may already have a stored key value pair corresponding to an identity of the client device 502 and the corresponding policy. This may enable the second traffic routing and monitoring platform 505 to provide a DNS response based on the corresponding policy without querying the intelligence policy manager system 504. Additionally, by operating in this way, network bandwidth and computing resources may be conserved by populating policies only to servers where they will be needed/implemented. At the same time, this method may reduce delays associated with request processing by continuing to pre-emptively serve policy information to the corresponding servers.

In addition or as an alternative to pre-emptively pushing the policy information to the various traffic routing and monitoring platforms (e.g., first traffic routing and monitoring platform 503, second traffic routing and monitoring platform 505, or the like) based on a geographic location associated with the client device 502 as described above, the policy information may be pre-emptively pushed based on the policies themselves. For example, a GDPR compliant covered user located in a first geographic region (e.g., a first country, or the like) may request that all of their DNS requests are handled strictly through traffic routing and monitoring platforms located in that first geographic region. In these instances, no matter where the user is located geographically, a path may be provided for DNS query requests to be routed through that first geographic region. Similarly, a particular geographic region may be specified through which DNS requests should not be routed. In these instances, a path may be provided for DNS query requests that avoids this particular geographic region. Accordingly, in these instances, the pre-emptive pushing of policy information may be policy driven in addition or as an alternative to being geographically driven.

In some instances, the intelligence policy manager system 504 may push the policy information based on receiving a request (e.g., from one of the traffic routing and monitoring platforms) to prepopulate it (which may, e.g., include authentication credentials, or the like). In any of these instances, authorized servers (e.g., traffic routing and monitoring platforms identified as candidates to pre-emptively receive the policy information) may be pre-emptively populated with the policy information from the intelligence policy manage system 504 accordingly.

In some instances, the client device 502 may send a DNS query request to an authorized server (e.g., first traffic routing and monitoring platform 503), however, due to policy definition or requirements, for certain reasons (e.g., GDPR, current processing load, latency, or the like), the client device 502 should be instructed to direct subsequent requests to another server (e.g., second traffic routing and monitoring platform 503, or the like) or one of a group of servers. In these instances, a response (e.g., a reconfiguration response) from the traffic routing and monitoring platform 503 to the DNS query request may indicate that the DNS query request and/or future DNS query requests should be directed to the second traffic routing and monitoring platform 503. In these instances, the intelligence policy manager system 504 may pre-emptively push the policy information to the second traffic routing and monitoring platform 503 (and/or other traffic routing and monitoring platforms) accordingly.

Additionally or alternatively, the intelligence policy manager system 504 may pre-emptively push policy information based on receipt of a number of updates for a given traffic routing and monitoring platform 503 (e.g., more than a threshold number of updates or the like), when new cyber threat intelligence is received, and/or otherwise.

There may be several driving factors for pre-emptively pushing the policy information using one or more of the methods described above. First, the volume/size of policy information may be substantial, and thus pre-emptively pushing the policy information may reduce or otherwise eliminate delays associated with waiting for such policy information.

Second, because the policy information may be continuously changing, it may be important to continuously update the policy information at the traffic routing and monitoring platforms proactively as these changes are detected or otherwise received by the intelligence policy manager system 504 (e.g., every five minutes, hour, or the like, which may, e.g., be based on a TTL of the policy information, DNS records, or the like).

For example, by pre-emptively updating the policy information and/or DNS records at the traffic routing and monitoring platforms, the intelligence policy manager system 504 may perform indicator eviction (e.g., evicting information already cached at the traffic routing and monitoring platforms) by replacing a TTL of the corresponding policy information and/or DNS records (e.g., replacing a current TTL with a smallest possible TTL to speed up the eviction process, and/or otherwise removing the corresponding DNS records and/or policy information). In some instances, the TTL may be measured in units of time (e.g., seconds, minutes, hours, or the like), a hop count, and/or otherwise. In some instances, any TTLs detected as exceeded a particular threshold value may be capped at the threshold value (e.g., reduced to a maximum value corresponding to the threshold, or the like. This may enable the replacement of information/records that have already been cached at the traffic routing and monitoring platforms to prevent the use of such information/records by downstream clients (e.g., the first client device 105).

In some instances, the client device 502 may include an agent configured to receive direction to evict records, stored in a local cache, that have already been accessed. For example, the agent may be configured to communicate with the traffic routing and monitoring platforms and/or the intelligence policy manager system 504 to communicate which records have been accessed, and the direction to evict the records may be provided accordingly based on this communication. In other instances, the first client device 105 might not be configured with the agent. In these instances, the traffic routing and monitoring platforms and/or the intelligence policy manager system 504 may keep track of requested DNS records. The traffic routing and monitoring platforms and/or the intelligence policy manager system 504 may further keep track of the known good DNS records, and may allow such records to have pass through TTLs. Similarly, the traffic routing and monitoring platforms and/or the intelligence policy manager system 504 may implement, for records for which no cyber threat intelligence is known or are otherwise untrusted, shortened TTLs (e.g., by transparently overwriting existing TTLs for these records). In doing so, the traffic routing and monitoring platforms and/or the intelligence policy manager system 504 may cause the cache (or one or more records there) to be updated based on expiration of the modified TTL.

In some instances, the traffic routing and monitoring platforms and/or the intelligence policy manager system 504 may generate threat scores, and may adjust the TTLs accordingly based on the threat scores. For example, the TTL may be shortened for higher threat scores and lengthened for lower threat scores. For example, the threat score may correspond to a percentage, and the TTL may be reduced according to the percentage (e.g., reduced by 60% if the threat score is 0.6, or the like). In some instances, the TTL may be dynamically modified over time as additional intelligence is received.

This may provide a technical solution to the problem created with the use of DNS records in cyber security. For example, because DNS records are locally cached, a client device may continue to access a bad record for an entire duration of the corresponding TTL (even after the bad record has been identified or otherwise flagged). Accordingly, by reducing the TTL, an impact of the bad or otherwise untrusted record may be minimized, as it may be evicted from a local cache upon expiration of the shortened TTL. Similarly, for known or otherwise trusted records, the TTL may be extended.

Similarly, the decision to shorten a TTL may be used to log information associated with accessing a particular website. For example, by shortening the TTL associated with the website, the traffic routing and monitoring platforms and/or the intelligence policy manager system 504 may cause the client device 502 to send a DNS requests at a more frequent interval, which may, e.g., more closely represent a number of times the website is accessed.

As yet a third driving factor for pre-emptively pushing the policy information using one or more of the methods described above addresses problems associated with pushing policies to an identity based cache. For example, policies may be pre-emptively pushed that are common to more than one identity. In some instances, local identity based caches may be implemented, which may store policies for given users. However, challenges may arise as a number of users (each with corresponding policies) increases. For example, policies for each user must be pushed out to the local cache, regardless of whether or not these policies contain the same (or substantially similar) information, which may involve the transmission and/or local storage of duplicate and/or otherwise overlapping policy information. Accordingly, commonalities between policies and/or identities that may be deployed to a particular traffic routing and monitoring platform may be identified. For example, if a particular policy is common to all identities accessing the particular traffic routing and monitoring platform, this policy could be pushed (e.g., by the intelligence policy manager system 504) a single time (e.g., rather than once for each identity), and a group cache may be populated with the policy accordingly. In these instances, the group cache may correspond to one or more identities with a common policy, and/or one or more identities associated with a common subset of different policies. By identifying these commonalities and constructing a group cache accordingly, a volume of policy information to be pushed to the traffic routing and monitoring platforms may be significantly reduced which may, e.g., conserve network bandwidth and processing resources. For example, policies being sent out may be evaluated for efficient delivery, where duplicate information might not be sent out.

In some instances, because it may be advantageous for policies to be cached as close to a user as possible (e.g., at a most proximate traffic routing and monitoring platform, or the like), as policies are pushed down to a given traffic routing and monitoring platform, the intelligence policy manager system 504 may understand commonalities between identities associated with that traffic routing and monitoring platform accordingly, and thus may create the group caches/common policies as described above. For example, a corporate policy applying to a number of employees at an enterprise may be sent down including policies applicable to all (or a large percentage) of the employees, and smaller individual policies (including remaining policies for the various employees) may be sent down accordingly. In doing so, the policies may be sent in a differential manner that minimizes an amount of policies, duplicate information, and/or commonly applicable information to be sent.

Furthermore, in some instances, the group caches may be dynamically adjusted to add and/or remove policies from a common policy associated with the group cache based on application of those policies to identities corresponding to the group cache. Returning to step 206 of FIG. 2B, in instances where multiple policies are identified, the traffic routing and monitoring platform 102 may perform a reconciliation process to apply an appropriate policy (e.g., block traffic, allow traffic, log traffic, or the like) to any given packet or request. For example, the traffic routing and monitoring platform 102 may identify whether or not the policies conflict (e.g., does one policy indicate that traffic should be blocked for the requested IP address and the other indicates that the traffic should be allowed). In instances of total conflict, such as this, the traffic routing and monitoring platform 102 may select a dominant policy to apply (e.g., based on preconfigured settings, user input, or the like), and may apply the corresponding policy. For example, the traffic routing and monitoring platform 102 may be configured to apply the corporate policy over the personal user policy in instances of conflict (e.g., select the second policy over the first policy).

In other instances, the traffic routing and monitoring platform 102 may identify a partial conflict (e.g., the two or more policies are in agreement in some regard and in conflict in others). In these instances, the traffic routing and monitoring platform 102 may apply the non-conflicting portions of the policies, and may reconcile any conflicting portions as described above (e.g., identify that the second policy plus some non-conflicting portion of the first policy should be applied). For example, in some instances, policies may comprise a disposition indicating an action such as block or allow. Additionally, in some instances, the policies may include a directive, such as log, monitor, capture one or more packets, alert, redirect, and/or other secondary or additional actions. Accordingly, in some instances, a partial conflict may be identified where two policies indicate a common disposition, but conflicting directives. In these instances, the traffic routing and monitoring platform 102 may resolve the conflict by performing a composite of the actions defined in the conflicting dispositions in addition to performing the common disposition. Additionally or alternatively, one or more dominant directives many be selected and performed to resolve the conflict.

In some instances where a conflict is identified (e.g., a partial conflict or complete conflict) in as an alternative to selecting one of the conflicting policies as a dominant policy in its entirety, the traffic routing and monitoring platform 102 may select one or more dominant rules of multiple different conflicting policies. For example, the traffic routing and monitoring platform 102 may generate and/or otherwise associate precedence scores with the rules associated with each conflicting policy, and may select rules from one or more policies by selecting a rule, from a conflicting pair of rules, that has a higher precedence score than the remaining rule. For example, if a first rule of a first policy has a higher precedence score than a first rule of a second policy, but a second rule of the second policy has a higher precedence score than a second rule of the first policy, the traffic routing and monitoring platform 102 may select the first rule of the first policy and the second rule of the second policy.

As another example, conflicts may be resolved based on specificity. For example, a first policy may say block "*.domain.com" and another may say allow "www.domain.com." Depending on the deconfliction criteria, traffic to "www.domain.com" may be allowed, but traffic to, for example, "meet.domain.com" may be disallowed. Similarly, the reverse could happen. For example, it may depend on the precedence of each scenario. Additionally or alternatively, deconfliction may be performed based on block versus allow. For example, blocks may be prioritized over any allows. In this example, traffic to "www.domain.com" may be blocked by the rule for "*domain.com," despite the rule indicating that traffic to "www.domain.com" should otherwise be allowed. In some instances, these examples may illustrate application of the precedence of rules. In some instances, such precedence may be assigned through human applied judgement and/or determined by a rule analysis agent.

In other instances, the traffic routing and monitoring platform 102 may identify that the policies do not conflict (or are in agreement), and may apply each policy in their entirety (e.g., apply both the first and second policies). This may result in an overall or comprehensive policy, which may, e.g., be a selection of an identity based policy, a summation of multiple identity based policies, or a partial combination of multiple identity based policies.

By resolving and/or otherwise deconflicting policies in this way, privacy problems associated with personal devices may be addressed. For example, if a user has a corporate issued laptop, it may be unlikely that a number of different policies may apply. Rather, the laptop may simply be governed by a corporate policy. However, when personal devices are used (or if personal browsing is permitted on a corporate device), individuals may still seek privacy on their devices, and in some instances, may circumvent corporate security to do so. By applying an identity driven solution as described herein, multiple profiles, personal devices, multi-use devices, and/or other devices may be supported to provide user privacy while maintaining security.

In some instances, the traffic routing and monitoring platform 102 may further select this comprehensive policy based on non-identity based attributes (e.g., attributes not specifically tied to a given user identity). This may, for example, include a GDPR attribute where different overall policies may be selected for the same identity based on a value of the GDPR attribute (e.g., where the user is located in a first country versus a second country, or the like).

In these instances, the identified/selected policy may correspond to a set of traffic routing rules (e.g., the first traffic routing rules as described at step 207 below). This policy selection is illustrated further with regard to FIG. 4, which is described below.

At step 207, the traffic routing and monitoring platform 102 may identify, based on the first traffic routing rules, an action to perform with regard to the first identity embedded DNS query request. For example, the traffic routing and monitoring platform 102 may identify, based on the first traffic routing rules, whether to allow, block, and/or monitor traffic directed to an IP address requested by the first identity embedded DNS query request (which may, e.g., correspond to the target server 108). For example, the traffic routing and monitoring platform 102 may identify that IP addresses corresponding to blacklisted domains should be blocked, access should be granted to IP addresses corresponding to whitelisted domains, and that traffic to and from IP addresses corresponding to watchlist domains should be monitored/logged. For illustrative purposes, at step 207, the traffic routing and monitoring platform 102 may identify, based on the first traffic routing rules, that traffic should be allowed to access the IP address requested by the first identity embedded DNS query request.

In some instances, in addition or as an alternative to applying these policies/traffic routing rules to route traffic based on the first identity embedded DNS query request, the traffic routing and monitoring platform 102 may also segment reporting based on privacy preferences corresponding to an identity (which may, e.g., be stored and/or otherwise identified using similar methods to those described above with regard to the policies and/or may be otherwise included in the policies). For example, the traffic routing and monitoring platform 102 might not collect and/or report on a first type of information (e.g., account information, password information, or the like), but may report on other information.

At step 208, based on identifying that the domain name of the first identity embedded DNS query request is a domain name for which traffic should be allowed, the traffic routing and monitoring platform 102 may identify a requested IP address (e.g., the IP address for the target server 108).

In some instances, in identifying the requested IP address, the traffic routing and monitoring platform 102 may use DNS caching to improve response time. For example, a DNS server may spend a significant amount of time contacting other servers, searching for an appropriate answer to a query. Once the DNS server has an answer, it may then respond to the query. By storing the answer to the query, the DNS server may provide a much quicker response to any subsequent user requesting the same information. This storing and use of the stored DNS response may be referred to as DNS caching. Notably, most DNS servers may be built to support multiple users, serving them all identical information from a single global cache.

With regard to the systems and methods described herein, when a client (such as the first client device 105) queries the traffic routing and monitoring platform 102, several different responses may be generated by the traffic routing and monitoring platform 102 and/or received by the first client device 105 based on the policy crafted for that particular client. For example, the correct response to a client's DNS query may depend on the service and/or policies specific to that client.

For example, a publicity firm may want employees to have access to a particular social media website (e.g., website #1). Accordingly, the DNS policy for this firm may indicate that the firm should be allowed to access the correct IP address for website #1. To speed up subsequent queries for website #1, the traffic routing and monitoring platform 102 may cache the answer for the "allow" response. In contrast, the DNS policy for a high school may indicate that website #1 should be blocked. However, the traffic routing and monitoring platform 102 may see the cached "allow" answer, and may provide the correct IP address for website #1 in violation of the high school's DNS policy. Similarly, the opposite situation may occur where both the firm and the high school may be blocked from accessing website #1. Thus, while the cache may greatly increase the speed of query processing by the traffic routing and monitoring platform 102, it may also be a source of incorrect responses for a particular client.

To address this deficiency, policies may be applied by the traffic routing and monitoring platform 102, and then a DNS lookup may be performed for each client query. However, this may result in latency and/or delays that may negatively affect user experience. Accordingly, per client caching is proposed herein. This may involve segmenting the cache of the traffic routing and monitoring platform 102 to limit a particular client's (e.g., such as the firm or high school described above) users to cached responses for that client. This may be achieved by incorporating a client identifier into the caching mechanism, and may allow the traffic routing and monitoring platform 102 to quickly provide validated DNS query responses across an entire user base. In these instances, an identity aware cache may be used to provide the correct responses relative to identities and their corresponding policies. In doing so, in reference to the example described above, the correct policies would be applied for both the publicity firm (e.g., allow) and the high school (e.g., block) with regard to access of website #1. Additionally or alternatively, the identity aware caching may be based on other attributes (e.g., location, device, corporation, user, and/or other attributes) without departing from the scope of the disclosure. For example, cached information (e.g., policies, DNS responses, or the like) may be pre-pushed to a server (e.g., a traffic routing and monitoring platform) to which a user is being redirected. More specifically, if a user is accessing a first server (e.g., traffic routing and monitoring platform 102) in a first location (country, continent, geographic region, or the like), but is redirected to a second server (e.g., another traffic routing and monitoring platform) based on a location, or the like, cached policy information may be pushed to this second server accordingly (which may, e.g., cause the second server to update its cache pre-emptively based on the first servers cache and/or otherwise). Accordingly, identity aware caching may be leveraged for the pre-emptive pushing of cached information (e.g., policy information, DNS response information, or the like) and evicting/overwriting existing cached information. For example, as described above with regard to FIG. 5 and the pre-emptive pushing of policies, caches may be pre-emptively pushed and/or populated.

In some instances, if the identified DNS query response includes or is otherwise associated with CTI, the traffic routing and monitoring platform 102 might not cache the response. For example, caching responses associated with CTI may result in the wrong outcome being applied for subsequent queries.

In some instances, responses may be cached for a specific period of time. In these instances, the period of time may be determined by the traffic routing and monitoring platform 102 based on intelligence corresponding to requests for a given response.

In some instances, to generate the first identity embedded DNS query request, the traffic routing and monitoring platform 102 may transmit an outbound application programming interface (API) call to a DNS resolver. In some examples, using a sidecar API, intelligence known for the first user and the requested domain may be extracted from the first identity embedded DNS query request and/or otherwise used to generate the encrypted DNS query response. For example, if any information should be filtered based on the user identity and/or the known intelligence, such filtering may be performed. For example, the traffic routing and monitoring platform 102 may deploy a sidecar API and a DNS server may be integrated to query the sidecar API for relevant policies. For example, the DNS server software may extract a domain and/or other information (e.g., identity information, or the like) from a query request and may run the domain and/or other information against the API sidecar. The API sidecar may then provide whatever information may be used to alter the query response (e.g., change the response, do not respond, send domain does not exist, change the IP address, select one of a plurality of IP addresses, provide context around the request, redirect the query to a different server, and/or actions) at the DNS server. The DNS server may then interpret this information from the API sidecar, modify the query response accordingly, and provide the response. Use of this sidecar API may, e.g., minimize changes needed to the DNS server itself. For example, by using the sidecar API, the incorporation of the policies directly into the DNS server software may be avoided. In some instances, however, the policies may be directly incorporated into the DNS server software.

In some instances, the DNS caching may involve the use of a penalty box, configured to block access to a particular website for a given amount of time (e.g., a time to live, or the like). In these instances, the traffic routing and monitoring platform 102 may analyze DNS query requests (such as the first identity embedded DNS query request) and respond accordingly (e.g., providing domains and/or blocking requests based on the requested domain and the amount of time). In some instances, a local cache (e.g., at the first client device 105, or the like) may be configured to avoid making further requests for the corresponding domain until expiration of the given amount of time.

In some instances, producing the first identity embedded DNS query response may involve producing multiple domains and/or other records (e.g., domain names, IP forward addresses, IPv6 addresses, email addresses, and/or other information). In these instances, the traffic routing and monitoring platform 102 may apply threat intelligence to the identified information and filter the information accordingly. For example, if three IP addresses are identified in response to a DNS query and two correspond to known threats, the two malicious IP addresses may be removed from the response and only the remaining IP address may be returned in the response.

Figure 2C:
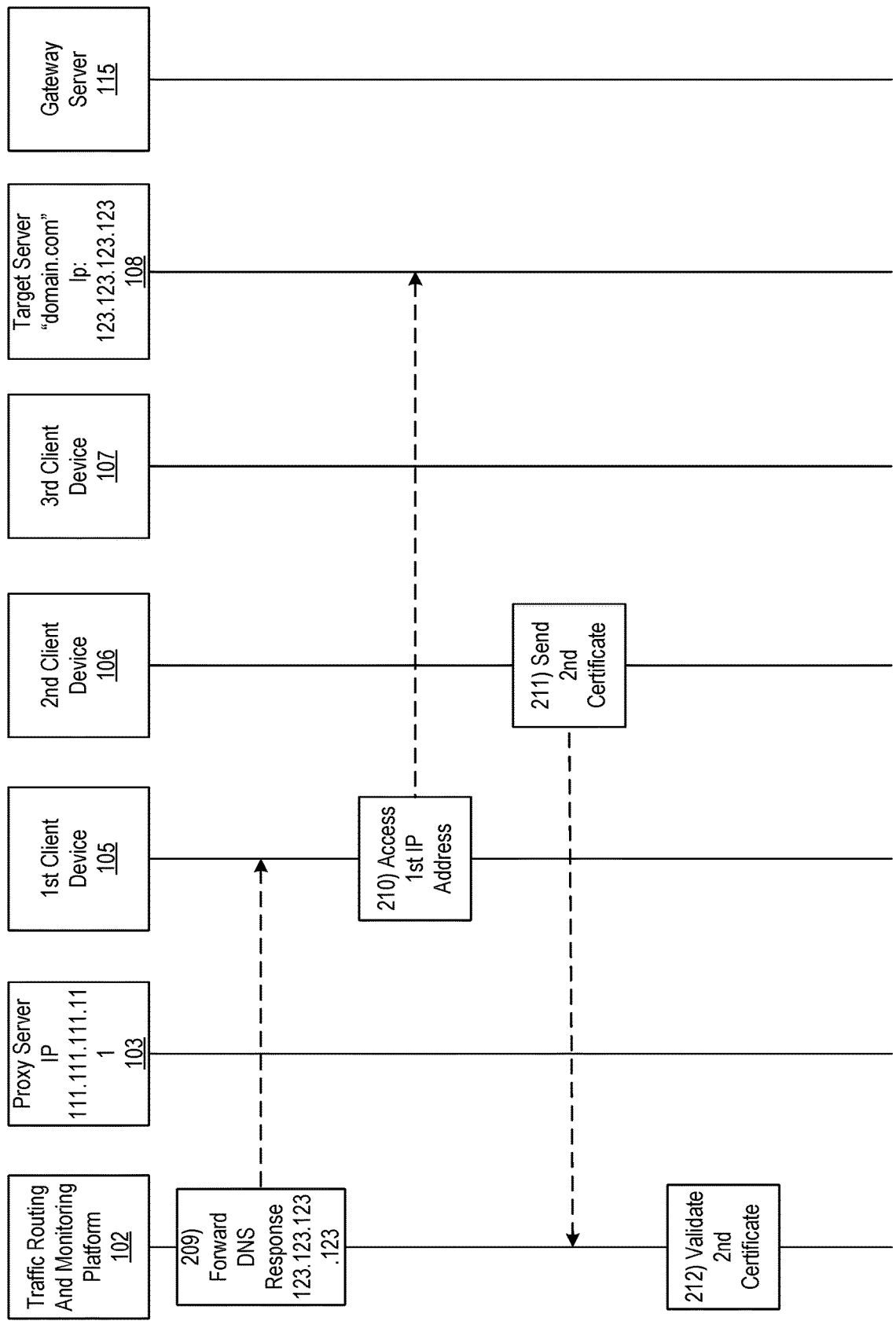

In some instances, producing the first identity embedded DNS query response may involve validating downstream IP addresses prior to routing the first identity embedded DNS query response to the corresponding downstream systems. In doing so, the traffic routing and monitoring platform 102 may ensure that these downstream systems are not compromised and/or are otherwise in compliance with the overall policy identified at step 206. This is described, for example, with regard to FIGS. 6A-6D. Referring to FIG. 2C, at step 209, the traffic routing and monitoring platform 102 may forward the first identity embedded DNS query response (e.g., 123.123.123.123) to the first client device 105. For example, the traffic routing and monitoring platform 102 may forward the IP address identified at step 208 (which may, e.g., be the IP address for the target server 108). In some instances, the traffic routing and monitoring platform 102 may forward the first identity embedded DNS query response to the first client device 105 during the secure session established at step 203.

At step 210, the first client device 105 may access the IP address received at step 209. For example, the first client device 105 may access data, content, and/or other information from the target server 108.

At step 211, referring now to the second security certificate, issued to the second client device 106, the second client device 106 may send the second security certificate and a request to establish a secure session to the traffic routing and monitoring platform 102. For example, the second client device 106 may send the second security certificate and the request to establish the secure session using a wired or wireless connection with the traffic routing and monitoring platform 102.

At step 212, the traffic routing and monitoring platform 102 may validate the second security certificate, sent at step 211. In instances where the traffic routing and monitoring platform 102 validates the second security certificate, the traffic routing and monitoring platform 102 may establish a secure session with the second client device 106 (and may then proceed to step 213). Otherwise, if the traffic routing and monitoring platform 102 is unable to validate the second security certificate, the traffic routing and monitoring platform 102 might not proceed to step 213, and may instead wait until a security certificate is received and validated from the second client device 106.

In some instances, in validating the second security certificate and establishing the secure session, the traffic routing and monitoring platform 102 may conduct a transport layer security (TLS) handshake with the second client device 106. In these instances, the traffic routing and monitoring platform 102 and the second client device 106 may initiate an encrypted DNS process (which may include validation of the third security certificate in compliance with RFC 7858 and/or RFC 8310), during which encrypted DNS query requests and encrypted DNS query responses may be exchanged between the traffic routing and monitoring platform 102 and the second client device 106. For example, the second client device 106 may notify the traffic routing and monitoring platform 102 of its TLS capabilities (which may, e.g., be included in the second security certificate), and the traffic routing and monitoring platform 102 may respond to confirm TLS parameters that may be used to secure the TLS channel. For example, the traffic routing and monitoring platform 102 may send a certificate identifying the traffic routing and monitoring platform 102, and a message including a digital signature of the traffic routing and monitoring platform 102, which may be verified by the second client device 106 (e.g., by checking a trusted authority list, public key pinning, and/or other methods). Once this handshake is complete, the traffic routing and monitoring platform 102 may exchange encrypted messages (e.g., DNS query requests, DNS query replies, and/or other information).

Figure 2D:
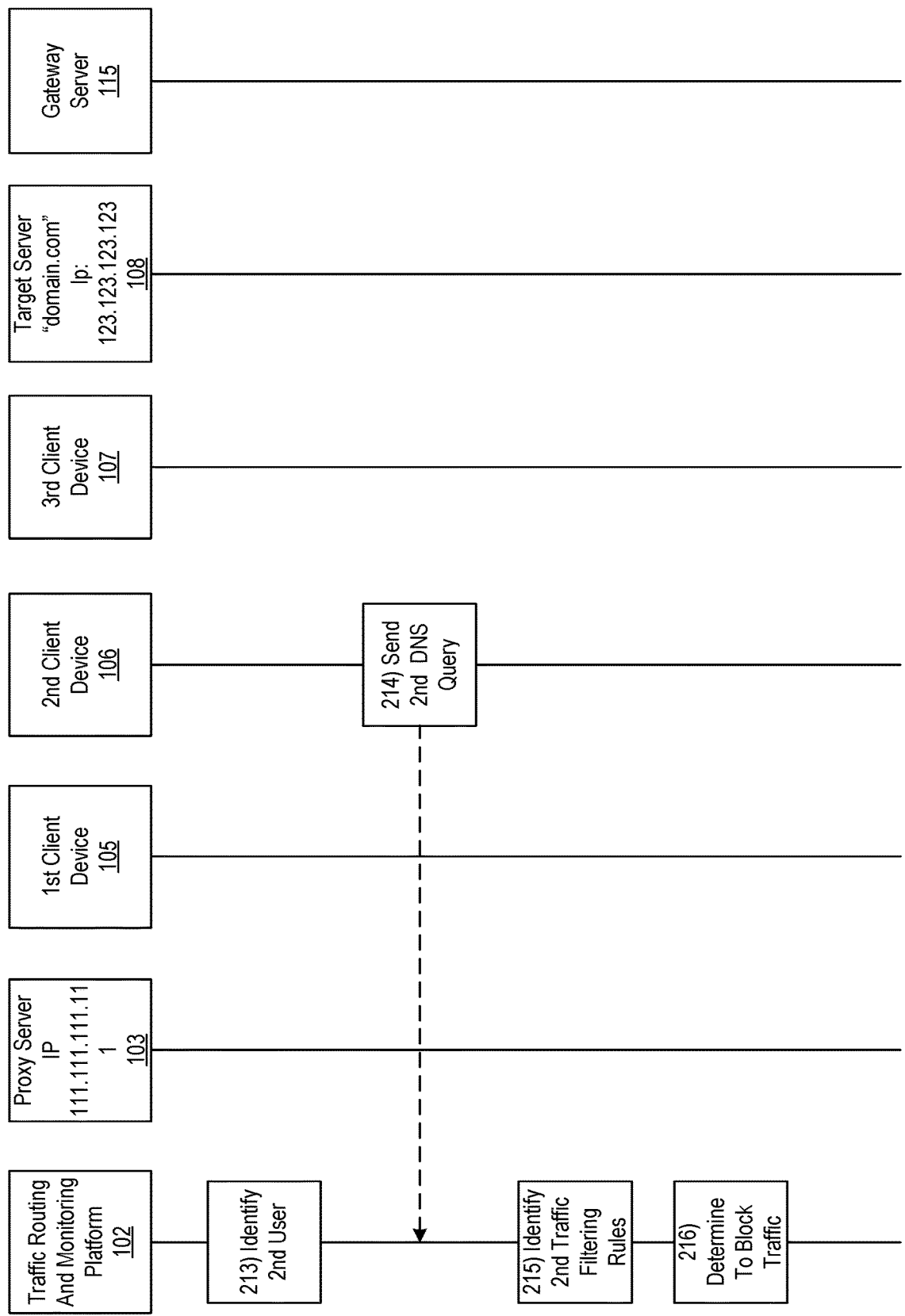
Figure 2E:
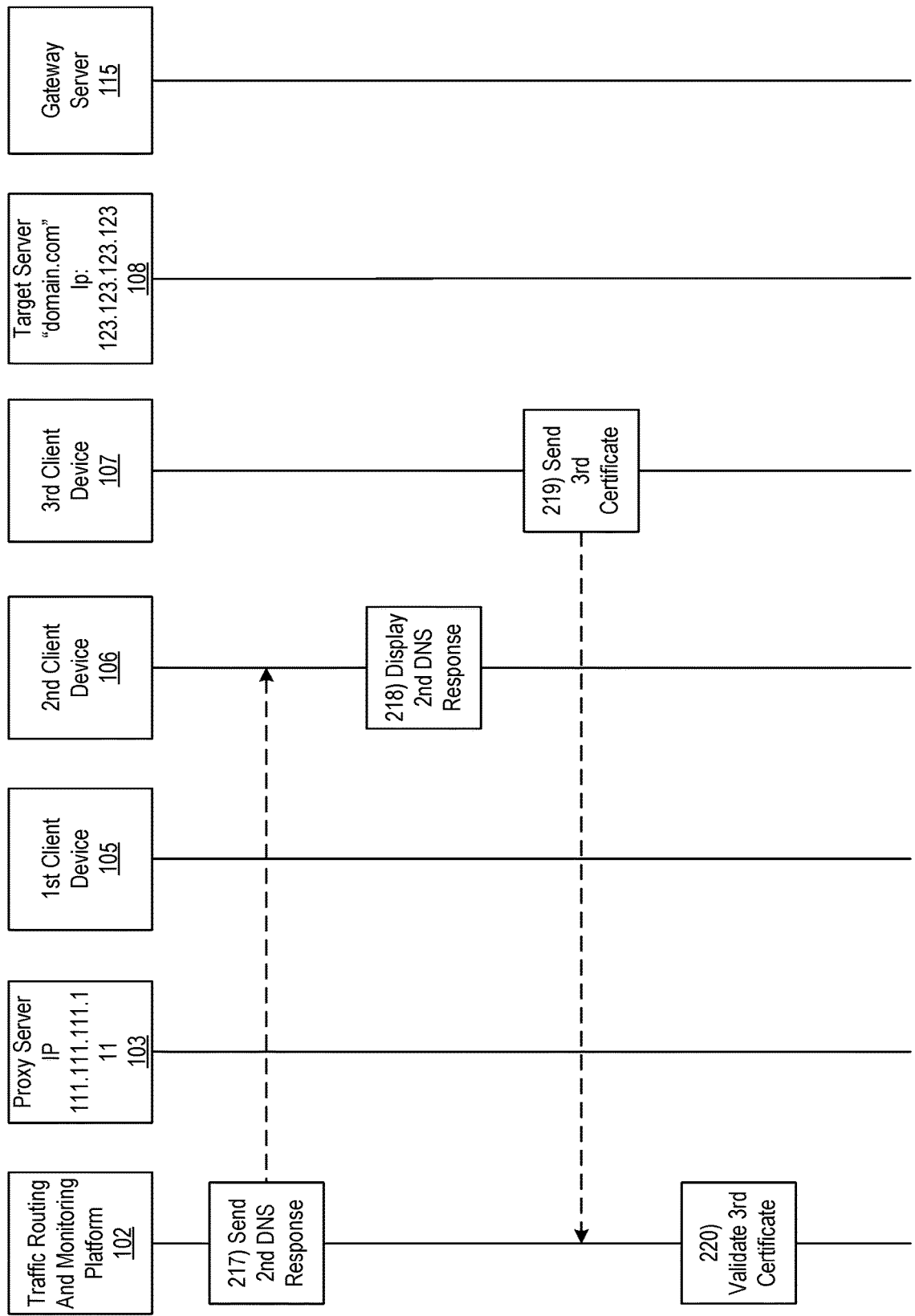

Referring to FIG. 2D, at step 213, the traffic routing and monitoring platform 102 may identify a user of the second client device 106. For example, based on the second security certificate, the traffic routing and monitoring platform 102 may identify the second user. For example, authentication may be supported using mutual X509 certificate authentication. In these instances, DNS over TLS may be used to utilize encryption of traffic using TLS over TCP and/or UDP, which may offer advantages over the HTTP protocol (which might not in itself provide encryption). By managing the public/private key infrastructure, the second users identity may be securely determined during an exchange process between the second client device 106 and the traffic routing and monitoring platform 102.

For example, the traffic routing and monitoring platform 102 may identify the second user using mutual X509 certificate authentication using a DNS over TLS (e.g., encryption over UDP) protocol. In these instances, the enterprise environment may have an internal/local resolver (e.g., DNS with directory services). The second user may be provided with instructions for the local/internal resolver to resolve to the traffic routing and monitoring platform 102. In these instances, DNS over TLS may be used where a higher level of security is desired. The second user may be provided with the client certificate, along with instructions for the local resolver to resolve to the traffic routing and monitoring platform 102 using DNS over TLS. In these instances, instructions may be provided to block outbound standard DNS and DNS over HTTPS. Once received, the traffic routing and monitoring platform 102 may identify the second user based on the client certificate. Such mutual authentication may offer technical advantages over other methods, such as increased security.

Although identification of the second user is described at step 213 (e.g., prior to sending of the second identity embedded DNS query request), it may, in some instances, be performed based on information received in the second identity embedded DNS query request as described further below at step 214. Accordingly, identification of the second user may occur before or after receipt of the second identity embedded DNS query request without departing from the scope of the disclosure.

At step 214, once the secure session has been established between the second client device 106 and the traffic routing and monitoring platform 102, the second client device 106 may send a second identity embedded DNS query request (e.g., a fully encrypted DNS request, partially encrypted DNS request, non-encrypted DNS request, or the like where a user identity is present in a certificate, embedded into a DNS protocol itself, and/or otherwise embedded) to the traffic routing and monitoring platform 102. For example, the second client device 106 may send a domain name for the target server 108, and may request the IP address for the target server 108. For example, the second client device 106 may establish a TLS session over which the second identity embedded DNS query request may be made securely. For example, the TLS session may be over TCP, UDP, and/or otherwise. Additionally or alternatively, the second client device 106 may establish an HTTP session over which DNS query requests may be made. For example, the HTTP session may be unencrypted over TCP, UDP, or the like, or encrypted by a TLS session. In some instances, the second client device 106 (e.g., a network interface of the second client device 106) may be preconfigured to direct DNS queries to the traffic routing and monitoring platform 102. For example, the second security certificate may be installed at the second client device 106 prior to sending of the second identity embedded DNS query request. In some instances, when sending the second identity embedded DNS query request, the second client device 106 may be accessing the internet from outside of a protected network. In some instances, where the second identity embedded DNS query request is encrypted, the traffic routing and monitoring platform 102 may use the second security certificate to decrypt the second identity embedded DNS query request. For example, different security certificates may be installed at the same device for different browsers, and different security policies may be applied depending on which certificate is presented. In these instances, if the second security certificate has not yet been received by the traffic routing and monitoring platform 102, the traffic routing and monitoring platform 102 may prompt the second client device 106 to provide the second security certificate.

In some instances, actions performed at step 214 may be similar to those described above at step 205 with regard to the first client device 105. For example, in some instances, a user identity (e.g., based on attributes such as a profile, application, operating system, device, network, cluster, wireless access point (WAP) IP, and/or other identifiers) may be received (e.g., via DoH) along with the second identity embedded DNS query request, which may be used to distinguish between different profiles/identities for the second user. In some instances, one or more identities may be embedded into the second identity embedded DNS query request using techniques similar to those described at step 205 with regard to the first identity embedded DNS query request, and as further illustrated below with regard to FIG. 4.

At step 215, the traffic routing and monitoring platform 102 may identify second traffic routing rules, based on the identity of the second user. For example, the traffic routing and monitoring platform 102 may maintain a database of traffic routing rules corresponding to each of a plurality of users, and may identify (e.g., by indexing the database) second traffic routing rules corresponding to the second user. In some instances, in identifying the second traffic routing rules, the traffic routing and monitoring platform 102 may identify domain matching criteria and corresponding actions to be performed for each of a plurality of domain names (including domain name sent in the second identity embedded DNS query request), both of which may be specific to the second user. For example, the second traffic routing rules may be specific to an organization of the second user, a subscription level of the second user (which may, e.g., provide a unique level of security and/or be selected or otherwise enrolled in by the second user), a geographic location, and/or other user characteristics. In other instances, the second traffic routing rules may be common between all network users (including the second user). In some instances, in identifying the domain matching criteria of the second traffic routing rules, the traffic routing and monitoring platform 102 may identify a whitelist, blacklist, and/or watchlist specific to the second user. In these instances, each of the plurality of domain names may be included on one of the whitelist, blacklist, and watchlist. In some instances, the second traffic routing rules may be associated with a protected network (e.g., an enterprise or other secure network).

In some instances, the second traffic routing rules may be selected based on a specific user identity for the second user (e.g., rules corresponding to use of a first browser by the second user rather than a second browser, or the like). In some instances, this may be similar to the selection of the policies/first traffic routing rules described with regard to step 206, and as described further with regard to FIG. 4. In some instances, the policies may be distributed, cached, and/or otherwise controlled by an intelligence policy manager system, as is described with regard to step 206 and FIG. 5.

At step 216, the traffic routing and monitoring platform 102 may identify, based on the second traffic routing rules, an action to perform with regard to the second identity embedded DNS query request. For example, the traffic routing and monitoring platform 102 may identify, based on the second traffic routing rules, whether to allow, block, and/or monitor traffic directed to an IP address requested by the second identity embedded DNS query request (which may, e.g., correspond to the target server 108). For example, the traffic routing and monitoring platform 102 may identify that IP addresses corresponding to blacklisted domains should be blocked, access should be granted to IP addresses corresponding to whitelisted domains, and that traffic to and from IP addresses corresponding to watchlist domains should be monitored/logged. For illustrative purposes, at step 216, the traffic routing and monitoring platform 102 may identify, based on the second traffic routing rules, that traffic directed to the IP address requested by the second identity embedded DNS query request should be blocked (e.g., because the domain name included in the second identity embedded DNS query request corresponds to a potential security threat for which traffic should be blocked).

At step 217, the traffic routing and monitoring platform 102 may send a second identity embedded DNS query response to the second client device 106. In some instances, generation of the second identity embedded DNS query response may involve DNS caching as described above with regard to the first identity embedded DNS query response at step 208. However, rather than sending an IP address requested by the second identity embedded DNS query response, based on identifying that the domain name of the second identity embedded DNS query request corresponds to a potential security threat for which traffic should be blocked, the traffic routing and monitoring platform 102 may send a second identity embedded DNS query response indicating that the requesting IP address has been blocked and/or otherwise block the second client device 106 from accessing the requested IP address. For example, the traffic routing and monitoring platform 102 may send a notification that the requested IP address is blocked, an IP address of a block notification page, and/or other information indicating that the requested IP address is blocked. In some instances, the traffic routing and monitoring platform 102 may send the second identity embedded DNS query response to the second client device 106 via a wired or wireless data connection.

At step 218, the second client device 106 may display the second identity embedded DNS query response (which may, e.g., be decrypted for display). For example, the second client device 106 may display a graphical user interface indicating that the requested IP address has been blocked. In some instances, the second client device 106 may receive user feedback indicating that the requested IP address has been flagged as a false positive (e.g., improperly blocked). In these instances, the second client device 106 may send this user feedback to the traffic routing and monitoring platform 102. The traffic routing and monitoring platform 102 may wait until such false positive feedback is received for the requested IP address from more than a threshold number of users. Once such false positive feedback is received from more than the threshold number of users, the traffic routing and monitoring platform 102 may update the second traffic routing rules to indicate that traffic directed to the requested IP address should instead be permitted (and thus future DNS requests for the requested IP address may follow a process similar to that described above with regard to the first identity embedded DNS query request). In doing so, the traffic routing and monitoring platform 102 may dynamically modify, update, and/or otherwise refine the second traffic routing rules based on the feedback (which may, e.g., continuously improve performance and effectiveness of the second traffic routing rules).

At step 219, referring now to the third security certificate, issued to the third client device 107, the third client device 107 may send the third security certificate and a request to establish a secure session to the traffic routing and monitoring platform 102. For example, the third client device 107 may send the third security certificate and the request to establish the secure session using a wired or wireless connection with the traffic routing and monitoring platform 102.

At step 220, the traffic routing and monitoring platform 102 may validate the third security certificate, sent at step 219. In instances where the traffic routing and monitoring platform 102 validates the third security certificate, the traffic routing and monitoring platform 102 may establish a secure session with the third client device 107 (and may then proceed to step 221). Otherwise, if the traffic routing and monitoring platform 102 is unable to validate the third security certificate, the traffic routing and monitoring platform 102 might not proceed to step 221, and may instead wait until a security certificate is received and validated from the third client device 107.

In some instances, in validating the third security certificate and establishing the secure session, the traffic routing and monitoring platform 102 may conduct a transport layer security (TLS) handshake with the third client device 107. In these instances, the traffic routing and monitoring platform 102 and the third client device 107 may initiate an encrypted DNS process (which may include validation of the third security certificate in compliance with RFC 7858 and/or RFC 8310), during which encrypted DNS query requests and encrypted DNS query responses may be exchanged between the traffic routing and monitoring platform 102 and the third client device 107. For example, the third client device 107 may notify the traffic routing and monitoring platform 102 of its TLS capabilities (which may, e.g., be included in the third security certificate), and the traffic routing and monitoring platform 102 may respond to confirm TLS parameters that may be used to secure the TLS channel. For example, the traffic routing and monitoring platform 102 may send a certificate identifying the traffic routing and monitoring platform 102, and a message including a digital signature of the traffic routing and monitoring platform 102, which may be verified by the third client device 107 (e.g., by checking a trusted authority list, public key pinning, and/or other methods). Once this handshake is complete, the traffic routing and monitoring platform 102 may exchange encrypted messages (e.g., DNS query requests, DNS query replies, and/or other information).

Figure 2F:
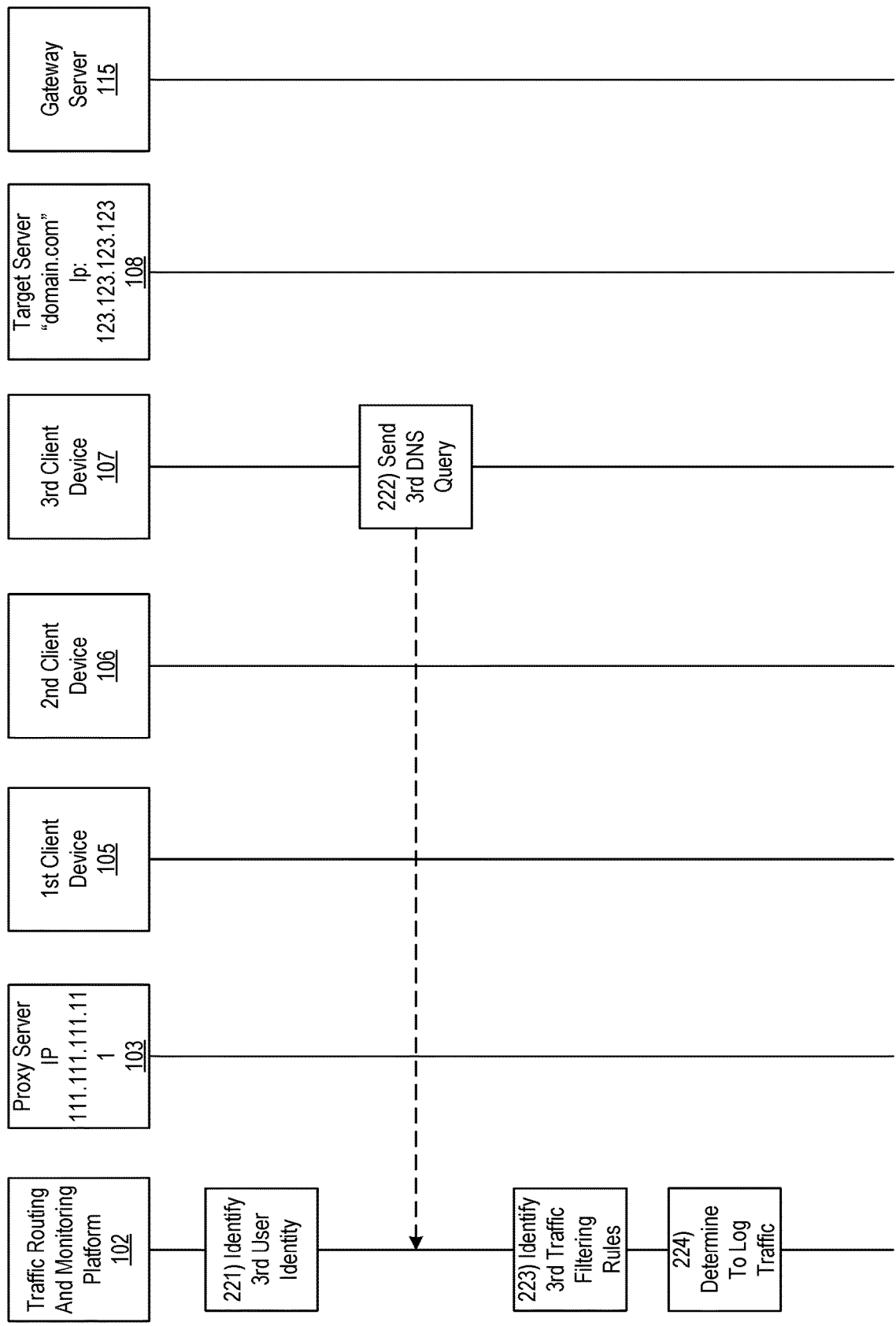

Referring to FIG. 2F, at step 221, the traffic routing and monitoring platform 102 may identify a user of the third client device 107. For example, based on the third security certificate, the traffic routing and monitoring platform 102 may identify the third user. For example, authentication may be supported using mutual X509 certificate authentication. In these instances, DNS over TLS may be used to utilize encryption of traffic on UDP instead of the HTTP protocol. By managing the public/private key infrastructure, the third users identity may be securely determined during an exchange process between the third client device 107 and the traffic routing and monitoring platform 102.

For example, the traffic routing and monitoring platform 102 may identify the third user using mutual X509 certificate authentication using a DNS over TLS (e.g., encryption over UDP) protocol. In these instances, the enterprise environment may have an internal/local resolver (e.g., DNS with directory services such as directory services (e.g., such as Microsoft active directory (AD)). The third user may be provided with instructions for the local/internal resolver to resolve to the traffic routing and monitoring platform 102. In these instances, DNS over TLS may be used where a higher level of security is desired. The third user may be provided with the client certificate, along with instructions for the local resolver to resolve to the traffic routing and monitoring platform 102 using DNS over TLS. In these instances, instructions may be provided to block outbound standard DNS and DNS over HTTPS. Once received, the traffic routing and monitoring platform 102 may identify the third user based on the client certificate. Such mutual authentication may offer technical advantages over other methods, such as increased security.

Although identification of the third user is described at step 221 (e.g., prior to sending of the first identity embedded DNS query request), it may, in some instances, be performed based on information received in the third identity embedded DNS query request as described further below at step 222. Accordingly, identification of the third user may occur before or after receipt of the third identity embedded DNS query request without departing from the scope of the disclosure.

At step 222, once the secure session has been established between the third client device 107 and the traffic routing and monitoring platform 102, the third client device 107 may send a third identity embedded DNS query request a fully encrypted DNS request, partially encrypted DNS request, non-encrypted DNS request, or the like where a user identity is present in a certificate, embedded into a DNS protocol itself, and/or otherwise embedded) to the traffic routing and monitoring platform 102. For example, the third client device 107 may send a domain name for the target server 108, and may request the IP address for the target server 108. For example, the third client device 107 may establish a TLS session over which the third identity embedded DNS query request may be made securely. For example, the TLS session may be over TCP, UDP, and/or otherwise. Additionally or alternatively, the third client device 107 may establish an HTTP session over which DNS query requests may be made. For example, the HTTP session may be unencrypted over TCP, UDP, or the like, or encrypted by a TLS session. In some instances, the third client device 107 (e.g., a network interface of the third client device 107) may be preconfigured to direct DNS queries to the traffic routing and monitoring platform 102. For example, the third security certificate may be installed at the third client device 107 prior to sending of the third identity embedded DNS query request. In some instances, when sending the third identity embedded DNS query request, the third client device 107 may be accessing the internet from outside of a protected network corresponding to the traffic routing and monitoring platform 102 and/or proxy server 103. In some instances, the traffic routing and monitoring platform 102 may use the third security certificate to decrypt the third identity embedded DNS query request. In these instances, if the third security certificate has not yet been received by the traffic routing and monitoring platform 102, the traffic routing and monitoring platform 102 may prompt the third client device 107 to provide the third security certificate.

In some instances, actions described at step 222 may be similar to those described above with regard to the first client device 105 at step 205, and/or the second client device 106 at step 214. For example, in some instances, a user identity may be received (e.g., via DoH) along with the third identity embedded DNS query request, which may be used to distinguish between different profiles/identities for the third user (as is further illustrated and described below with regard to FIG. 4).

At step 223, the traffic routing and monitoring platform 102 may identify third traffic routing rules, based on the identity of the third user. For example, the traffic routing and monitoring platform 102 may maintain a database of traffic routing rules corresponding to each of a plurality of users, and may identify (e.g., by indexing the database) third traffic routing rules corresponding to the third user. In some instances, in identifying the third traffic routing rules, the traffic routing and monitoring platform 102 may identify domain matching criteria and corresponding actions to be performed for each of a plurality of domain names (including domain name sent in the third identity embedded DNS query response), both of which may be specific to the third user. For example, the third traffic routing rules may be specific to an organization of the third user, a subscription level of the third user (which may, e.g., provide a unique level of security and/or be selected or otherwise enrolled in by the third user), a geographic location, and/or other user characteristics. In other instances, the third traffic routing rules may be common between all network users (including the third user). In some instances, in identifying the domain matching criteria of the third traffic routing rules, the traffic routing and monitoring platform 102 may identify a whitelist, blacklist, and/or watchlist specific to the third user. In these instances, each of the plurality of domain names may be included on one of the whitelist, blacklist, and watchlist. In some instances, the third traffic routing rules may be associated with a protected network (e.g., an enterprise or other secure network).

In some instances, the third traffic routing rules may be selected based on a specific user identity for the third user (e.g., rules corresponding to use of a first browser by the third user rather than a second browser, or the like). In some instances, these third traffic routing rules may be selected using similar methods as those described above with regard to step 206 and/or 215 as related to the first and/or second traffic routing rules, and/or as described further with regard to FIG. 4. In some instances, the policies may be distributed, cached, and/or otherwise controlled by an intelligence policy manager system, as is described with regard to steps 206 and/or 215, and FIG. 5.

At step 224, the traffic routing and monitoring platform 102 may identify, based on the third traffic routing rules, an action to perform with regard to the third identity embedded DNS query request. For example, the traffic routing and monitoring platform 102 may identify, based on the third traffic routing rules, whether to allow, block, and/or monitor traffic directed to an IP address requested by the third identity embedded DNS query request (which may, e.g., correspond to the target server 108). For example, the traffic routing and monitoring platform 102 may identify that IP addresses corresponding to blacklisted domains should be blocked, access should be granted to IP addresses corresponding to whitelisted domains, and that traffic to and from IP addresses corresponding to watchlist domains should be monitored/logged. In some instances, in identifying the action to perform with regard to the third identity embedded DNS query request, the traffic routing and monitoring platform 102 may identify a disposition (e.g., allow or block), and may subsequently identify a corresponding directive (e.g., perform inspection, monitor, log, alert, perform packet capture, perform payload inspection, and/or other actions). For example, these directives may be performed in addition to a disposition of "allow" or "block." For illustrative purposes, at step 224, the traffic routing and monitoring platform 102 may identify, based on the third traffic routing rules, that traffic directed to the IP address requested by the third identity embedded DNS query request should be logged. For example, the traffic routing and monitoring platform 102 may identify, based on the third traffic routing rules, that the domain name sent in the third identity embedded DNS query request corresponds to a potential security threat and is listed on the watchlist (and thus that traffic to and from the corresponding IP address should be logged).

Figure 2G:
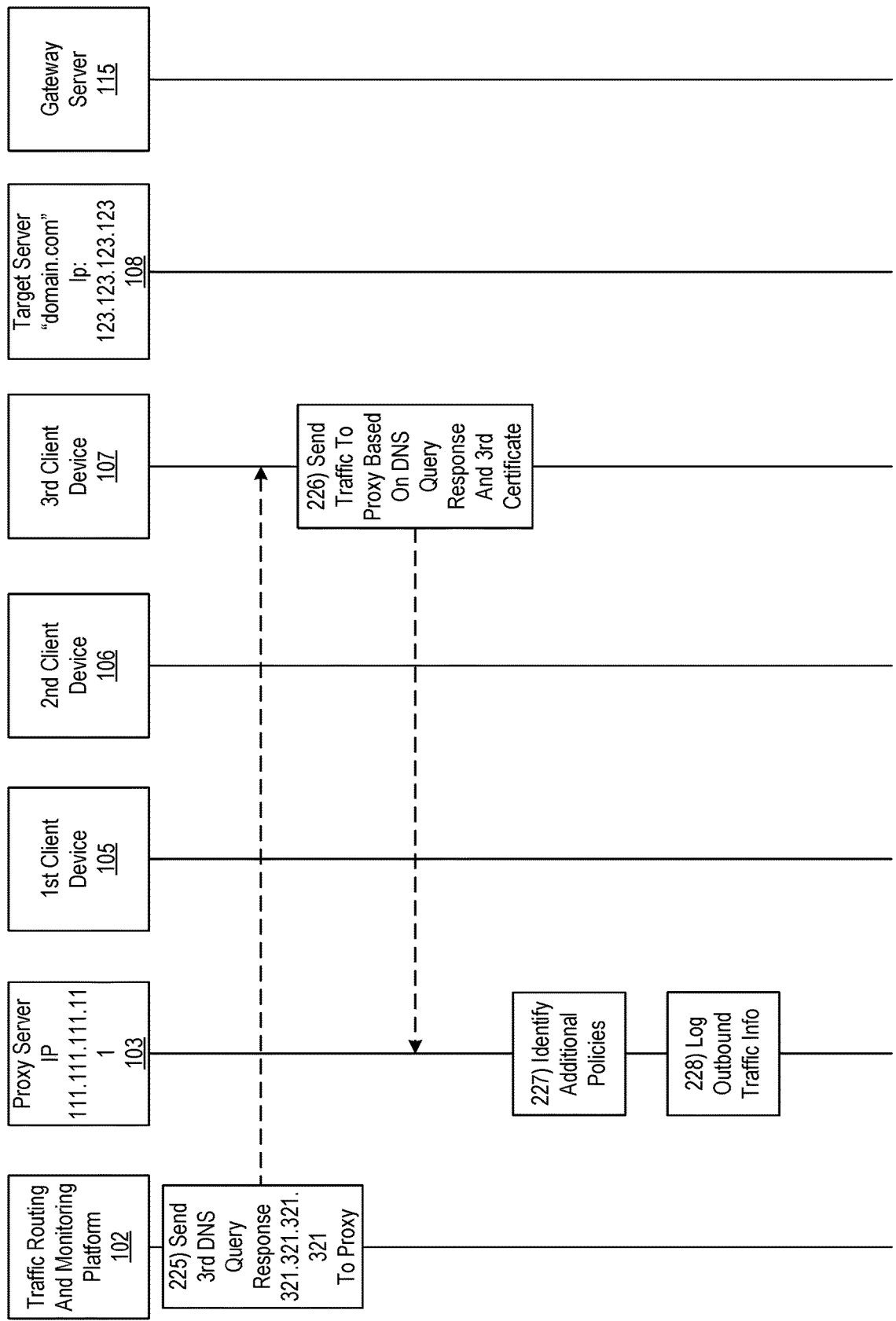
Figure 2I:
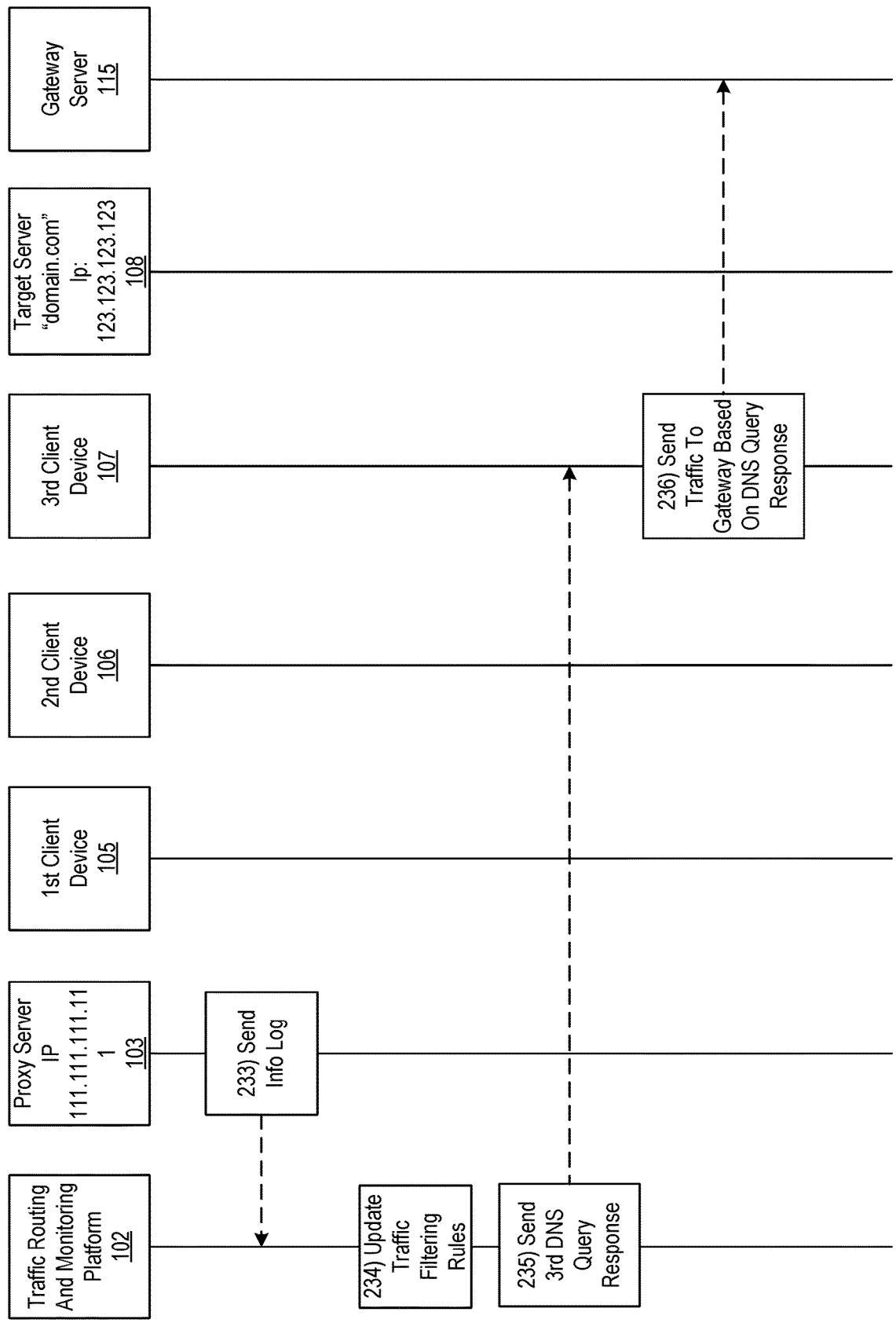

Referring to FIG. 2G, at step 225, the traffic routing and monitoring platform 102 may identify an IP address requested by the third identity embedded DNS query request (e.g., by performing actions similar to those described at step 208). In some instances, generation of the third identity embedded DNS query response may involve DNS caching as described above with regard to the first identity embedded DNS query response at step 208. Rather than merely forwarding this IP address to the third client device 107, however, based on identifying that the domain name of the third identity embedded DNS query request corresponds to a potential security threat for which traffic should be logged, the traffic routing and monitoring platform 102 may send a third identity embedded DNS query response that includes an IP address for the proxy server 103 (e.g., 111.111.111.111). In some instances, the traffic routing and monitoring platform 102 may also include a routing instruction (e.g., for traffic to be directed through the proxy server 103) within the third identity embedded DNS query response. In some instances, an agent may be used to include this routing instruction and an IP address for the proxy server 103 without eliminating an IP address from the third identity embedded DNS query response for the requested domain name.

In some instances, the traffic routing and monitoring platform 102 may send a third identity embedded DNS query response that includes both the requested IP address and the proxy IP address. For example, the traffic routing and monitoring platform 102 may send a third identity embedded DNS query response that includes the requested IP address embedded within the proxy IP address. In some instances, the third identity embedded DNS query response may include a DNS record, associating the domain name with the proxy IP address, and a time to live (e.g., a period of time for which the third identity embedded DNS query response may exist before expiration). In some instances, the traffic routing and monitoring platform 102 may send the third identity embedded DNS query response to the third client device 107 while the secure session is established with the third client device 107.

At step 226, the third client device 107 may access the target server 108 via the proxy server 103. For example, the third client device 107 may send traffic to the proxy server 103 using the proxy IP address (e.g., referred to herein as outgoing network traffic). In these instances, the third client device 107 may indicate the proxy IP address as the destination IP address and may include data directed to the domain name included in the third identity embedded DNS query request. In some instances, the third client device 107 may also send the third security certificate to the proxy server 103. For example, the proxy server 103 may, in some instances, prompt the third client device 107 to provide the third security certificate to the proxy server 103, and the third client device 107 may send the third certificate accordingly (which may, e.g., cause the proxy server 103 to identify the third user and/or the third client device 107). In doing so, the proxy server 103 may be configured to distinguish between requests from different users on the same device (e.g., in contrast to an IP address based method, which might not be able to distinguish between different users on the same device).

In instances where the third identity embedded DNS query response included the time to live, the third client device 107 may, in some instances, determine expiration of a DNS record that includes expiration of a DNS record for the proxy IP address. In these instances, rather than accessing the proxy server 103, the third client device 107 may return to step 222 (e.g., to request an updated DNS response). In some instances, the third traffic routing rules may have been updated during the live period of the DNS record. For example, the third traffic routing rules may have been updated to indicate that traffic should be blocked from or allowed to the requested IP address. In these instances, similar actions as those described above with regard to the first and second identity embedded DNS query responses (e.g., with regard to allowing or blocking the traffic, respectively) may be performed by the traffic routing and monitoring platform 102 and/or proxy server 103. In some instances, any intelligence corresponding to the third user and/or the domain name in the third identity embedded DNS query request (e.g., as identified by the traffic routing and monitoring platform 102) may be sent to the proxy server 103 along with the traffic.

At step 227, the proxy server 103 may optionally identify an identity of the user of the third client device 107. For example, based on the third security certificate, the proxy server 103 may identify the third user (e.g., using similar techniques as those described above at step 221). Additionally or alternatively, the proxy server 103 may receive information indicating the identity of the third user (e.g., from the traffic routing and monitoring platform 102 once identified at step 221).

Once the identity of the third user is determined by the proxy server 103, the proxy server 103 may identify traffic monitoring rules, based on the identity of the third user. In some instances, these may be the same as the third traffic monitoring rules, identified at step 223. In other instances, these may be different traffic monitoring rules than those identified at step 223. For example, the proxy server 103 may maintain a database of traffic routing rules corresponding to each of a plurality of users, and may identify (e.g., by indexing the database) the traffic monitoring rules corresponding to the third user. In some instances, the traffic monitoring rules may indicate traffic associated with a potential security threat for which traffic should be logged/monitored, metadata to be collected for the traffic associated with the potential security threat, sampling rates, sampling frequencies, and/or other information.

After identifying the traffic monitoring rules, the proxy server 103 may identify, based on the traffic monitoring rules, an action to perform with regard to the traffic received from the third client device 107. For example, the proxy server 103 may identify traffic logging actions/policies for the third user. In doing so, the proxy server 103 may apply an additional layer of policy customization based on user identity (e.g., in addition to the third traffic routing rules determined at step 223).

At step 228, the proxy server 103 may log/monitor information of the outbound traffic (e.g., traffic sent from the third client device 107 to the proxy server 103). In some instances, the terms logging and monitoring may be used interchangeably throughout the specification, and may refer to proxying traffic, collecting metadata associated with the traffic, performing packet capture, performing deep packet inspection, performing payload inspection, and/or performing other actions. For example, the proxy server 103 may log the information in a stored data log. In some instances, the proxy server 103 may log the information based on the traffic monitoring rules (e.g., specified metadata, at a specified rate/frequency, and/or otherwise), which may, e.g., be specific to the third user as described above. For example, the proxy server 103 may log one or more of: sender domains, recipient domains, time information, date information, and/or other information. In some instances, the proxy server 103 may perform the logging in real time.

Referring to FIG. 2H, at step 229, the proxy server 103 may identify the destination IP address (e.g., the IP address for the target server 108). For example, the proxy server 103 may identify the destination IP address based on the proxy IP address (which may, in some instances, include the destination IP address embedded within the proxy IP address). In some instances, the proxy server 103 may resolve the destination IP address after receiving the outgoing traffic. After identifying the destination IP address, the proxy server 103 may forward the outbound traffic to the target server 108 (e.g., via a wired or wireless data connection).

At step 230, the target server 108 may send inbound traffic (e.g., responsive to the outbound traffic sent at step 229) to the proxy server 103 (e.g., via a wired or wireless data connection).

At step 231, the proxy server 103 may log information of the inbound traffic (e.g., in the same stored data log). In doing so, the proxy server 103 may log information of traffic passing through the proxy server 103 in both directions. In some instances, the proxy server 103 may log the information based on the traffic monitoring rules, which may, e.g., be specific to the third user as described above. For example, the proxy server 103 may log one or more of: sender domains, recipient domains, time information, date information, and/or other information. In some instances, the proxy server 103 may log the information of the inbound traffic in real time.

In some instances, the proxy server 103 may update the traffic monitoring rules based on the logged information. For example, the proxy server 103 may increase, reduce, or maintain a frequency with which traffic information is logged. For example, if malicious activity is identified (e.g., over a predetermined period of time, after detection of a predetermined amount of traffic, and/or otherwise), the proxy server 103 may modify the traffic monitoring rules for traffic information to be logged with increased frequency. Alternatively, if no malicious activity is identified (e.g., over a predetermined period of time, after detection of a predetermined amount of traffic, and/or otherwise), the proxy server 103 may modify the traffic monitoring rules to reduce frequency with which traffic information is logged.

At step 232, the proxy server 103 may route the inbound traffic to the third client device 107 (e.g., via a wired or wireless data connection).

At step 233, proxy server 103 may send the stored data log to the traffic routing and monitoring platform 102 (e.g., via a wired or wireless data connection). Although step 233 is shown after routing of the inbound and outbound traffic, this is for illustrative purposes only. For example, the data log may, in some instances be continuously shared between the proxy server 103 and the traffic routing and monitoring platform 102, in real time as traffic is logged, and/or at a predetermined interval. For example, in some instances, the data log may be made available in real time to enable immediate action based on the data log. For example, the data log may be provided to the traffic routing and monitoring platform 102, to enable the traffic routing and monitoring platform 102 to update the third traffic routing rules and/or other intelligence based on the data log. In doing so, the traffic routing rules may be continuously and dynamically updated on a per user basis (regardless of whether or not the user has multiple devices and/or if multiple users use the same device).

At step 234, the traffic routing and monitoring platform 102 may update the third traffic routing rules based on the stored data log. For example, the traffic routing and monitoring platform 102 may update actions to be performed for the third user at the IP address corresponding to the target server 108. For example, if malicious activity is identified (e.g., over a predetermined period of time, after detection of a predetermined amount of traffic, and/or otherwise), the traffic routing and monitoring platform 102 may modify the third traffic routing rules to cause traffic directed to the target server 108 to be blocked. Alternatively, if no malicious activity is identified (e.g., over a predetermined period of time, after detection of a predetermined amount of traffic, and/or otherwise), the traffic routing and monitoring platform 102 may modify the third traffic routing rules to cause traffic directed to the target server 108 to be allowed without further monitoring. In doing so, the traffic routing and monitoring platform 102 may dynamically modify, update, and/or otherwise refine the third traffic routing rules based on the logged activity (which may, e.g., continuously improve performance and effectiveness of the third traffic routing rules). Examples of such modifications and the handling of different records that may be returned and/or requested by the DNS system are shown in the table below.

| Record Name | Example | Expected Behavior |
| --- | --- | --- |
| A-Records | Returns a 32-bit IP address | Blocked Domain Return sinkhole IP with landing page informing user that the domain is blocked. Log the domain which was blocked. Allowed Domain, Blocked IP in a Record Return IP that is not blocked, if no allowed IP is available, sinkhole IP to landing page. Log domain which was allowed, log allowed IP, log blocked IP. Allowed Domain in Intelligence Return most relevant A record IP. Log domain which was allowed, log returned A record IP. |
| C-NAME | first.example.com CNAME second.example.com. | Check the requested domain against CTI. Block Requested Domain Return sinkhole domain as alias record. Log requested domain. Allow Requested Domain Follow expected behavior for A records. Log requested domain, connect this log to the log of the A record. |
| SOA (Start of Authority Record) | $TTL 86400 @ IN SOA first.domain.com. second.domain.com (2020080302; Serial 7200; Refresh 3600; Retry 1209600; Expire 3600; Negative response caching TTL) | Blocked Domain In the event that a zone is requested by a client DNS server for a blocked domain, CDNS should invalidate the request. Log the domain/zone that was requested. Allowed Domain in Intelligence In the event that a zone is requested for an allowed domain which is present in CTI, the requested zone information may be returned. Log the domain/zone information that was requested. |
| PTR (DNS Pointer Records) | PTR record for the IP address may be stored under a second IP address. | Blocked Domain In the event that an IP is submitted that points to a blocked domain, return a sinkholed domain. Log the requested domain. Log the IP submitted for the PTR request. Allowed Domain, Blocked Submitted IP Submitted IP is blocked in CTI, return a sinkholed domain. Log submitted IP, log potentially returned domain. Allowed Domain in Intelligence |

-continued

| Record Name Example | Expected Behavior |
| --- | --- |
| | Submitted IP is NOT in intelligence, domain is in intelligence and is allowed. Return requested domain. Log submitted IP, log returned domain. |
| | Allowed IP in Intelligence Submitted IP is in intelligence and is allowed. Domain is not in intelligence. Return requested domain. Log submitted IP, log returned domain. |

Although the first identity embedded DNS query request, second identity embedded DNS query request, and third identity embedded DNS query request are described as including a domain name corresponding to an IP address for the target server 108, this is for illustrative purposes only, and the DNS queries may request different IP addresses without departing from the scope of this disclosure. Furthermore, although a single proxy server 103 is shown, any number of proxy servers may be implemented without departing from the scope of this disclosure. For example, in some instances, different users (or groups of users) may be directed to different proxy servers.

Although steps 225-234 describe the use of the proxy server 103 to perform the traffic monitoring and/logging, in some instances, steps 225-234 may be replaced by steps 235-242, which are described below and illustrate the use of a gateway server 115 (rather than the proxy server 103) for performing the traffic monitoring and logging. In some instances, these techniques described below may address current deficiencies in the use of a proxy server. For example, where grayzone traffic (e.g., traffic to be logged, monitored, or the like by the proxy server 103) is to be directed to the proxy server 103, a DNS response must be modified to include the IP address of the proxy server (e.g., rather than the requested IP address). In these instances, however, any connection between the requested IP address and it's corresponding DNS record may disappear (e.g., due to the replacement of the requested IP address with the proxy IP address). Accordingly, in some instances, redirection to the proxy server 103 may be successful for HTTP requests, but may be limited in its use for other protocols (e.g., file transfer protocol (FTP), or the like). For example, requests implemented across such other protocols might not include an original intent associated with the request (e.g., an intent to access the target server 108), or the like. Accordingly, to support the traffic logging/monitoring of traffic for these other protocols, the proxy server 103 may be replaced with the use of the gateway server 115 (as is described herein).

At step 235, the traffic routing and monitoring platform 102 may identify an IP address requested by the third identity embedded DNS query request (e.g., by performing actions similar to those described at step 208 and/or 225). In some instances, generation of the third identity embedded DNS query response may involve DNS caching as described above with regard to the first identity embedded DNS query response at step 208. Rather than merely forwarding this IP address to the third client device 107, however, based on identifying that the domain name of the third identity embedded DNS query request corresponds to a potential security threat for which traffic should be logged, the traffic routing and monitoring platform 102 may send a third identity embedded DNS query response that includes the requested IP address (e.g., 123.123.123.123) along with a routing instruction, which may, e.g., cause the traffic routing and monitoring platform 102 to route traffic to the IP address (e.g., of the target server 108) via the gateway server 115 (e.g., by including an IP address of the gateway server 115 in the routing instruction). In some instances, any remaining traffic (e.g., corresponding to domain names, IP addresses, or the like, which do not correspond to potential security threats, may be routed directly to the requested IP address.

In some instances, the third client device 107 may be pre-configured with an agent, which may, e.g., be configured to interpret the routing instruction, and to direct traffic to the target server 108 via the gateway server 115. For example, the agent may encapsulate a connection between the third client device 107 and the target server 108, but route traffic to the gateway server 115 rather than the target server 108 (e.g., tunneling the traffic across the gateway server 115). This may effectively leverage the traffic routing and monitoring platform 102 to create an on demand router, which may enable the redirection and/or pivoting of IP protocol communications for any type of corresponding protocol to a specified tunneling gateway.

By doing so, the traffic routing and monitoring platform 102 may enable the monitoring/logging of traffic without replacing the IP address for the requested domain name and thus changing the destination IP address, rather the traffic routing and monitoring platform 102 may modify how traffic to the destination IP address is routed (e.g., in contrast to the methods described at step 225, where the requested IP address is replaced with an IP address for the proxy server 103).

As an additional advantage over the use of the proxy server 103, this gateway approach may more effectively convey identities. For example, if a proxy IP address is returned to the third client device 107, it may be difficult to verify the corresponding user's identity when they connect to the proxy server 103 via certain protocols. By providing the requested IP address, however, along with a routing instruction for the gateway server 115, the user identity may be effectively conveyed regardless of protocol, port, or the like. For example, because the agent may be aware of the user identity, it may configure the gateway tunnel based on the known identity, and may route traffic through the tunnel accordingly (which may, e.g., convey both the intended destination of the target server 108, and the user identity).

As yet an additional advantage of the use of the proxy server 103, the gateway approach may be more effective in conveying an identity context received from the third client device 107. For example, in instances where traffic is routed to the proxy server 103, the proxy server 103 may terminate a connection between the third client device 107 once traffic is received, and may establish a new connection with the target server 108 in order to route traffic accordingly. In some instances, the termination of the connection (with the third client device 107) by the proxy server 103 may present challenges to conveying identity and/or other information. For example, the third client device 107 may be provided with the IP address for the proxy server 103, and may connect to the proxy server 103 accordingly using this IP address. Once traffic is received at the proxy server 103, the proxy server 103 may terminate the connection with the third client device 107, and then make a new connection out to the target server 108, through which the traffic is passed through. Accordingly, the proxy server 103 may introduce a terminal endpoint to the initial connection with the third client device 107. This may make it difficult to tie the original DNS request (e.g., the third identity embedded DNS query request) to the user identity. For example, if the third identity embedded DNS query response indicating the proxy IP address is cached (e.g., on a local recurser, or the like), other users may reach out to the proxy IP address without an existing DNS record. This may result in loss of information and difficulty in correlation. In contrast, use of the gateway server 115, may allow an initially established connection with the third client device 107 to be maintained, and may instead modify and/or otherwise encapsulate the connection. In these instances, the agent may tie the user identity with the encapsulation, thus providing an identity context (which may, e.g., include identity information, time information, IP address information, or the like which may indicate why the encapsulation tunnel is being established) for all corresponding traffic, without changing any headers or aspects of a corresponding payload. Accordingly, by implementing the gateway server 115, the identity and communication may be tied together without termination of this correlation at the proxy server 103.

As yet an additional advantage, existing client devices might not be configured such that only a portion of their traffic (e.g., traffic to known bad IP addresses, or the like) is routed via a proxy server, with the remaining traffic sent directly to the corresponding target servers. Rather, such traffic may be routed through the proxy server in its entirety or not at all Accordingly, by implementing the techniques described herein, the gateway server 115 may be applied with a higher level of granularity to receive, and subsequently log/monitor, a subset of the traffic for which it is requested and/or otherwise defined by policy.

Furthermore, this may offer advantages over traditional IP based routing where traffic to various IP addresses may be selectively routed through different tunnels. For example, the described systems and methods may be significantly more scalable. For example, devices used to implement such traditional IP based routing may be limited in their processing resources and/or capabilities, which might prevent the scalability described herein. As a particular example, rather than sending, to the third client device 107 a large number of IP addresses for which traffic should be logged (some of which might, e.g., never be accessed by the third client device 107), DNS may be leveraged to identify which IP addresses the third client device 107 will actually connect to, and dynamically insert routing instructions into a DNS query response (e.g., the third identity embedded DNS query response) to re-route through the gateway server 115 for a particular period of time (e.g., 24 hours, or the like). In some instances, these techniques may implement one or more aspects of the technology described in U.S. Pat. No. 10,715,493, filed Jul. 3, 2019, and entitled "METHODS AND SYSTEMS FOR EFFICIENT CYBER PROTECTIONS OF MOBILE DEVICES," and/or U.S. Pat. No. 11,582,191, filed Feb. 10, 2022, and entitled "CYBER PROTECTIONS OF REMOTE NETWORKS VIA SELECTIVE POLICY ENFORCEMENT AT A CENTRAL NETWORK," the disclosures of which are incorporated by reference herein in its entirety.

In some instances, where the third client device 107 is pre-configured with the agent, as an alternative to routing traffic through the proxy server 103 (as is described above with regard to steps 225-234) or the gateway server 115 (as is described here with regard to steps 235-242), the traffic routing and monitoring platform 102 may send an identified disposition (e.g., block or allow) and/or directive (e.g., perform inspection, monitor, log, alert, perform packet capture, perform payload inspection, and/or other actions), which may, e.g., have been identified using similar techniques to those described with regard to the first, second, and/or third identity embedded DNS query requests, may be sent to the third client device 107 (e.g., as part of the third identity embedded DNS query response) for local storage. In some instances, along with the identified disposition/directives, the traffic routing and monitoring platform 102 may provide the requested IP address. In these instances, the third client device 107 may perform, execute, and/or otherwise enforce the disposition and/or directive itself (e.g., rather than performing these actions at the traffic routing and monitoring platform 102, proxy server 103, gateway server 115, or the like) with regard to traffic between the third client device 107 and the target server 108. In some instances, the third client device 107 may store these dispositions and/or directives (e.g., update a local cached ruleset), and may, in some instances, automatically enforce them for future requests (associated with the same identity) for the requested IP address. In some instances, these techniques may implement one or more aspects of the technology described in U.S. Pat. No. 11,012,417, filed Apr. 30, 2019, and entitled "METHODS AND SYSTEMS FOR EFFICIENT PACKET FILTERING," and/or U.S. Pat. No. 11,012,414, filed Nov. 22, 2019, and entitled "METHODS AND SYSTEMS FOR PREVENTION OF ATTACKS ASSOCIATED WITH THE DOMAIN NAME SYSTEM," the disclosures of which are incorporated by reference herein in its entirety. In some instances, these dispositions and/or directives may be stored using an efficient data structure that enables them to be implemented by the third client device 107 itself. In some instances, these techniques may implement one or more aspects of the technology described in U.S. Pat. No. 10,715,493, filed Jul. 3, 2019, and entitled "METHODS AND SYSTEMS FOR EFFICIENT CYBER PROTECTIONS OF MOBILE DEVICES," the disclosure of which is incorporated by reference herein in its entirety. In some instances, this may include routing, by the third client device 107, identity embedded DNS query requests through a virtual private network (VPN). In some instances, these techniques may implement one or more aspects of the technology described in U.S. Pat. No. 11,582,191, filed Feb. 10, 2022, and entitled "CYBER PROTECTIONS OF REMOTE NETWORKS VIA SELECTIVE POLICY ENFORCEMENT AT A CENTRAL NETWORK," the disclosure of which is incorporated by reference herein in its entirety. By providing the relevant dispositions and/or directives to the third client device 107 corresponding to requested IP addresses, the traffic routing and monitoring platform 102 may optimize policy storage at the third client device 107 by performing ad-hoc rule delivery (e.g., providing only relevant policy information (e.g., the dispositions and/or directives) for a given IP address for a given identity). In some instances, where policy information is updated (e.g., at the traffic routing and monitoring platform 102), the locally stored policy information (e.g., at the third client device 107) may be updated accordingly.

Returning to the gateway embodiment described with regard to steps 235-243, the traffic routing and monitoring platform 102 may send a third identity embedded DNS query response that includes both the requested IP address and the proxy IP address. For example, the traffic routing and monitoring platform 102 may send a third identity embedded DNS query response that includes the requested IP address embedded within the proxy IP address. In some instances, the third identity embedded DNS query response may include a DNS record, associating the domain name with the proxy IP address, and a time to live (e.g., a period of time for which the third identity embedded DNS query response may exist before expiration). In some instances, the traffic routing and monitoring platform 102 may send the third identity embedded DNS query response to the third client device 107 while the secure session is established with the third client device 107.

At step 236, the third client device 107 may access the target server 108 via the gateway server 115. For example, the third client device 107 may send traffic to the gateway server 115 based on the routing instruction (e.g., referred to herein as outgoing network traffic). In these instances, the third client device 107 may indicate the requested IP address as the destination IP address and may include data directed to the domain name included in the third identity embedded DNS query request. In some instances, the third client device 107 may include identity information as part of the identity embedded DNS query request, which may enable the gateway server 115 to distinguish between requests from different users on the same device (e.g., in contrast to an IP address based method, which might not be able to distinguish between different users on the same device).

In instances where the third identity embedded DNS query response included the time to live, the third client device 107 may, in some instances, determine expiration of a DNS record that includes expiration of a DNS record for the target server 108. In these instances, rather than accessing the target server 108 via the gateway server 115, the third client device 107 may return to step 222 (e.g., to request an updated DNS response). In some instances, the third traffic routing rules may have been updated during the live period of the DNS record. For example, the third traffic routing rules may have been updated to indicate that traffic should be blocked from or allowed to the requested IP address. In these instances, similar actions as those described above with regard to the first and second identity embedded DNS query responses (e.g., with regard to allowing or blocking the traffic, respectively) may be performed by the traffic routing and monitoring platform 102 and/or proxy server 103. In some instances, any intelligence corresponding to the third user and/or the domain name in the third identity embedded DNS query request (e.g., as identified by the traffic routing and monitoring platform 102) may be sent to the gateway server 115 along with the traffic.

Figure 2J:
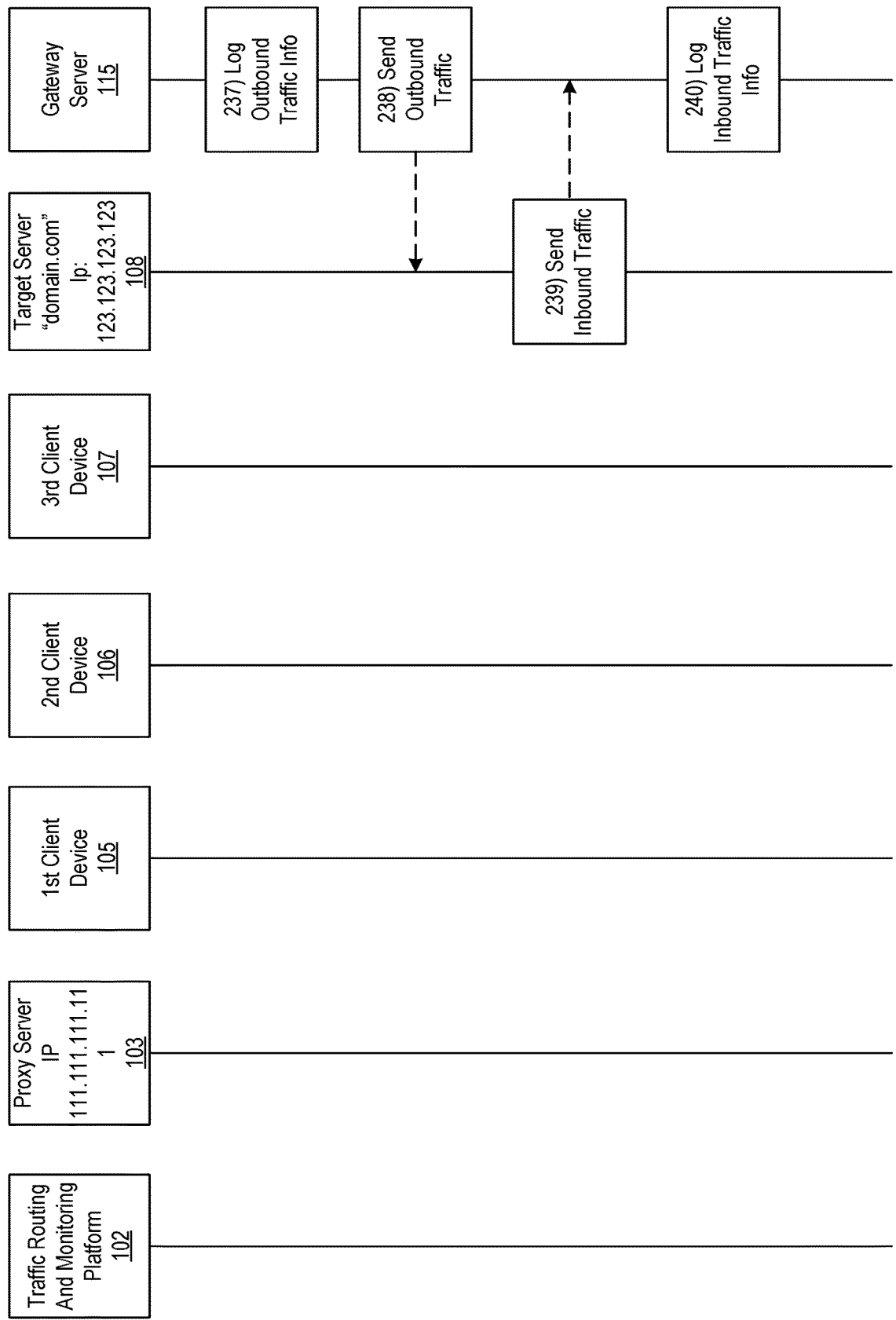

Referring to FIG. 2J, at step 237, the gateway server 115 may log/monitor information of the outbound traffic (e.g., traffic sent from the third client device 107 to the gateway server 115). As is described above, in some instances, the terms logging and monitoring may be used interchangeably throughout the specification, and may refer to proxying traffic, collecting metadata associated with the traffic, performing packet capture, performing deep packet inspection, performing payload inspection, and/or performing other actions. For example, the gateway server 115 may log the information in a stored data log. In some instances, the gateway server 115 may log the information based on traffic monitoring rules (e.g., specified metadata, at a specified rate/frequency, and/or otherwise), which may, e.g., be specific to the third user as described above. For example, the gateway server 115 may log one or more of: sender domains, recipient domains, time information, date information, and/or other information. In some instances, the gateway server 115 may perform the logging in real time.

At step 238, the gateway server 115 may identify the destination IP address (e.g., the IP address for the target server 108). For example, the proxy server 103 may identify the destination IP address based on the third identity embedded DNS query request (which may, e.g., include the destination IP address). After identifying the destination IP address, the gateway server 115 may forward the outbound traffic to the target server 108 (e.g., via a wired or wireless data connection).

At step 239, the target server 108 may send inbound traffic (e.g., responsive to the outbound traffic sent at step 238) to the gateway server 115 (e.g., via a wired or wireless data connection).

At step 240, the gateway server 115 may log information of the inbound traffic (e.g., in the same stored data log). In doing so, the gateway server 115 may log information of traffic passing through the gateway server 115 in both directions. In some instances, the gateway server 115 may log the information based on the traffic monitoring rules, which may, e.g., be specific to the third user as described above. For example, the gateway server 115 may log one or more of: sender domains, recipient domains, time information, date information, and/or other information. In some instances, the gateway server 115 may log the information of the inbound traffic in real time.

In some instances, the gateway server 115 may increase, reduce, or maintain a frequency with which traffic information is logged. For example, if malicious activity is identified (e.g., over a predetermined period of time, after detection of a predetermined amount of traffic, and/or otherwise), the log traffic with increased frequency. Alternatively, if no malicious activity is identified (e.g., over a predetermined period of time, after detection of a predetermined amount of traffic, and/or otherwise), the proxy server 103 may modify reduce frequency with which traffic information is logged.

Referring to FIG. 2K, at step 241, the gateway server 115 may route the inbound traffic to the third client device 107 (e.g., via a wired or wireless data connection).

At step 242, gateway server 115 may send the stored data log to the traffic routing and monitoring platform 102 (e.g., via a wired or wireless data connection). Although step 242 is shown after routing of the inbound and outbound traffic, this is for illustrative purposes only. For example, the data log may, in some instances be continuously shared between the gateway server 115 and the traffic routing and monitoring platform 102, in real time as traffic is logged, and/or at a predetermined interval. For example, in some instances, the data log may be made available in real time to enable immediate action based on the data log. For example, the data log may be provided to the traffic routing and monitoring platform 102, to enable the traffic routing and monitoring platform 102 to update the third traffic routing rules and/or other intelligence based on the data log. In doing so, the traffic routing rules may be continuously and dynamically updated on a per user basis (regardless of whether or not the user has multiple devices and/or if multiple users use the same device).

At step 243, the traffic routing and monitoring platform 102 may update the third traffic routing rules based on the stored data log. For example, the traffic routing and monitoring platform 102 may update actions to be performed for the third user at the IP address corresponding to the target server 108. For example, if malicious activity is identified (e.g., over a predetermined period of time, after detection of a predetermined amount of traffic, and/or otherwise), the traffic routing and monitoring platform 102 may modify the third traffic routing rules to cause traffic directed to the target server 108 to be blocked. Alternatively, if no malicious activity is identified (e.g., over a predetermined period of time, after detection of a predetermined amount of traffic, and/or otherwise), the traffic routing and monitoring platform 102 may modify the third traffic routing rules to cause traffic directed to the target server 108 to be allowed without further monitoring. In doing so, the traffic routing and monitoring platform 102 may dynamically modify, update, and/or otherwise refine the third traffic routing rules based on the logged activity (which may, e.g., continuously improve performance and effectiveness of the third traffic routing rules).

Although the first identity embedded DNS query request, second identity embedded DNS query request, and third identity embedded DNS query request are described as including a domain name corresponding to an IP address for the target server 108, this is for illustrative purposes only, and the DNS queries may request different IP addresses without departing from the scope of this disclosure. Furthermore, although a single gateway server 115 is shown, any number of gateway servers may be implemented without departing from the scope of this disclosure. For example, in some instances, different users (or groups of users) may be directed to different gateway servers. In addition, although methods for allowing, blocking, and logging traffic are shown in sequence, this is for illustrative purposes only, and requests may be allowed, blocked, and logged simultaneously and/or in any other sequence without departing from the scope of the disclosure.

Figure 3:
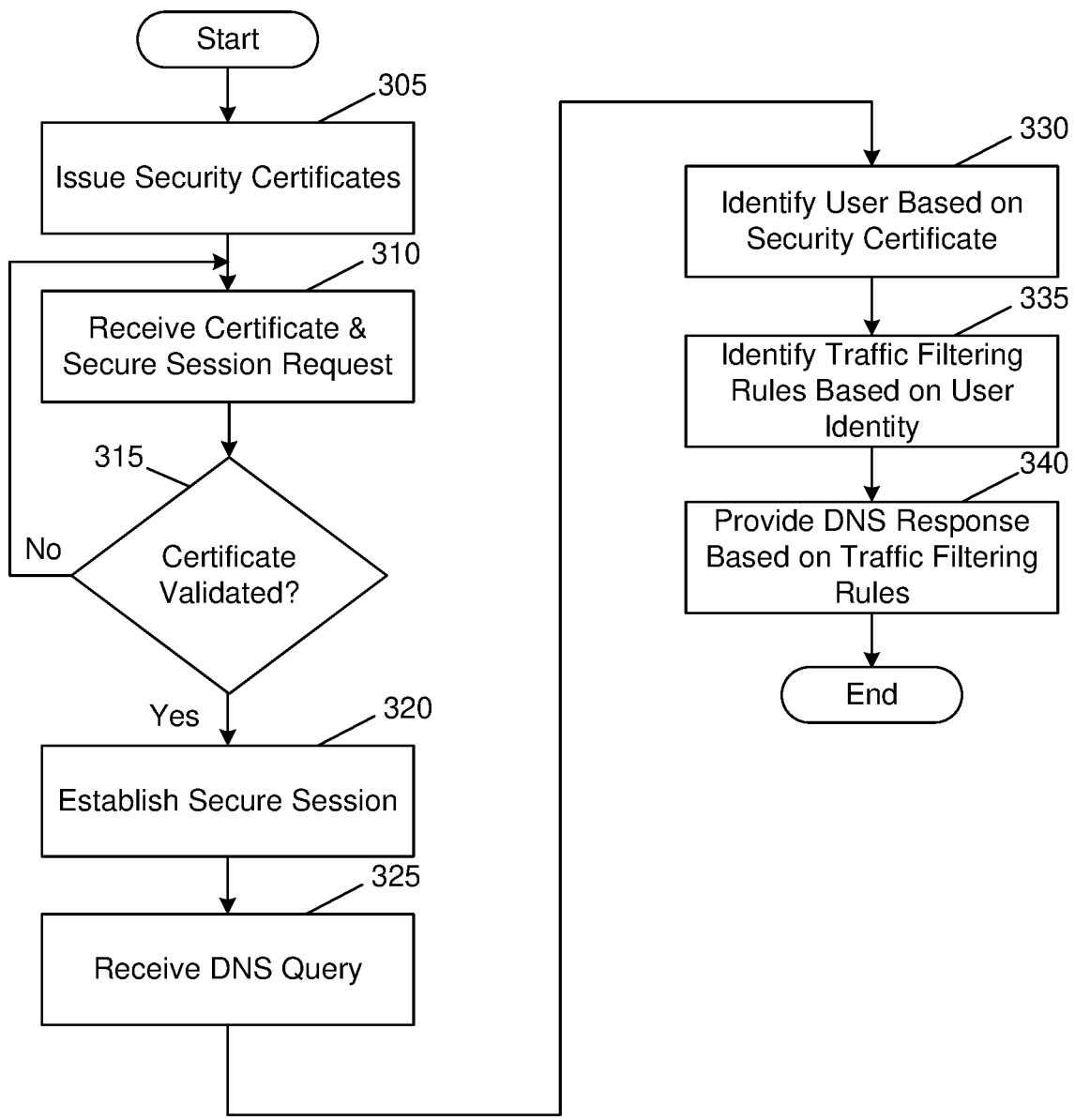
FIG. 3 depicts an illustrative method for improved traffic routing and monitoring in accordance with one or more example embodiments.

FIG. 3 depicts an illustrative method for traffic routing and monitoring in accordance with one or more example embodiments. Referring to FIG. 3, at step 305, a computing platform having at least one processor, a communication interface, and memory may issue a security certificate to a client device. For example, the computing platform may issue a certificate that may identify the client device and/or a user of the client device. In some instances, the security certificate may be used to establish a secure session and/or secured DNS channel between the computing platform and the security certificate.

At step 310, the computing platform may receive, from the client device, a security certificate and a request to establish a secure session. In some instances, the request may indicate an intent to establish a secured DNS channel between the computing platform and the client device.

At step 315, the computing platform may validate the security certificate. For example, the computing platform may perform a handshake with the client device, where the computing platform validates the security certificate, and the client device authenticates information of the computing platform (e.g., a certificate, signature, and/or other authentication mechanism). If the security certificate is not validated, the computing platform may return to step 310. If the security certificate is validated, the computing platform may proceed to step 320.

At step 320, the computing platform may establish a secure session with the client device. For example, the computing platform may establish a secured DNS channel between the client device and the computing platform.

At step 325, the computing platform may receive an encrypted DNS query request from the client device. For example, the computing platform may receive a request for an IP address corresponding to a particular domain name, which may be provided in the encrypted DNS query request.

At step 330, the computing platform may identify the user of the client device based on the security certificate. At step 335, the computing platform may identify traffic routing rules based on the user identity. For example, the computing platform may index a database based on the user identity to identify corresponding traffic routing rules, which may indicate whether traffic directed to particular IP addresses should be blocked, allowed, or logged.

At step 340, the computing platform may provide an encrypted DNS query response to the client device based on the traffic routing rules. For example, if the traffic routing rule corresponding to the requested IP address and the user indicates that traffic should be allowed, the computing platform may provide the requested IP address as the encrypted DNS query response. If the traffic routing rule corresponding to the requested IP address and the user indicates that traffic should be blocked, the computing platform may provide an indication that the requested IP address is not accessible as the encrypted DNS query response. If the traffic routing rule corresponding to the requested IP address and the user indicates that traffic should be logged, the computing platform may provide an IP address for a proxy server, which may be configured to monitor the traffic between the user device and the target server corresponding to the requested IP address.

Figure 4:
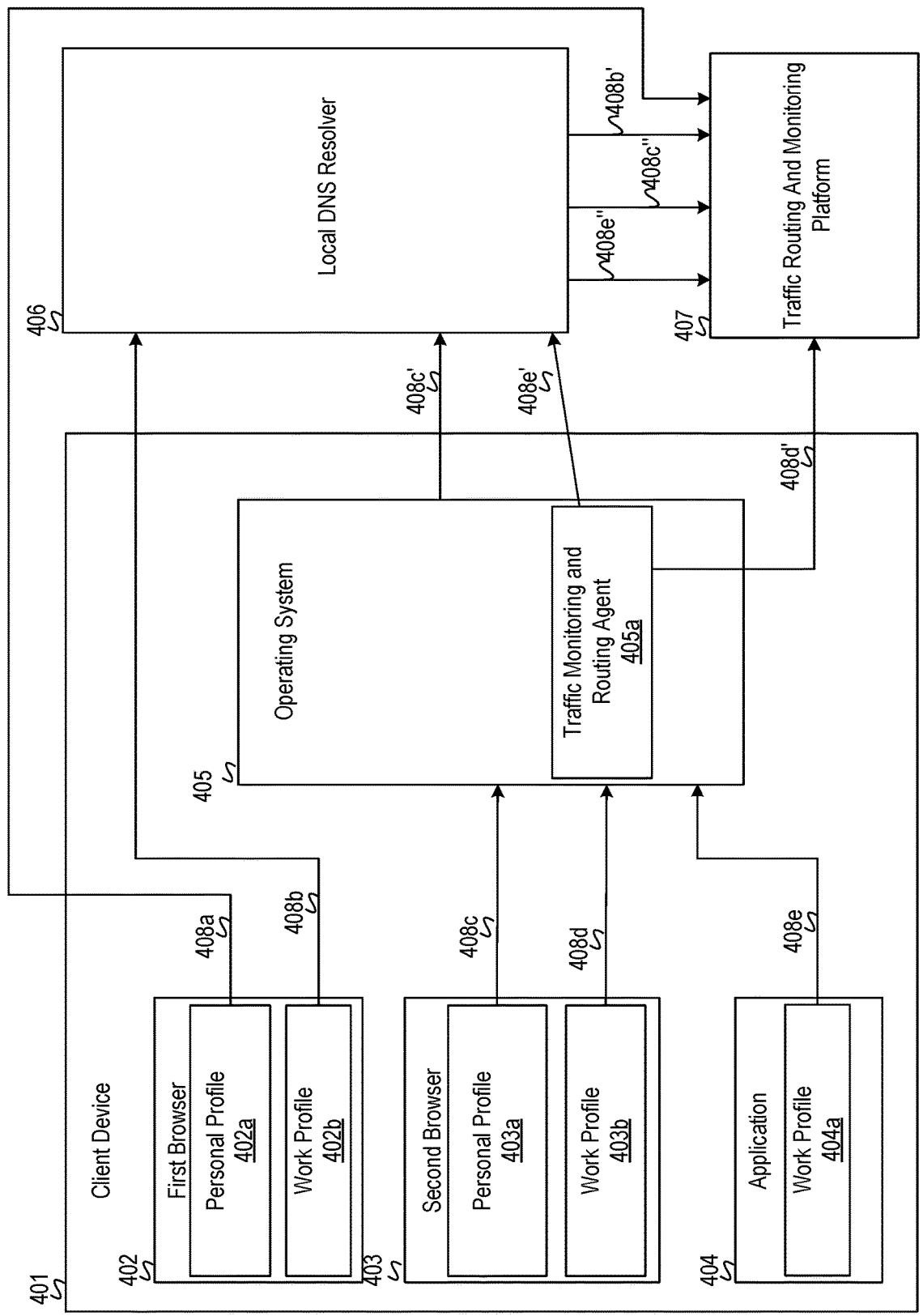
FIGS. 4 and 5 depict illustrative diagrams to illustrate improved traffic routing and monitoring in accordance with one or more example embodiments.

FIG. 4 depicts an illustrative example of traffic routing and monitoring in accordance with one or more example embodiments. More specifically, FIG. 4 illustrates how and where identities can be embedded or assigned to a DNS request along a path between a client application and a traffic routing and monitoring platform. As shown in FIG. 4, a client device 401 (which may, e.g., be similar to first client device 105, second client device 106, third client device 107, and/or other client devices, as described above) may communicate with traffic routing and monitoring platform 407 (which may, e.g., be similar to traffic routing and monitoring platform 102, as described above). In communicating the DNS requests, the client device 401 may embed one or more identities (representative of a user, application, profile, operating system, or the like) into the request. In some instances, these DNS requests may be pass through (e.g., without change) and/or otherwise modified by one or more intermediaries on their way (e.g., local DNS resolver 406, or the like). In these instances, the intermediaries may similarly embed an identity (representative of an entity associated with the given intermediary device, or the like) into the DNS requests. Once the DNS requests reach their ultimate destination of the traffic routing and monitoring platform 407, the traffic routing and monitoring platform 407 may identify policies associated with each identity (e.g., using stored key/value pairs and/or other identity/policy pairs representative of the identities and the policies), and may generate an overall/comprehensive policy accordingly (which may, e.g., involve resolving conflicts between the identified policies).

As a first example, the client device 401 may send the first DNS query 408a from a personal profile 402a of a first browser 402. In this example, the client device 401 may embed an identity corresponding to client device 401, personal profile 402a, and the first browser 402 (e.g., a first identity) into the first DNS query 408a as a URL prefix using DoH. In this example, the first DNS query 408a may be directly received by the traffic routing and monitoring platform 407. The traffic routing and monitoring platform 407 may identify an identity/policy pair corresponding to the identity associated with the URL prefix to select a policy (e.g., a first policy) and may apply the first policy accordingly.

As a second example, the client device 401 may send the second DNS query 408b from a work profile 402b of the first browser 402. In this example, the client device 401 may embed an identity corresponding to the client device 401, the first browser 402, and the work profile 402b (e.g., a second identity) into the second DNS query 408b as a URL prefix using DoH. For example, the user may be represented by a different identity when making requests on their personal profile 402a versus their work profile 402b. In this example, the second DNS query 408b may be routed to the traffic routing and monitoring platform 407 via the local DNS resolver 406. Accordingly, the local DNS resolver 406 may embed a third identity (corresponding to the local DNS resolver 406) into the second DNS query 408b' as an update to the URL prefix. Accordingly, the traffic routing and monitoring platform 407 may receive both the second and third identities, identify corresponding identity/policy pairs, and select corresponding policies (for each of the second and third identities) accordingly (e.g., a second policy and a third policy).

As multiple policies are now identified by the traffic routing and monitoring platform 407, an overall or comprehensive policy may be identified. In instances where the second and third policies do not conflict, the traffic routing and monitoring platform 407 may generate an overall policy that is a summation of both the second and third policies, which may, e.g., allow both policies to be applied in their entirety. In instances where the second and third policies are in direct conflict, the traffic routing and monitoring platform 407 may select a dominant policy as the overall policy (e.g., select either the second policy or the third policy). In some instances, the traffic routing and monitoring platform 407 may select one or more dominant rules (e.g., rather than selecting the second policy or third policy in its entirety. In these instances, the traffic routing and monitoring platform 407 may select one or more dominant rules from the second policy and/or third policy (e.g., a rule from the second policy and a rule from the third policy, or the like). For example, the traffic routing and monitoring platform 407 may generate and/or otherwise associate precedence scores with the rules associated with each policy, and may select rules from one or more policies (e.g., the second policy and/or the third policy) by selecting a rule, from a conflicting pair of rules, that has a higher precedence score than the remaining rule. In instances where the second and third policies are in partial conflict, the traffic routing and monitoring platform 407 may resolve the second and third policies so as generate an overall policy that includes the attributes of one policy, and the other remaining non-conflicting attributes of the other policy based on specified criteria (e.g., dominance, ranking, or the like).

In some instances, in addition or as an alternative to combining and/or otherwise reconciling the policies themselves, the traffic routing and monitoring platform 407 may identify attributes corresponding to each identity, and may combine, add, delete, and/or reconcile other attributes for each identity. For example, each identity may comprise a collection of attributes. The traffic routing and monitoring platform 407 may identify some or all of the attributes corresponding to any received identities (e.g., user, profile, application operating system, devices, local network, customer, WAN IP, geographic context, and/or other information), and may resolve and/or combine the attributes accordingly to produce an overall identity. The traffic routing and monitoring platform 407 may then identify an appropriate associated policy corresponding to this overall identity. Once the overall policy is identified, it may be applied by the traffic routing and monitoring platform 407.

As a third example, the client device 401 may send the third DNS query 408c from a personal profile 403a of the second browser 403. In this example, the client device 401 might not be configured with a traffic routing and monitoring service or application corresponding to the traffic routing and monitoring platform 407, and thus, no identity may be embedded into the third DNS query 408c. In this example, the third DNS query 408c' may be routed by the operating system 405 to the local DNS resolver 406, which may then forward it to the traffic routing and monitoring platform 407. In this example, operating system 405 may process the third identity embedded DNS query request 408 and attach the fourth identity (corresponding to the operating system 405) into the third DNS query 408c' (for example, as part of a client certificate associated with the operating system as part of DoT), and may forward that third identity embedded DNS query request to the local resolver 406. Similarly, the local DNS resolver 406 may embed the third identity (corresponding to the local DNS resolver 406 as described above) into the third DNS query 408c" and embed that third identity as part of the DNS request inside the TLS tunnel of DoT. In these examples, the local DNS resolver 406 may be terminating an existing TLS session and establishing a new TLS session. Accordingly, the traffic routing and monitoring platform 407 may receive both the third and fourth identities, identify corresponding identity/policy pairs, and select corresponding policies (for each of the third and fourth identities) accordingly (e.g., the third policy and the fourth policy). These policies may be similarly reconciled by the traffic routing and monitoring platform 407 to identify an overall or comprehensive policy, as is described above, and then the overall policy may be applied by the traffic routing and monitoring platform 407. [01%] As a fourth example, the client device 401 may send the fourth DNS query 408d from a work profile 403b of the second browser 403. In this example, the fourth DNS query 408d may similarly be routed to the traffic routing and monitoring platform 407 via the operating system 405 and the local DNS resolver 406. However, in this example, unlike as described above with regard to the third DNS query 408c, the client device 401 may be configured with a traffic routing and monitoring agent 405a, and thus, an identity may be embedded in the fourth DNS query 408d' (e.g., a fifth identity representative of the client device 401, the second browser, and the work profile 403b). For example, the traffic routing and monitoring agent 405a may add a corresponding identity (e.g., a seventh identity representative of the traffic routing and monitoring agent 405a), and may then pass the fourth DNS query 408d' to the operating system 405, which may add its corresponding identity (e.g., the fifth identity). Alternatively, the operating system 405 may receive the fourth DNS query 408d, embed its corresponding identity (e.g., the fifth identity) and may then route the fourth DNS query 408d' to the traffic routing and monitoring agent 405a, which may subsequently add its corresponding identity (e.g., the seventh identity). In some instances, rather than embedding the seventh identity along with the fifth identity, the traffic monitoring and routing agent 405a may replace the fifth identity with the seventh identity, which may, e.g., supersede or add to the fifth identity. Accordingly, the traffic routing and monitoring platform 407 may receive the fourth identity, identify a corresponding identity/policy pair, and select/apply corresponding policy. In this example, if only one policy is selected, it need not be reconciled with other policies as is described in the above examples.

As a fifth example, the client device 401 may send the fifth DNS query 408e from a work profile 404a of the application 404. In this example, the client device 401 may embed an identity corresponding to client device 401, work profile 404a, and the application 404 (e.g., a sixth identity) into the fifth DNS query 408e as a URL prefix over DoH. In this example, the fifth DNS query 408e may similarly be routed to the traffic routing and monitoring platform 407 via the operating system 405 and the local DNS resolver 406. Then, as the fifth DNS query 408e is routed through the operating system 405 and the local DNS resolver 406, they may embed fourth identity (corresponding to the operating system 405) and the third identity (corresponding to the local DNS resolver 406) into the fifth DNS query (e.g., fifth DNS queries 408e' and 408e" respectively) (e.g., by modifying URL prefixes to hold multiple identities or to embed additional identities inside the DNS request). Accordingly, the traffic routing and monitoring platform 407 may receive the sixth identity, fourth identity, and fifth identity, identify corresponding identity/policy pairs, and select/apply corresponding policies. These policies may be similarly reconciled by the traffic routing and monitoring platform 407 to identify an overall or comprehensive policy, as is described above, and then the overall policy may be applied by the traffic routing and monitoring platform 407.

Accordingly, as illustrated and described for these examples, different policies/traffic routing rules may be applied in various different scenarios, despite each DNS request being sent by the same user from the same client device 401. Similarly, by enabling transmission of the DNS requests using identity based unencrypted or encrypted DNS requests, DoT/DoH, etc., multiple types of identity information may be attached or otherwise embedded into the DNS requests, which may, e.g., enable more granular policy determination (e.g., based on each specific identity).

Figure 6A:
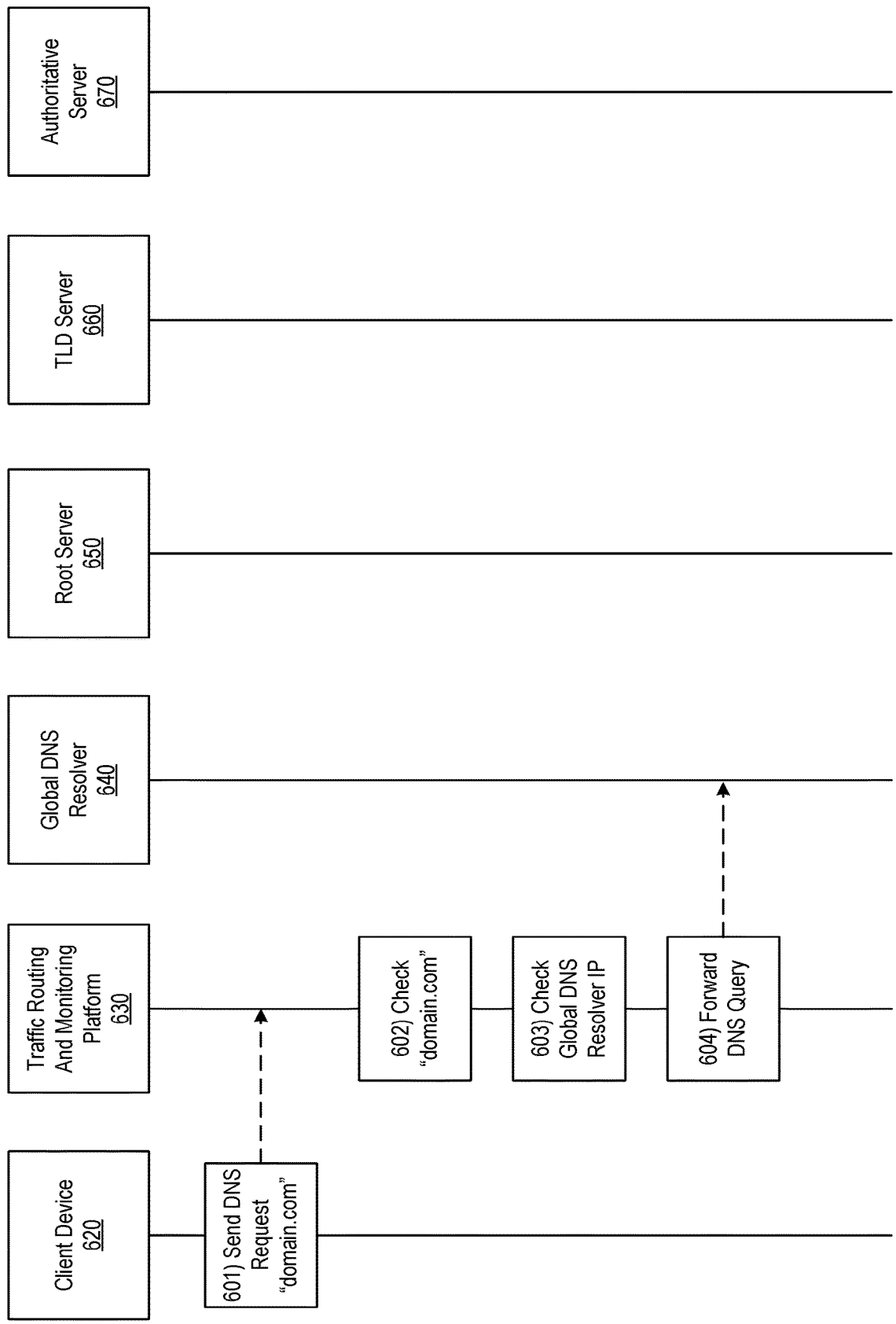
FIGS. 6A-6D depict an illustrative event sequence for improved traffic routing and monitoring in accordance with one or more example embodiments.

FIGS. 6A-6D depicts an illustrative event sequence for improved traffic routing and monitoring in accordance with one or more example embodiments. Referring to FIG. 6A, at step 601, the client device 620 (which may, e.g., be similar to first client device 105, second client device 106, and/or third client device 107) may send a DNS request to the traffic routing and monitoring platform 630 (which may, e.g., be similar to the traffic routing and monitoring platform 102). In some instances, the DNS request may include one or more domain names, and a corresponding DNS response (as is described further below) may include one or more IP addresses.

At step 602, the traffic routing and monitoring platform 630 may check the domain(s) and/or other information contained in the DNS request (e.g., against known threats, the overall policy, or the like). For example, the traffic routing and monitoring platform 630 may check a local cache for any associated information (which may include the query and/or the response) with the requested domain(s). At step 603, the traffic routing and monitoring platform 630 may check the IP address(es) of the global DNS resolver 640 against known threats, the overall policy, or the like. If the traffic routing and monitoring platform 630 detects a threat and/or policy violation, it might not proceed to step 604. Rather, the traffic routing and monitoring platform 630 may block the request and return a DNS response indicating that the DNS request was blocked. Otherwise, if no threats or policy violations are identified at the domain or global DNS resolver 640, the traffic routing and monitoring platform 630 may proceed to step 604 to forward the DNS request to the global DNS resolver 640.

Figure 6B:
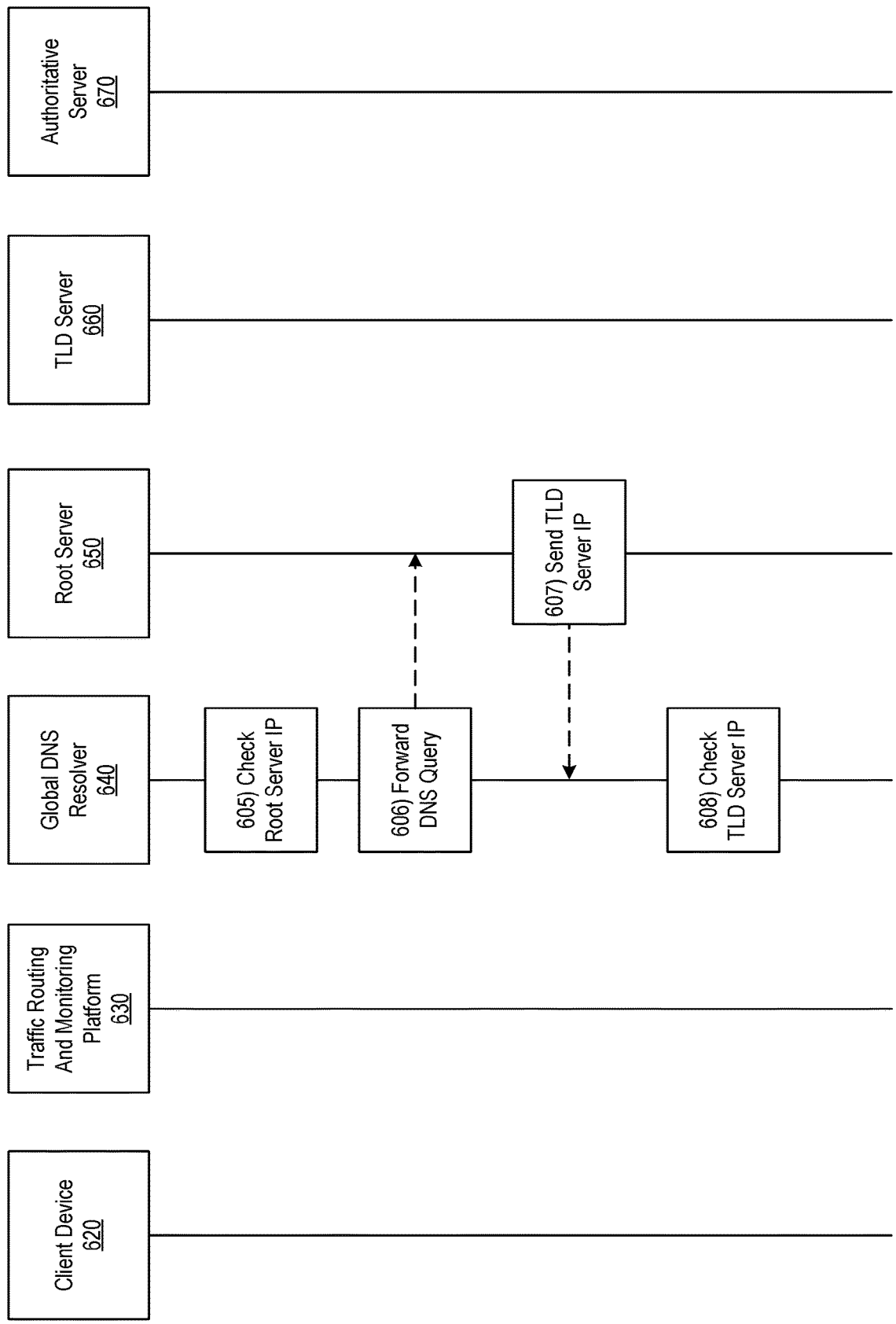

Referring to FIG. 6B, at step 605, the global DNS resolver 640 may check the IP address of the root server 650 against known threats, the overall policy, or the like. If a threat and/or policy violation is detected, the global DNS resolver 640 might not proceed to step 606. Rather, the global DNS resolver 640 may block the request and return a DNS response indicating that the DNS request was blocked (e.g., to the traffic routing and monitoring platform 630, which may, e.g., forward the DNS response to the client device 620). Otherwise, if no threat or policy violation is detected, the global DNS resolver 640 may proceed to step 606 to forward the DNS request to the root server 650.

At step 607, the root server 650 may send the IP address for the top level domain (TLD) server 660 to the global DNS resolver 640. At step 608, the global DNS resolver 640 may check the TLD server IP against known threats, the overall policy, or the like. If a threat or policy violation is detected, the global DNS resolver might not proceed to step 609. Rather, the root server 650 may block the request and return a DNS response indicating that the DNS request was blocked (e.g., to the traffic routing and monitoring platform 630, which may, e.g., forward the DNS response to the client device 620). If no threat or policy violation is detected, the global DNS resolver 640 may proceed to step 609 (as illustrated in FIG. 6C) to forward the DNS request to the authoritative server 670.

Figure 6C:
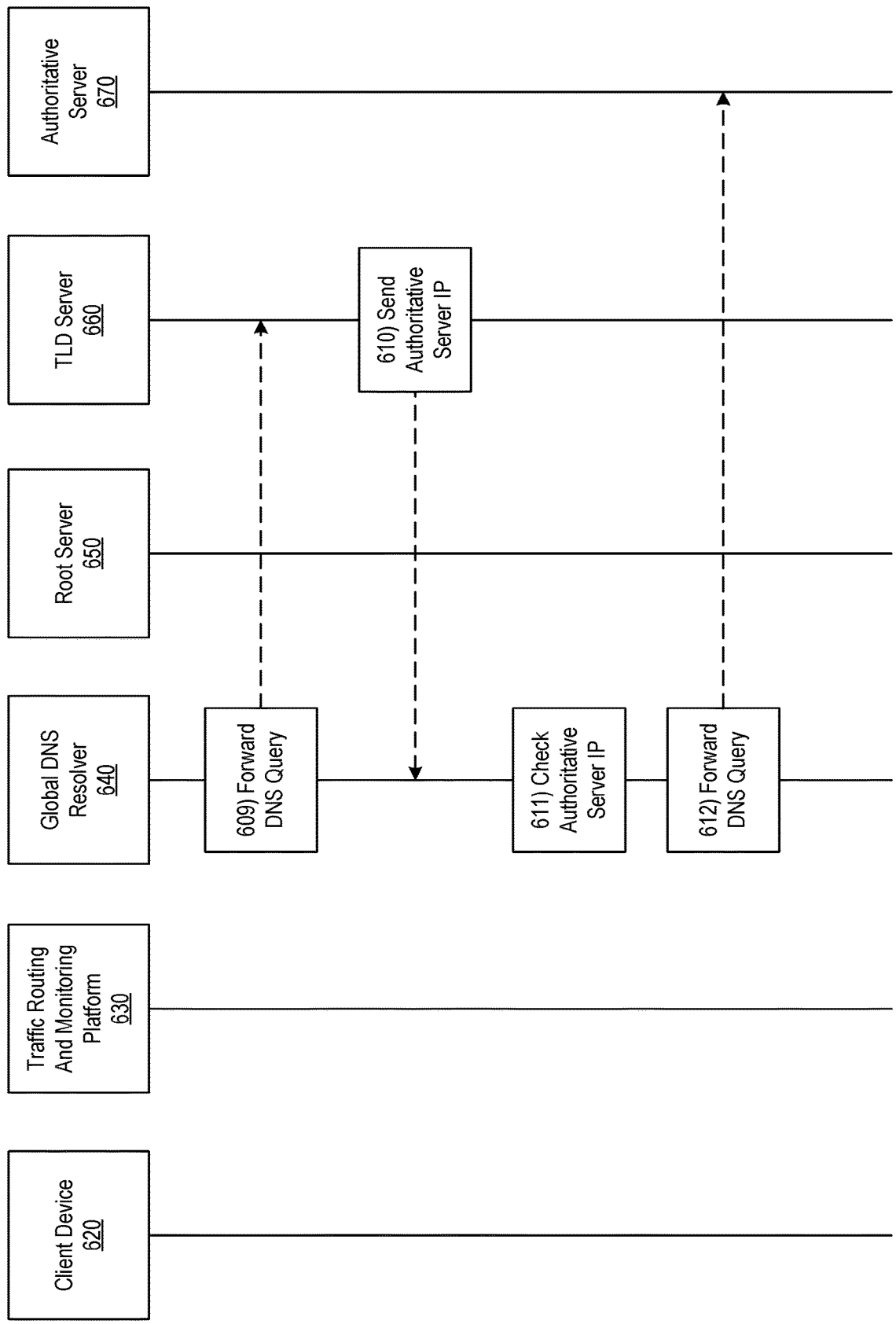

Referring to FIG. 6C, at step 610, the TLD server 660 may send the IP address for the authoritative server 670 to the global DNS resolver 640. At step 611, the global DNS resolver 640 may check the authoritative server IP(s) and/or domains against known threats, the overall policy, or the like. If a threat or policy violation is detected, the global DNS resolver 640 might not proceed to step 612. Rather, the TLD server 660 may block the request and return a DNS response indicating that the DNS request was blocked (e.g., to the traffic routing and monitoring platform 630, which may, e.g., forward the DNS response to the client device 620). Otherwise, if no threat or policy violation is detected, the global DNS resolver 640 may proceed to step 612 to forward the DNS request to the authoritative server 670.

Figure 6D:
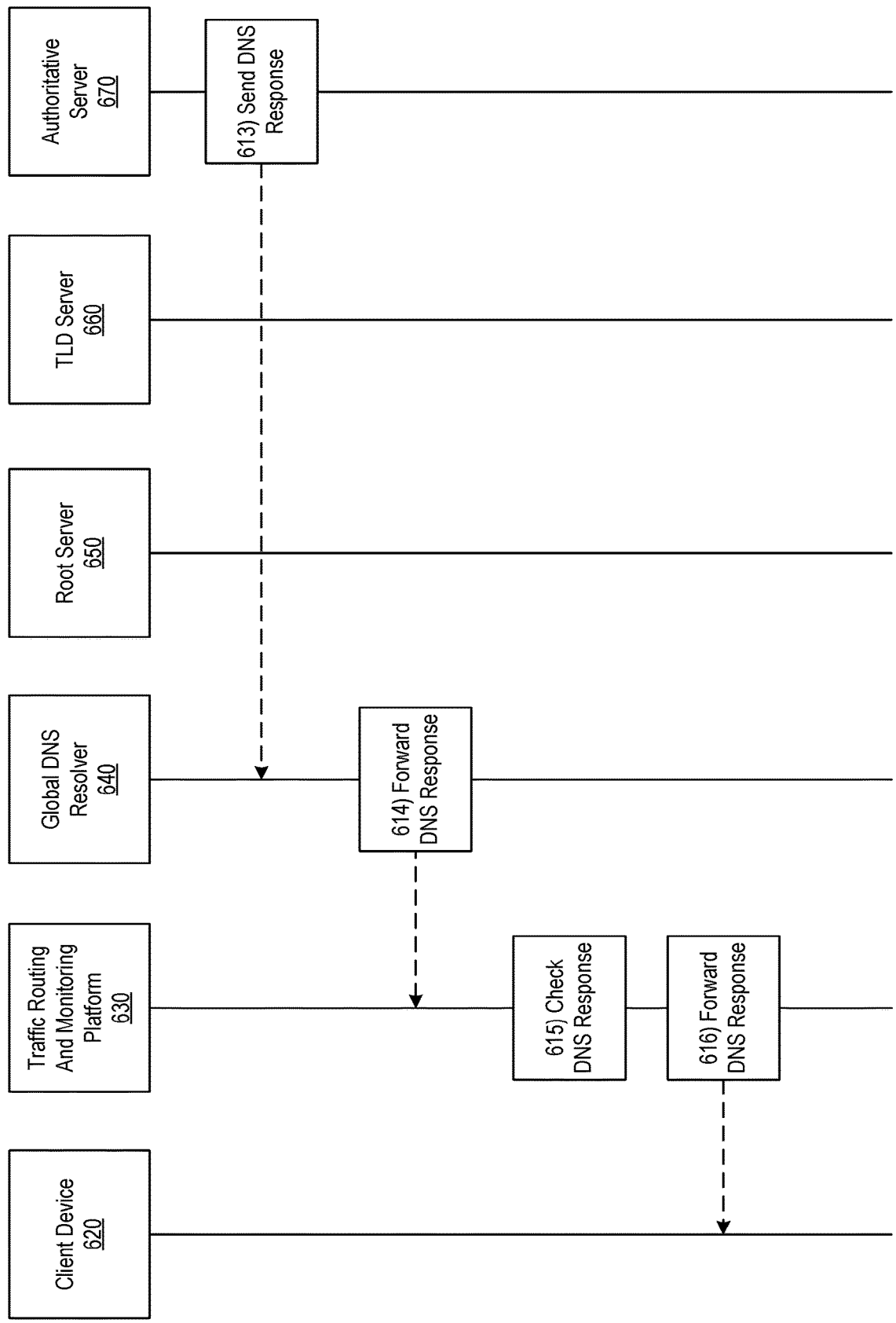

Referring to FIG. 6D, at step 613, the authoritative server 670 may send a DNS response to the global DNS resolver 640. At step 614, the global DNS resolver 640 may forward the DNS response to the traffic routing and monitoring platform 630. At step 615, the traffic routing and monitoring platform 630 may check the DNS response (and all included information) against known threats, the overall policy, or the like. If the DNS response corresponds to a known threat or policy violation, the traffic routing and monitoring platform 630 might not forward it to the client device 620 or may send a modified response to the client device 620. Otherwise, if the DNS response does not correspond to a known threat or policy violation, the traffic routing and monitoring platform 630 may proceed to step 616 to forward the DNS response the client device 620.

In some instances, the traffic routing and monitoring platform 630 may use cyber threat intelligence (CTI), non-compliant character detection (e.g., as described above with regard to step 205), and/or the overall policy to identify whether the entire DNS response should be forwarded or a portion of the DNS response should be forward. For example, the DNS response may include more than one IP address. In some instances, the traffic routing and monitoring platform 630 may identify, based on the CTI and/or the overall policy, that one IP address in the response should not be forwarded to the client device 620, and may remove this portion of the DNS response before forwarding on to the client device 620. Additionally or alternatively, the traffic routing and monitoring platform 630 may perform a threshold comparison for the DNS response. For example, the traffic routing and monitoring platform 630 may identify whether a majority of the IP addresses included in the response are safe and/or compliant with the overall policy, and may only send the DNS response if this majority threshold is satisfied. In this example, if the traffic routing and monitoring platform 630 identifies that the majority of the IP addresses are safe, it may still remove any IP addresses determined to be unsafe or otherwise in violation of an applied policy prior to routing to the client device 620.

By operating in this way, the traffic routing and monitoring platform 630 may protect against attacks from systems that may be controlled by a bad actor and/or otherwise compromised (e.g., via tunneling attacks, malware installation, or the like). Additionally, the traffic routing and monitoring platform 630 may prevent leakage of information to operators of a DNS infrastructure who might not adhere to (or may otherwise attempt to circumvent) privacy and/or security procedures.

In some instances, when sending the DNS response to the client device 620, the traffic routing and monitoring platform 630 may add a routing instruction to the DNS response. In some instances, the traffic routing and monitoring platform 630 may add such an instruction if the client device 620 is known to be configured to interpret such an instruction. In these instances, the instruction may direct the client device 620 to route traffic to a provided IP address via a proxy server or gateway (e.g., to log the traffic) and/or otherwise. By operating in this way, the provided IP address might not itself be modified (and thus any corresponding intelligence and/or the ability to investigate the provided IP address may be maintained), rather an additional routing instruction may be added on top of the original IP address (e.g., such as by embedding the routing IP address in a txt record and/or other field).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

For the avoidance of doubt, and without limiting the breadth of disclosure above or in the drawings, the present application further includes the subject matter described in the following numbered clauses:

1. A method for identity-based domain name system (DNS) routing through application of a security policy, specific to an identified user, to DNS queries, the method comprising: establishing, using an encrypted DNS process, a secure DNS session, wherein establishing the secure DNS session comprises executing an encrypted session handshake between an identity-based DNS routing platform and a client device, and wherein executing the encrypted session handshake includes receiving, from the client device, a security certificate for the encrypted DNS process that identifies a user of the client device; receiving, while the secure DNS session is established and from the client device, an encrypted DNS query request comprising a request for an internet protocol (IP) address for a domain name, wherein the encrypted DNS query request specifies the domain name; determining, based on the security certificate, an identity of the user; determining, based on the identity of the user, the security policy specific to the user, wherein the security policy comprises one or more domain name filtering rules, and each domain name filtering rule comprises respective domain matching criteria and corresponding actions to take on matching domain names; determining, using the one or more domain name filtering rules and based on the domain name in the encrypted DNS query request, a first action corresponding to the domain name in response to the encrypted DNS query request; determining, based on the first action corresponding to the domain name, an encrypted DNS query response, wherein determining the encrypted DNS query response includes executing the request for the IP address for the domain name upstream to identify the IP address for the domain name; and sending, to the client device, the encrypted DNS query response.

2. The method for identity-based DNS routing of clause 1, wherein the security policy is user specific based on an organization associated with the user of the client device, and wherein the encrypted DNS query request is received from the client device while the client device is sending the encrypted DNS query request from outside of a protected network of the organization.

3. The method for identity-based DNS routing of any of clauses 1-2, wherein the corresponding actions to take on the matching domain names indicate, for a respective domain name of the matching domain names, whether traffic should be blocked, allowed, or logged.

4. The method for identity-based DNS routing of any of clauses 1-3, wherein determining the first action corresponding to the domain name comprises: determining that the domain name matches a first domain name rule that indicates traffic to matching domains should be blocked.

5. The method for identity-based DNS routing of clause 4, wherein the encrypted DNS query response comprises an IP address of a block notification page.

6. The method for identity-based DNS routing of clause 4, wherein the encrypted DNS query response comprises a notification that the requested IP address is blocked.

7. The method for identity-based DNS routing of any of clauses 1-6, wherein determining the first action corresponding to the domain name comprises: determining that the domain name matches a first domain name rule that indicates traffic to matching domains should be allowed.

8. The method for identity-based DNS routing of clause 7, wherein the encrypted DNS query response comprises an IP address of a server associated with the domain name in the encrypted DNS query request.

9. The method for identity-based DNS routing of any of clauses 1-8, wherein determining the first action corresponding to the domain name comprises: determining that the domain name matches a first domain name rule that indicates traffic to matching domains should be logged by a proxy server.

10. The method for identity-based DNS routing of clause 9, wherein the encrypted DNS query response comprises an IP address of the proxy server.

11. The method for identity-based DNS routing of clause 10, wherein the encrypted DNS query response is configured to cause outgoing traffic to and incoming traffic from the IP address of a server associated with the domain name of the encrypted DNS query request to be conducted via the proxy server.

12. The method for identity-based DNS routing of clause 11, wherein the proxy server: receives, from the client device, outgoing network traffic, wherein the outgoing network traffic: indicates a proxy IP address of the proxy server as a destination IP address, and comprises data directed to a server associated with the domain name; receives, from the server associated with the domain name, inbound network traffic comprising a response to the outgoing network traffic, logs, based on domain matching criteria for the domain name and the corresponding actions to be performed for the domain name, network traffic comprising one or more of: the outgoing network traffic and the inbound network traffic; and sends, to the client device, the inbound network traffic.

13. The method for identity-based DNS routing of any of clauses 9-12, wherein the proxy server: prompts the client device to provide the security certificate; determines, based on the security certificate, one or more network policies, wherein the one or more network policies indicate: traffic associated with a potential security threat for which traffic should be logged, and metadata to be collected for the traffic associated with the potential security threat; collects the metadata for the traffic associated with the potential security threat; and sends, to the identity-based DNS routing platform, the metadata.

14. The method for identity-based DNS routing of any of clauses 1-13, wherein a network interface of the client device is preconfigured to direct DNS requests to an IP address of the identity-based DNS routing platform, and wherein the security certificate is installed at the client device prior to receipt of the encrypted DNS query request.

15. The method for identity-based DNS routing of clause 14, wherein the client device is preconfigured based on installation of an enterprise security profile on the client device, and wherein the installation of the enterprise security profile on the client device causes the client device to direct the DNS requests to the IP address of the identity-based DNS routing platform.

16. The method for identity-based DNS routing of any of clauses 1-15, wherein determining the security policy for the user comprises determining to apply, for the user, one of: a user-specific policy, an organization-level policy, or a default policy.

17. The method for identity-based DNS routing of any of clauses 1-16, wherein the one or more domain name filtering rules comprise a whitelist, a blacklist, and a watchlist, and wherein each of the matching domain names are included on one of the whitelist, the blacklist, or the watchlist.

18. The method for identity-based DNS routing of clause 17, wherein determining the first action to be performed for the domain name comprises: identifying whether the domain name is listed on the whitelist, the blacklist, or the watchlist, wherein: the first action is to block traffic to an IP address of the domain name when the domain name is listed on the blacklist; the first action is to log traffic to the IP address of the domain name when the domain name is listed on the watchlist; and the first action is to allow traffic to access the IP address of the domain name when the domain name is listed on the whitelist.

19. The method for identity-based DNS routing of any of clauses 1-18, wherein the encrypted session handshake comprises a transport layer security (TLS) handshake.

20. The method for identity-based DNS routing of any of clauses 1-19, wherein determining, the identity of the user further comprises determining: based on at least a first identity and a second identity, the identity of the user.

21. The method for identity-based DNS routing of clause 20, wherein the first identity and the second identity are embedded in the encrypted DNS query request at the client device.

22. The method for identity-based DNS routing of clause 20, wherein the first encrypted DNS query request is routed to the identity-based DNS routing platform from the client device along a DNS path.

23. The method for identity-based DNS routing of clause 22, wherein the first identity is embedded in the encrypted DNS query request at the client device, and wherein the second identity is embedded in the encrypted DNS query request at an intermediary server along the DNS path.

24. The method for identity-based DNS routing of clause 20, wherein the first identity corresponds to first domain name filtering rules and the second identity corresponds to second domain name filtering rules, wherein determining the security policy comprises deconflicting the first domain name filtering rules and the second domain name filtering rules.

25. A system comprising one or more computing devices, wherein the system is configured to perform the method of any of clauses 1-24.

26. One or more non-transitory computer-readable media comprising stored instructions that, when executed by one or more processors of one or more computing devices of a system, cause the system to perform the method of any of clauses 1-24.

27. A method for identity-based domain name system (DNS) routing through application of a security policy, specific to an identified user, to DNS queries, the method comprising: establishing, using an unencrypted DNS process, a DNS session between an identity-based DNS routing platform and a client device; receiving, while the DNS session is established and from the client device, an unencrypted DNS query request comprising a request for an internet protocol (IP) address for a domain name, wherein the unencrypted DNS query request specifies the domain name; determining, based on identity information embedded into the unencrypted DNS query request, an identity of the user; determining, based on the identity of the user, the security policy specific to the user, wherein the security policy comprises one or more domain name filtering rules, and each domain name filtering rule comprises respective domain matching criteria and corresponding actions to take on matching domain names; determining, using the one or more domain name filtering rules and based on the domain name in the unencrypted DNS query request, a first action corresponding to the domain name in response to the unencrypted DNS query request; determining, based on the first action corresponding to the domain name, an unencrypted DNS query response, wherein determining the unencrypted DNS query response includes executing the request for the IP address for the domain name upstream to identify the IP address for the domain name; and sending, to the client device, the unencrypted DNS query response.

28. The method for identity-based DNS routing of clause 27, wherein the identity information is embedded into a field of the unencrypted DNS query request using cleartext.

29. The method for identity-based DNS routing of any one of clauses 27-28, wherein the identity information is unencrypted.

30. The method for identity-based DNS routing of any one of clauses 27-29, wherein the identity information is encrypted.

31. The method for identity-based DNS routing of any one of clauses 27-30, wherein the identity information is encrypted by the client device.

32. The method for identity-based DNS routing of any one of clauses 27-31, wherein the identity information is encrypted by a local resolver, and wherein the unencrypted DNS query request passes through the local resolver prior to being received at the unencrypted DNS query request.

33. The method for identity-based DNS routing of clause 32, wherein encrypting the identity information by the local resolver comprises: adding an identity of the local resolver to the identity information, and encrypting, after adding the identity of the local resolver to the identity information, the identity information.

34. The method for identity-based DNS routing of clause 32, wherein encrypting the identity information by the local resolver comprises: removing a portion of the identity information, and encrypting, after removing the portion of the identity information, the identity information.

35. The method for identity-based DNS routing of any one of clauses 27-34, wherein the security policy is user specific based on an organization associated with the user of the client device, and wherein the unencrypted DNS query request is received from the client device while the client device is sending the unencrypted DNS query request from outside of a protected network of the organization.

36. The method for identity-based DNS routing of any one of clauses 27-35, wherein the corresponding actions to take on the matching domain names indicate, for a respective domain name of the matching domain names, whether traffic should be blocked, allowed, or logged.

37. The method for identity-based DNS routing of any one of clauses 27-36, wherein determining the first action corresponding to the domain name comprises: determining that the domain name matches a first domain name rule that indicates traffic to matching domains should be blocked.

38. The method for identity-based DNS routing of clause 37, wherein the unencrypted DNS query response comprises an IP address of a block notification page.

39. The method for identity-based DNS routing of clause 37, wherein the unencrypted DNS query response comprises a notification that the requested IP address is blocked.

40. The method for identity-based DNS routing of any one of clauses 27-39, wherein determining the first action corresponding to the domain name comprises: determining that the domain name matches a first domain name rule that indicates traffic to matching domains should be allowed.

41. The method for identity-based DNS routing of clause 40, wherein the unencrypted DNS query response comprises an IP address of a server associated with the domain name in the unencrypted DNS query request.

42. The method for identity-based DNS routing of any one of clauses 27-41, wherein determining the first action corresponding to the domain name comprises: determining that the domain name matches a first domain name rule that indicates traffic to matching domains should be logged by a proxy server.

43. The method for identity-based DNS routing of clause 42, wherein the unencrypted DNS query response comprises an IP address of the proxy server.

44. The method for identity-based DNS routing of clause 43, wherein the unencrypted DNS query response is configured to cause outgoing traffic to and incoming traffic from the IP address of a server associated with the domain name of the unencrypted DNS query request to be conducted via the proxy server.

45. The method for identity-based DNS routing of clause 44, wherein the proxy server: receives, from the client device, outgoing network traffic, wherein the outgoing network traffic: indicates a proxy IP address of the proxy server as a destination IP address, and comprises data directed to a server associated with the domain name; receives, from the server associated with the domain name, inbound network traffic comprising a response to the outgoing network traffic, logs, based on the domain matching criteria for the domain name and the corresponding actions to be performed for the domain name, network traffic comprising one or more of: the outgoing network traffic and the inbound network traffic; and sends, to the client device, the inbound network traffic.

46. The method for identity-based DNS routing of any one of clauses 42-45, wherein the proxy server: prompts the client device to provide the identity information; determines, based on the identity information, one or more network policies, wherein the one or more network policies indicate: traffic associated with a potential security threat for which traffic should be logged, and metadata to be collected for the traffic associated with the potential security threat; collects the metadata for the traffic associated with the potential security threat; and sends, to the identity-based DNS routing platform, the metadata.

47. The method for identity-based DNS routing of any one of clauses 27-46, wherein a network interface of the client device is preconfigured to direct DNS requests to an IP address of the identity-based DNS routing platform.

48. The method for identity-based DNS routing of clause 47, wherein the client device is preconfigured based on installation of an enterprise security profile on the client device, and wherein the installation of the enterprise security profile on the client device causes the client device to direct the DNS requests to the IP address of the identity-based DNS routing platform.

49. The method for identity-based DNS routing of any one of clauses 27-48, wherein determining the security policy for the user comprises determining to apply, for the user, one of: a user-specific policy, an organization-level policy, or a default policy.

50. The method for identity-based DNS routing of any one of clauses 27-49, wherein the one or more domain name filtering rules comprise a whitelist, a blacklist, and a watchlist, and wherein each of the matching domain names are included on one of the whitelist, the blacklist, or the watchlist.

51. The method for identity-based DNS routing of clause 50, wherein determining the first action to be performed for the domain name comprises: identifying whether the domain name is listed on the whitelist, the blacklist, or the watchlist, wherein: the first action is to block traffic to an IP address of the domain name when the domain name is listed on the blacklist; the first action is to log traffic to the IP address of the domain name when the domain name is listed on the watchlist; and the first action is to allow traffic to access the IP address of the domain name when the domain name is listed on the whitelist.

52. A system comprising one or more computing devices, wherein the system is configured to perform the method of any of clauses 27-51.

53. One or more non-transitory computer-readable media comprising stored instructions that, when executed by one or more processors of one or more computing devices of a system, cause the system to perform the method of any of clauses 27-51.

54. A method for identity-based domain name system (DNS) routing through application of a security policy, specific to an identified user, to DNS queries, the method comprising: establishing, using a DNS process and between an identity-based DNS routing platform and a client device, a DNS session; receiving, while the DNS session is established, a DNS query request comprising a request for an internet protocol (IP) address for a domain name, wherein the DNS query request specifies: the domain name and identity information corresponding to the DNS query request, wherein the identity information indicates at least two identities corresponding to the DNS query request; determining, based on the identity information, an identity of a user of the client device; determining, based on the identity of the user, the security policy specific to the user, wherein the security policy comprises one or more overall domain name filtering rules, and each domain name filtering rule of the one or more overall domain name filtering rules comprises respective domain matching criteria and corresponding actions to take on matching domain names; determining, using the one or more overall domain name filtering rules and based on the domain name in the DNS query request, a first action corresponding to the domain name in response to the DNS query request; determining, based on the first action corresponding to the domain name, a DNS query response, wherein determining the DNS query response includes executing the request for the IP address for the domain name upstream to identify the IP address for the domain name; and sending, to the client device, the DNS query response.

55. The identity-based DNS routing method of clause 54, wherein the DNS process comprises an encrypted DNS process configured to identify, based on receiving the request for the IP address for the domain name, the requested IP address.

56. The identity-based DNS routing method of clause 54, wherein the DNS process comprises an unencrypted DNS process configured to identify, based on receiving the request for the IP address for the domain name, the requested IP address.

57. The identity-based DNS routing method of any of clauses 54-56, wherein the DNS query request is received from the client device, and wherein the at least two identities corresponding to the DNS query request correspond to the client device.

58. The identity-based DNS routing method of clause 57, wherein the at least two identities comprise two or more of: a user identity, device identity, browser identity, application identity, operating system identity, or software identity.

59. The identity-based DNS routing method of any of clauses 54-58, wherein the DNS query request is routed, between the identity-based DNS routing platform and the client device, through an additional server.

60. The identity-based DNS routing method of clause 59, wherein a first identity of the at least two identities is embedded by the client device, and a second identity of the at least two identities is embedded by the additional server.

61. The identity-based DNS routing method of clause 59, wherein the additional server is configured to remove at least a portion of the identity information received from the client device.

62. The identity-based DNS routing method of clause 59, wherein the additional server is configured to modify at least a portion of the identity information received from the client device.

63. The identity-based DNS routing method of clause 59, wherein the additional server is configured to embed the identity information in its entirety.
64. The identity-based DNS routing method of any of clauses 54-59, wherein the at least two identities are embedded in the DNS query request as URL prefixes.
65. The identity-based DNS routing method of any of clauses 54-59, wherein a first identity of the at least two identities corresponds to first domain name filtering rules and a second identity of the at least two identities corresponds to second domain name filtering rules.
66. The identity-based DNS routing method of clause 65, wherein determining the one or more overall domain name filtering rules comprises adding the first domain name filtering rules to the second domain name filtering rules.
67. The identity-based DNS routing method of clause 66, wherein the first domain name filtering rules conflict with the second domain name filtering rules.
68. The identity-based DNS routing method of clause 67, wherein determining the one or more overall domain name filtering rules comprises reconciling the first domain name filtering rules with the second domain name filtering rules by: identifying a conflict between a first rule of the first domain name filtering rules and a second rule of the first domain name filtering rules, comparing a precedence score of the first rule to a precedence score of the second rule, identifying, based on the comparison of the precedence scores, that the precedence score of the first rule exceeds the precedence score of the second rule, and selecting, based on identifying that the precedence score of the first rule exceeds the precedence score of the second rule, the first rule rather than the second rule for inclusion in the one or more overall domain name filtering rules, wherein the one or more overall domain name filtering rules include all remaining domain name filtering rules of the first domain name filtering rules and the second domain name filtering rules.
69. The identity-based DNS routing method of any of clauses 54-68, wherein determining, based on the first action corresponding to the domain name, a DNS query response, comprises forwarding the DNS query request upstream to one or more servers along a DNS path.
70. The identity-based DNS routing method of clause 69, further comprising: identifying a threat context of the one or more servers; and modifying, based on the identified threat context, the DNS path.
71. The identity-based DNS routing method of clause 70, wherein the DNS query response indicates an IP address for a second identity-based DNS routing platform, wherein the DNS query response configures the client device to route future DNS query requests to the second identity-based DNS routing platform rather than the identity-based DNS routing platform.
72. The identity-based DNS routing method of clause 71, wherein configuring the client device to route the future DNS query requests to the second identity-based DNS routing platform comprises configuring the client device to route, for a predetermined duration, the future DNS query requests to the second identity-based DNS routing platform.
73. The identity-based DNS routing method of clause 71, wherein the identity-based DNS routing platform is located in a first geographic region, and wherein the second identity-based DNS routing platform is located in a second geographic region, different than the first geographic region.
74. The identity-based DNS routing method of any of clauses 54-73, further comprising: identifying that the domain name is on a watchlist; and replacing a first time to live (TTL) of the requested IP address with second TTL of the requested IP address, wherein the first TTL is preset for the request IP address, and wherein the second TTL is shorter than the first TTL.
75. The identity-based DNS routing method of any of clauses 54-74, wherein determining, based on the identity of the user, the security policy comprises identifying, based on a stored correlation between the identity and the security policy, the security policy.
76. The identity-based DNS routing method of clause 75, wherein an intelligence policy manager system pre-populates a cache of the identity-based DNS routing platform to include the stored correlation between the identity and the security policy.
77. The identity-based DNS routing method of clause 76, wherein the pre-population is based on one of: a geographic location of the client device or a request to perform the pre-population.
78. The identity-based DNS routing method of any of clauses 54-77, wherein the DNS query response: comprises an IP address of a proxy server, and is configured to cause outgoing traffic to and incoming traffic from the IP address of a server associated with the domain name of the DNS query request to be conducted by the proxy server, wherein the first action comprises logging, by the proxy server, the outgoing traffic and the incoming traffic.
79. The identity-based routing method of any of clauses 54-78, wherein the DNS query response comprises: the requested IP address, and a routing instruction directing the client device to route traffic to the requested IP address via a gateway server, wherein the first action comprises logging, by the gateway server, outgoing traffic and incoming traffic.
80. The identity-based routing method of any of clauses 54-79, wherein the DNS query response comprises: the requested IP address, and a local rule indicating the first action corresponding to the domain name, wherein the first action comprises one of: block traffic directed to the requested IP address, allow traffic directed to the requested IP address, and log traffic directed to the requested IP address, wherein the client device is configured to enforce the local rule.
81. A system comprising one or more computing devices, wherein the system is configured to perform the method of any of clauses 54-80.
82. One or more non-transitory computer-readable media comprising stored instructions that, when executed by one or more processors of one or more computing devices of a system, cause the system to perform the method of any of clauses 54-80.
83. A method for identity-based domain name system (DNS) routing through application of a security policy, specific to an identified user, to DNS queries, the method comprising: establishing, using a DNS process and between an identity-based DNS routing platform and a client device, a DNS session; receiving, while the DNS session is established, a DNS query request comprising a request for an internet protocol (IP) address for a domain name, wherein the DNS query request specifies: the domain name and identity information corresponding to the DNS query request, wherein the identity information indicates at least two identities corresponding to the DNS query request; determining, based on the identity information, an identity of a user of the client device; determining, based on the identity of the user, the security policy specific to the user, wherein the security policy comprises one or more overall domain name filtering rules, and each domain name filtering rule of the one or more overall domain name filtering rules comprises respective domain matching criteria and corresponding actions to take on matching domain names; determining, using the one or more overall domain name filtering rules and based on the domain name in the DNS query request, that the domain name matches a first domain name rule that indicates traffic to matching domains should be logged by a proxy server; determining, based on the determination that matching domains should be logged by the proxy server, a DNS query response, wherein the DNS query response: comprises an IP address of the proxy server, and is configured to cause outgoing traffic to and incoming traffic from the IP address of a server associated with the domain name of the DNS query request to be conducted by the proxy server; and sending, to the client device, the DNS query response.

84. The identity-based DNS routing method of clause 83, wherein the proxy server: receives, from the client device, outgoing network traffic, wherein the outgoing network traffic: indicates a proxy IP address of the proxy server as a destination IP address, and comprises data directed to a server associated with the domain name; receives, from the server associated with the domain name, inbound network traffic comprising a response to the outgoing network traffic, logs, based on the domain matching criteria for the domain name and the corresponding actions to be performed for the domain name, network traffic comprising one or more of: the outgoing network traffic and the inbound network traffic; and sends, to the client device, the inbound network traffic.

85. A system comprising one or more computing devices, wherein the system is configured to perform the method of any of clauses 83-84.

86. One or more non-transitory computer-readable media comprising stored instructions that, when executed by one or more processors of one or more computing devices of a system, cause the system to perform the method of any of clauses 83-84.

87. A method for identity-based domain name system (DNS) routing through application of a security policy, specific to an identified user, to DNS queries, the method comprising: establishing, using a DNS process and between an identity-based DNS routing platform and a client device, a DNS session; receiving, while the DNS session is established, a DNS query request comprising a request for an internet protocol (IP) address for a domain name, wherein the DNS query request specifies: the domain name and identity information corresponding to the DNS query request, wherein the identity information indicates at least two identities corresponding to the DNS query request; determining, based on the identity information, an identity of a user of the client device; determining, based on the identity of the user, the security policy specific to the user, wherein the security policy comprises one or more overall domain name filtering rules, and each domain name filtering rule of the one or more overall domain name filtering rules comprises respective domain matching criteria and corresponding actions to take on matching domain names; determining, using the one or more overall domain name filtering rules and based on the domain name in the DNS query request, that the domain name matches a first domain name rule that indicates traffic to matching domains should be logged by a gateway server; determining, based on the determination that the traffic to the matching domains should be logged by the gateway server, a DNS query response, wherein the DNS query response comprises: the requested IP address, and a routing instruction directing the client device to route traffic to the requested IP address via the gateway server, wherein determining the DNS query response includes executing the request for the IP address for the domain name upstream to identify the requested IP address; and sending, to the client device, the DNS query response.

88. The identity-based DNS routing method of clause 87, wherein the DNS query response is configured to cause outgoing traffic to and incoming traffic from the requested IP address to be conducted via the gateway server.

89. The identity-based DNS routing method of any of clauses 87-88, wherein the gateway server receives, from the client device, outgoing network traffic, wherein the outgoing network traffic: indicates the requested IP address as a destination IP address, and comprises data directed to a server associated with the domain name; receives, from the server associated with the domain name, inbound network traffic comprising a response to the outgoing network traffic, logs, based on the domain matching criteria for the domain name and the corresponding actions to be performed for the domain name, network traffic comprising one or more of: the outgoing network traffic and the inbound network traffic; and sends, to the client device, the inbound network traffic.

90. A system comprising one or more computing devices, wherein the system is configured to perform the method of any of clauses 87-89.

91. One or more non-transitory computer-readable media comprising stored instructions that, when executed by one or more processors of one or more computing devices of a system, cause the system to perform the method of any of clauses 87-89.

92. A method for identity-based domain name system (DNS) routing through application of a security policy, specific to an identified user, to DNS queries, the method comprising: establishing, using a DNS process and between an identity-based DNS routing platform and a client device, a DNS session; receiving, while the DNS session is established, a DNS query request comprising a request for an internet protocol (IP) address for a domain name, wherein the DNS query request specifies: the domain name and identity information corresponding to the DNS query request, wherein the identity information indicates at least two identities corresponding to the DNS query request; determining, based on the identity information, an identity of a user of the client device; determining, based on the identity of the user, the security policy specific to the user, wherein the security policy comprises one or more overall domain name filtering rules, and each domain name filtering rule of the one or more overall domain name filtering rules comprises respective domain matching criteria and corresponding actions to take on matching domain names; determining, using the one or more overall domain name filtering rules and based on the domain name in the DNS query request, a first action corresponding to the domain name in response to the DNS query request; determining, based on the first action corresponding to the domain name, a DNS query response, wherein the DNS query response comprises: the requested IP address, and a local rule indicating the first action corresponding to the domain name, wherein determining the encrypted DNS query response includes executing the request for the IP address for the domain name upstream to identify the requested IP address; and sending, to the client device, the DNS query response, wherein the DNS query response configures the client device to enforce, for traffic directed to the requested IP address, the local rule.

93. The identity-based DNS routing method of clause 92, wherein the local rule indicates whether the traffic directed to the requested IP address should be blocked, allowed, or logged.

94. The identity-based DNS routing method of any of clauses 92-93, wherein the client device is configured to: receive the local rule indicating the first action corresponding to the domain name; and store the local rule indicating the first action corresponding to the domain name.

95. A system comprising one or more computing devices, wherein the system is configured to perform the method of any of clauses 92-94.

96. One or more non-transitory computer-readable media comprising stored instructions that, when executed by one or more processors of one or more computing devices of a system, cause the system to perform the method of any of clauses 92-94.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An identity-based domain name system (DNS) routing platform configured to apply an overall security policy, specific to an identity associated with a DNS query request, to DNS queries, comprising:
   at least one hardware processor; and
   memory storing computer-readable instructions that, when executed by the at least one hardware processor, cause the identity-based DNS routing platform to:
      establish, using an encrypted DNS process, a secure DNS session, wherein establishing the secure DNS session comprises executing an encrypted session handshake between the identity-based DNS routing platform and a client device, and wherein executing the encrypted session handshake includes receiving, from the client device, a security certificate for the encrypted DNS process that identifies a user of the client device;
      receive, while the secure DNS session is established and from the client device, an encrypted DNS query request comprising a request for an internet protocol (IP) address for a domain name, wherein the encrypted DNS query request specifies the domain name;
      determine, based on the security certificate, a first identity of the user and one or more second identities associated with the encrypted DNS query request, wherein a combination of the first identity and the one or more second identities comprises an overall identity;
      determine, based on the first identity of the user and the one or more second identities, the overall security policy specific to the overall identity, wherein the overall security policy comprises one or more domain name filtering rules generated based on first domain name filtering rules corresponding to the first identity and second domain name filtering rules corresponding to the second identity, and each domain name filtering rule comprises respective domain matching criteria and corresponding actions to take on matching domain names, and wherein the overall security policy was generated by deconflicting the first domain name filtering rules and the second domain name filtering rules by:
         identifying a conflict between a first rule of the first domain name filtering rules and a second rule of the second domain name filtering rules,
         comparing a precedence score of the first rule to a precedence score of the second rule,
         identifying, based on the comparison of the precedence scores, that the precedence score of the first rule exceeds the precedence score of the second rule, and
         selecting, based on identifying that the precedence score of the first rule exceeds the precedence score of the second rule, the first rule rather than the second rule for inclusion in the one or more domain name filtering rules, wherein the one or more domain name filtering rules include the first rule and do not include the second rule;
      determine, using the one or more domain name filtering rules and based on the domain name in the encrypted DNS query request, a first action corresponding to the domain name in response to the encrypted DNS query request;
      determine, based on the first action corresponding to the domain name, an encrypted DNS query response, wherein determining the encrypted DNS query response includes executing the request for the IP address for the domain name upstream to identify the IP address for the domain name; and
      send, to the client device, the encrypted DNS query response.

2. The identity-based DNS routing platform of claim 1, wherein the overall security policy is based on an organization associated with the user of the client device, and wherein the encrypted DNS query request is received from the client device while the client device is sending the encrypted DNS query request from outside of a protected network of the organization.

3. The identity-based DNS routing platform of claim 1, wherein the corresponding actions to take on the matching domain names indicate, for a respective domain name of the matching domain names, whether traffic should be blocked, allowed, or logged.

4. The identity-based DNS routing platform of claim 1, wherein determining the first action corresponding to the domain name comprises:

determining that the domain name matches a first domain name rule that indicates traffic to matching domains should be blocked, wherein the encrypted DNS query response comprises one of: an IP address of a block notification page or a notification that the requested IP address is blocked.

5. The identity-based DNS routing platform of claim 1, wherein determining the first action corresponding to the domain name comprises:
determining that the domain name matches a first domain name rule that indicates traffic to matching domains should be allowed, wherein the encrypted DNS query response comprises an IP address of a server associated with the domain name in the encrypted DNS query request.

6. The identity-based DNS routing platform of claim 1, wherein determining the first action corresponding to the domain name comprises:
determining that the domain name matches a first domain name rule that indicates traffic to matching domains should be logged by a proxy server.

7. The identity-based DNS routing platform of claim 6, wherein the encrypted DNS query response comprises an IP address of the proxy server.

8. The identity-based DNS routing platform of claim 7, wherein the encrypted DNS query response is configured to cause outgoing traffic to and incoming traffic from the IP address of a server associated with the domain name of the encrypted DNS query request to be conducted via the proxy server.

9. The identity-based DNS routing platform of claim 8, wherein the proxy server:
receives, from the client device, outgoing network traffic, wherein the outgoing network traffic:
indicates a proxy IP address of the proxy server as a destination IP address, and
comprises data directed to a server associated with the domain name;
receives, from the server associated with the domain name, inbound network traffic comprising a response to the outgoing network traffic,
logs, based on domain matching criteria for the domain name and the corresponding actions to be performed for the domain name, network traffic comprising one or more of: the outgoing network traffic and the inbound network traffic; and
sends, to the client device, the inbound network traffic.

10. The identity-based DNS routing platform of claim 6, wherein the proxy server:
prompts the client device to provide the security certificate;
determines, based on the security certificate, one or more network policies, wherein the one or more network policies indicate:
traffic associated with a potential security threat for which traffic should be logged, and
metadata to be collected for the traffic associated with the potential security threat;
collects the metadata for the traffic associated with the potential security threat; and
sends, to the identity-based DNS routing platform, the metadata.

11. The identity-based DNS routing platform of claim 1, wherein a network interface of the client device is preconfigured to direct DNS requests to an IP address of the identity-based DNS routing platform, and wherein the security certificate is installed at the client device prior to receipt of the encrypted DNS query request.

12. The identity-based DNS routing platform of claim 11, wherein the client device is preconfigured based on installation of an enterprise security profile on the client device, and wherein the installation of the enterprise security profile on the client device causes the client device to direct the DNS requests to the IP address of the identity-based DNS routing platform.

13. The identity-based DNS routing platform of claim 1, wherein the first domain name filtering rules corresponding to the first identity comprise one of: a user-specific policy, an organization-level policy, or a default policy.

14. The identity-based DNS routing platform of claim 1, wherein the one or more domain name filtering rules comprise a whitelist, a blacklist, and a watchlist, wherein each of the matching domain names are included on one of the whitelist, the blacklist, or the watchlist, and wherein determining the first action to be performed for the domain name comprises:
identifying whether the domain name is listed on the whitelist, the blacklist, or the watchlist, wherein:
the first action is to block traffic to an IP address of the domain name when the domain name is listed on the blacklist;
the first action is to log traffic to the IP address of the domain name when the domain name is listed on the watchlist; and
the first action is to allow traffic to access the IP address of the domain name when the domain name is listed on the whitelist.

15. The identity-based DNS routing platform of claim 1, wherein the encrypted session handshake comprises a transport layer security (TLS) handshake.

16. The identity-based DNS routing platform of claim 1, wherein the first identity and the one or more second identities are embedded in the encrypted DNS query request at the client device.

17. The identity-based DNS routing platform of claim 1, wherein the encrypted DNS query request is routed to the identity-based DNS routing platform from the client device along a DNS path, and wherein the DNS path comprises a path of the encrypted DNS query request as it recurses through different DNS servers to formulate a response back to the client device.

18. The identity-based DNS routing platform of claim 17, wherein the first identity is embedded in the encrypted DNS query request at the client device, and wherein the one or more second identities are embedded in the encrypted DNS query request at an intermediary server along the DNS path.

19. The identity-based DNS routing platform of claim 17, further comprising:
identifying a threat context of the different DNS servers; and
modifying, based on the identified threat context, the DNS path.

20. The identity-based DNS routing platform of claim 1, wherein the first identity corresponds to the user and the one or more second identities comprise at least one of: a device identity, a browser identity, an application identity, an operating system identity, or a software identity.

21. The identity-based DNS routing platform of claim 1, wherein the overall security policy is determined based on a stored correlation between the overall security policy and a combination of the first identity and the one or more second identities.

22. The identity-based DNS routing platform of claim 21, wherein the overall security policy is generated prior to receipt of the encrypted DNS query request.

23. The identity-based DNS routing platform of claim 21, wherein a cache of the identity-based DNS routing platform is pre-populated to include the stored correlation based on one or more of: a geographic location of the client device or a request to perform the pre-population.

24. The identity-based DNS routing platform of claim 1, wherein:
the first identity corresponds to the user and wherein the one or more second identities corresponds to an organization,
the first domain name filtering rules are specific to the user,
the second domain name filtering rules are specific to the organization, and
deconflicting the first domain name filtering rules and the second domain name filtering rules is based on a precedence level between the user specific and the organization specific domain name filtering rules.

25. A method for identity-based domain name system (DNS) routing through application of an overall security policy, specific to an identity associated with a DNS query request, the method comprising:
establishing, using an encrypted DNS process, a secure DNS session, wherein establishing the secure DNS session comprises executing an encrypted session handshake between an identity-based DNS routing platform and a client device, and wherein executing the encrypted session handshake includes receiving, from the client device, a security certificate for the encrypted DNS process that identifies a user of the client device;
receiving, while the secure DNS session is established and from the client device, an encrypted DNS query request comprising a request for an internet protocol (IP) address for a domain name, wherein the encrypted DNS query request specifies the domain name;
determining, based on the security certificate, a first identity of the user and one or more second identities associated with the encrypted DNS query request, wherein a combination of the first identity and the one or more second identities comprises an overall identity;
determining, based on the first identity of the user and the one or more second identities, the overall security policy specific to the overall identity, wherein the overall security policy comprises one or more domain name filtering rules generated based on first domain name filtering rules corresponding to the first identity and second domain name filtering rules corresponding to the second identity, and each domain name filtering rule comprises respective domain matching criteria and corresponding actions to take on matching domain names, and wherein the overall security policy was generated by deconflicting the first domain name filtering rules and the second domain name filtering rules by:
identifying a conflict between a first rule of the first domain name filtering rules and a second rule of the second domain name filtering rules,
comparing a precedence score of the first rule to a precedence score of the second rule,
identifying, based on the comparison of the precedence scores, that the precedence score of the first rule exceeds the precedence score of the second rule, and
selecting, based on identifying that the precedence score of the first rule exceeds the precedence score of the second rule, the first rule rather than the second rule for inclusion in the one or more domain name filtering rules, wherein the one or more domain name filtering rules include the first rule and do not include the second rule;
determining, using the one or more domain name filtering rules and based on the domain name in the encrypted DNS query request, a first action corresponding to the domain name in response to the encrypted DNS query request;
determining, based on the first action corresponding to the domain name, an encrypted DNS query response, wherein determining the encrypted DNS query response includes executing the request for the IP address for the domain name upstream to identify the IP address for the domain name; and
sending, to the client device, the encrypted DNS query response.

26. The method for identity-based DNS routing of claim 25, wherein the overall security policy is based on an organization associated with the user of the client device, and wherein the encrypted DNS query request is received from the client device while the client device is sending the encrypted DNS query request from outside of a protected network of the organization.

27. The method for identity-based DNS routing of claim 25, wherein a network interface of the client device is preconfigured to direct DNS requests to an IP address of an identity-based DNS routing platform, and wherein the security certificate is installed at the client device prior to receipt of the encrypted DNS query request.

28. The method for identity-based DNS routing of claim 25, wherein determining the first action corresponding to the domain name comprises:
determining that the domain name matches a first domain name rule that indicates traffic to matching domains should be logged by a proxy server.

29. The method for identity-based DNS routing of claim 28, wherein the encrypted DNS query response comprises an IP address of the proxy server.

30. One or more non-transitory computer-readable media storing instructions that, when executed by an identity-based domain name system (DNS) routing platform, configured to apply an overall security policy, specific to an identity associated with a DNS query request, to DNS queries, and comprising at least one processor, a communication interface, and memory, cause the identity-based DNS routing platform to:
establish, using an encrypted DNS process, a secure DNS session, wherein establishing the secure DNS session comprises executing an encrypted session handshake between the identity-based DNS routing platform and a client device, and wherein executing the encrypted session handshake includes receiving, from the client device, a security certificate for the encrypted DNS process that identifies a user of the client device;
receive, while the secure DNS session is established and from the client device, an encrypted DNS query request comprising a request for an internet protocol (IP) address for a domain name, wherein the encrypted DNS query request specifies the domain name;
determine, based on the security certificate, a first identity of the user and one or more second identities associated with the encrypted DNS query request, wherein a combination of the first identity and the one or more second identities comprises an overall identity;

determine, based on the first identity of the user and the one or more second identities, the overall security policy specific to the overall identity, wherein the overall security policy comprises one or more domain name filtering rules generated based on first domain name filtering rules corresponding to the first identity and second domain name filtering rules corresponding to the second identity, and each domain name filtering rule comprises respective domain matching criteria and corresponding actions to take on matching domain names, and wherein the overall security policy was generated by deconflicting the first domain name filtering rules and the second domain name filtering rules by:
  identifying a conflict between a first rule of the first domain name filtering rules and a second rule of the second domain name filtering rules,
  comparing a precedence score of the first rule to a precedence score of the second rule,
  identifying, based on the comparison of the precedence scores, that the precedence score of the first rule exceeds the precedence score of the second rule, and
  selecting, based on identifying that the precedence score of the first rule exceeds the precedence score of the second rule, the first rule rather than the second rule for inclusion in the one or more domain name filtering rules, wherein the one or more domain name filtering rules include the first rule and do not include the second rule;
determine, using the one or more domain name filtering rules and based on the domain name in the encrypted DNS query request, a first action corresponding to the domain name in response to the encrypted DNS query request;
determine, based on the first action corresponding to the domain name, an encrypted DNS query response, wherein determining the encrypted DNS query response includes executing the request for the IP address for the domain name upstream to identify the IP address for the domain name; and
send, to the client device, the encrypted DNS query response.

* * * * *